United States Patent
Harner et al.

(10) Patent No.: US 10,567,449 B2
(45) Date of Patent: Feb. 18, 2020

(54) APPARATUSES, METHODS AND SYSTEMS FOR SHARING VIRTUAL ELEMENTS

(71) Applicant: Meta View, Inc., San Mateo, CA (US)

(72) Inventors: Soren Harner, Palo Alto, CA (US); Sean Olivier Nelson Scott, Ham Lake, MN (US)

(73) Assignee: Meta View, Inc., San Mateo, CA (US)

( * ) Notice: Subject to any disclaimer, the term of this patent is extended or adjusted under 35 U.S.C. 154(b) by 91 days.

(21) Appl. No.: 15/436,754

(22) Filed: Feb. 17, 2017

(65) Prior Publication Data

US 2017/0237789 A1 Aug. 17, 2017

Related U.S. Application Data

(60) Provisional application No. 62/296,570, filed on Feb. 17, 2016.

(51) Int. Cl.
*H04L 29/06* (2006.01)
*G06F 3/01* (2006.01)
*G06T 19/00* (2011.01)
*G06T 19/20* (2011.01)

(52) U.S. Cl.
CPC ......... *H04L 65/4015* (2013.01); *G06F 3/011* (2013.01); *G06T 19/006* (2013.01); *G06T 19/20* (2013.01); *H04L 65/1059* (2013.01); *H04L 65/403* (2013.01); *G06T 2219/024* (2013.01); *G06T 2219/2016* (2013.01)

(58) Field of Classification Search
CPC .... G06F 3/011; H04L 65/4015; H04L 65/403; H04L 65/1059; G06T 19/006; G06T 19/20

USPC ................................ 709/204, 205, 212, 213
See application file for complete search history.

(56) References Cited

U.S. PATENT DOCUMENTS

| | | |
|---|---|---|
| 5,583,977 A | 12/1996 | Seidl |
| 2007/0132721 A1 | 6/2007 | Glomski et al. |
| 2008/0284729 A1 | 11/2008 | Kurtenbach et al. |
| 2009/0043674 A1 | 2/2009 | Minsky et al. |
| 2010/0332998 A1 | 12/2010 | Sun et al. |
| 2011/0145724 A1 | 6/2011 | Tsai et al. |
| 2012/0030289 A1 | 2/2012 | Buford et al. |
| 2012/0196679 A1 | 8/2012 | Newcombe et al. |
| 2012/0249741 A1 | 10/2012 | Maciocci et al. |
| 2013/0027404 A1 | 1/2013 | Sarnoff |
| 2013/0073932 A1 | 3/2013 | Migos et al. |
| 2013/0321390 A1 | 12/2013 | Latta et al. |
| 2014/0002442 A1 | 1/2014 | Lamb et al. |
| 2014/0139717 A1 | 5/2014 | Short |
| 2014/0368504 A1* | 12/2014 | Chen ............... G06T 17/005 345/424 |

(Continued)

OTHER PUBLICATIONS

International Search Report, PCT/US17/18531, dated May 19, 2017, 2 Pages.
Written Opinion, PCT/US17/18531, dated May 19, 2017, 16 Pages.

*Primary Examiner* — Chirag R Patel
*Assistant Examiner* — Marshall M McLeod
(74) *Attorney, Agent, or Firm* — Andrew Bodendorf

(57) ABSTRACT

Aspects of the disclosed apparatuses, methods and systems provide sharing virtual elements between users of different 3-D virtual spaces. In another generation aspect, virtual elements may be sent, shared, or exchanged between different client devices whether the communication sharing the virtual element occurs synchronously or asynchronously.

40 Claims, 35 Drawing Sheets

(56) References Cited

U.S. PATENT DOCUMENTS

| | | |
|---|---|---|
| 2015/0033191 A1 | 1/2015 | Mankowski |
| 2015/0077326 A1* | 3/2015 | Kramer ................ G06F 3/0325 |
| | | 345/156 |
| 2015/0169069 A1 | 6/2015 | Lo et al. |
| 2015/0332511 A1 | 11/2015 | Jovanovic |
| 2016/0027215 A1 | 1/2016 | Burns et al. |
| 2017/0323488 A1 | 11/2017 | Mott et al. |
| 2018/0335925 A1 | 11/2018 | Hsiao et al. |

* cited by examiner

| id | Group | Description |
|---|---|---|
| | metadata | workspace name |
| | | date first created |
| | | date last saved |
| | | date last opened |
| | physical space | space name |
| | | space coordinates |
| | grid | unique ID of grid |
| | fiducials | unique IDs of fiducials in scene |
| | virtual elements | unique IDs of virtual elements in scene |

FIG. 2A

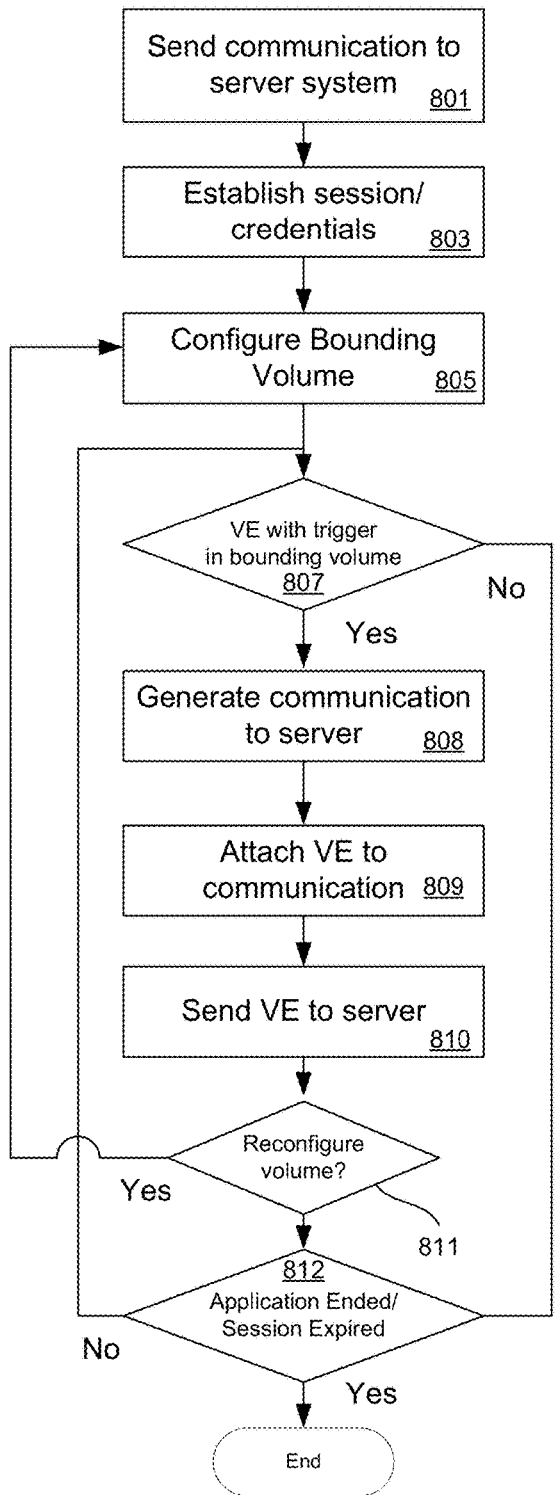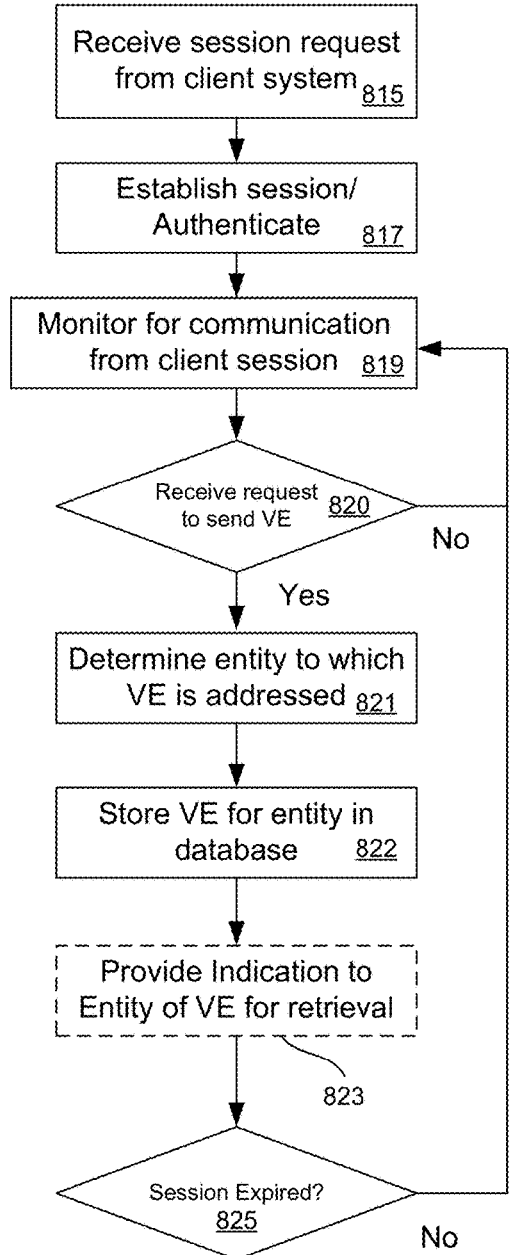
FIG. 8A
FIG. 8B

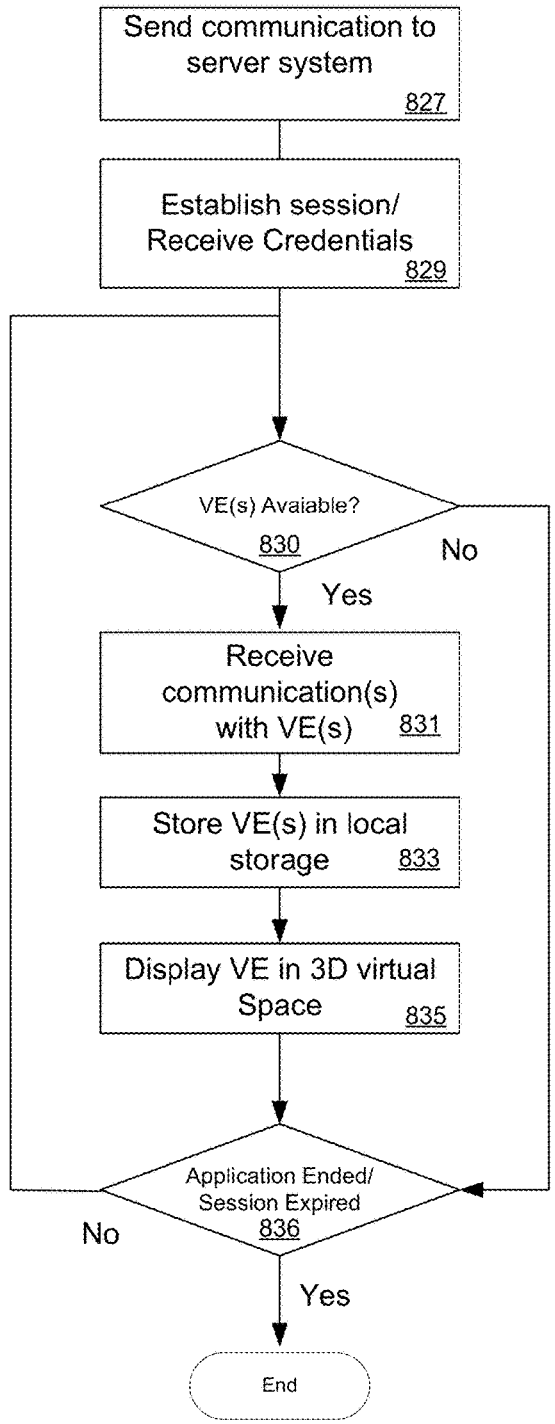
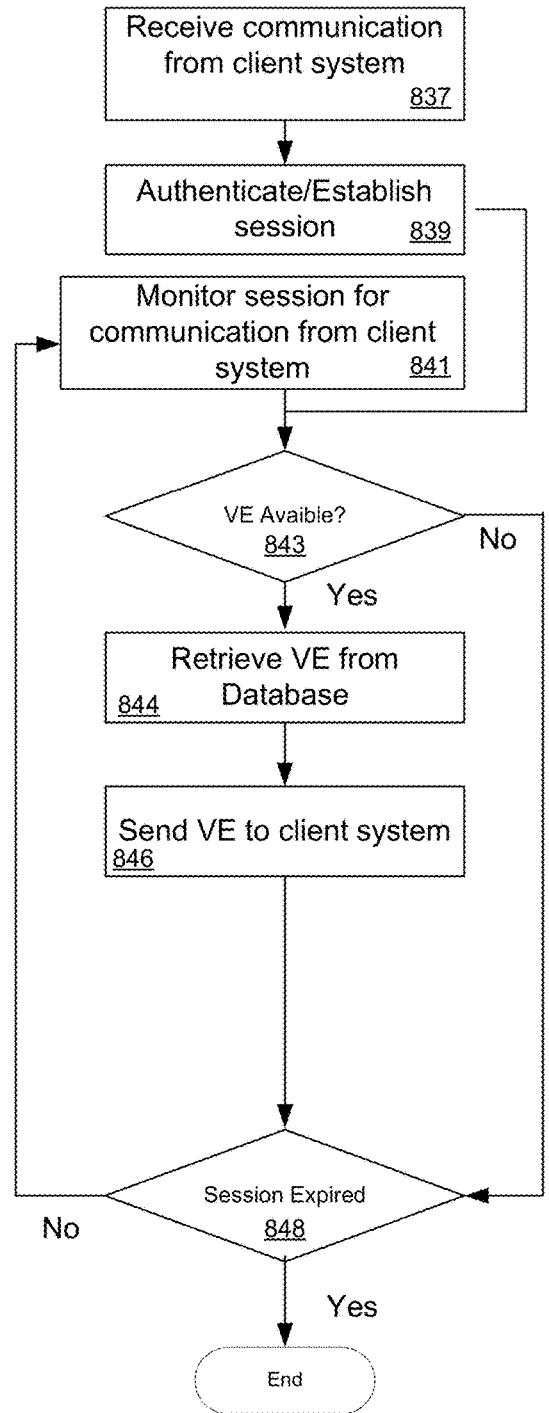
FIG. 8C
FIG. 8D

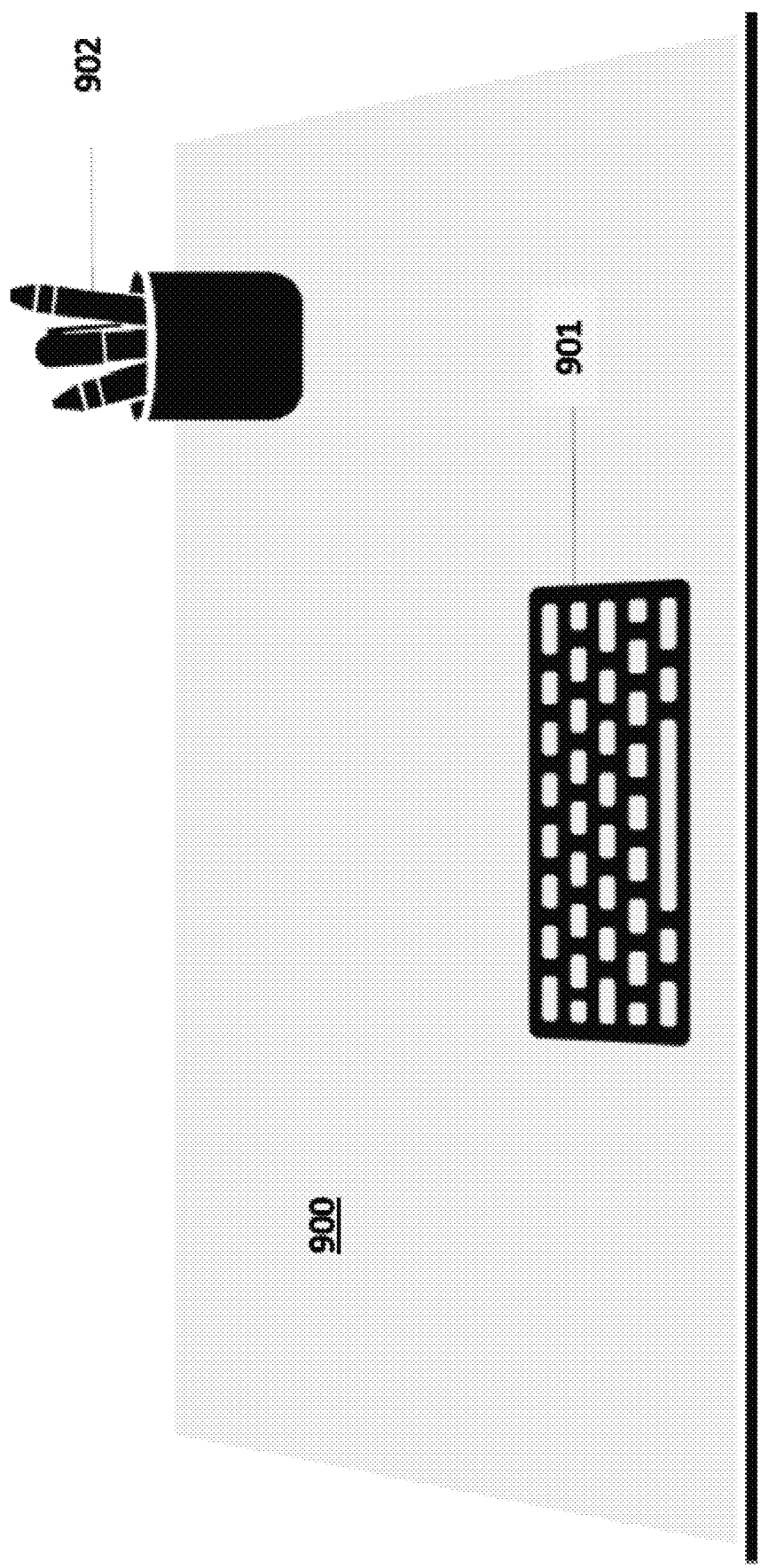

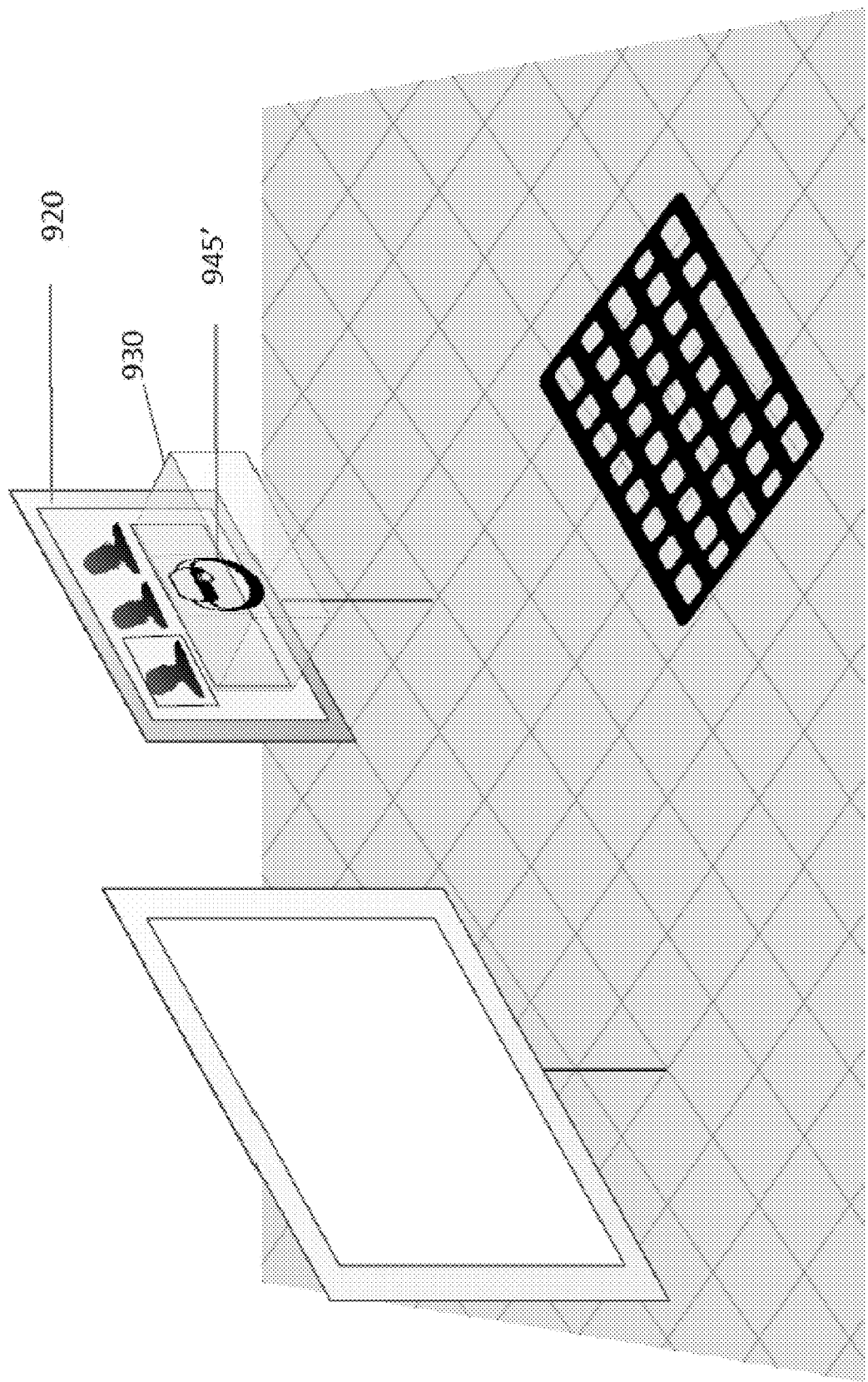

APPARATUSES, METHODS AND SYSTEMS FOR SHARING VIRTUAL ELEMENTS

CROSS-REFERENCE TO RELATED APPLICATIONS

This application claims the benefit under 35 U.S.C. § 119(e) of U.S. Provisional Application No. 62/296,570, titled "APPARATUSES, METHODS AND SYSTEMS FOR SHARING VIRTUAL ELEMENTS" filed on Feb. 17, 2016, in the U.S. Patent and Trademark Office, which is herein expressly incorporated by reference in its entirety for all purposes.

BACKGROUND

The interest in wearable technology has grown considerably over the last decade. For example, wearable virtual reality (VR) displays present virtual images to the user to provide a virtual environment. Now augmented reality (AR) displays are being developed that may be worn by a user to present the user with a synthetic image overlaying a direct view of the environment. Both VR and AR displays are able to present virtual digital content. One example of a virtual digital content is a three-dimensional (3-D) virtual object. VR or AR display systems allow a user to interact with the 3-D virtual object within a virtual space. For example, a user may can select, move, or otherwise interact with a virtual object. However, technical challenges exist as to how a user would provide a 3-D virtual object from their virtual space to another user operating in another virtual space.

SUMMARY

Aspects of the disclosed apparatuses, methods, and systems describe various methods, system, components, and techniques that allow users interacting with virtual elements populating a three-dimensional (3D) virtual space mapped to the user's environment to send, transmit, receive, and otherwise share the virtual elements from the virtual space. In another general aspect, client system may send a 3-D virtual element from a 3-D virtual space to one or more users operating in a different 3-D virtual space. In other general aspects, virtual elements may be shared between users by placing the virtual element within a share volume located in the 3-D virtual space. Once placed in the share volume, the virtual element is shared with one or more other users and may be populated in the 3-D virtual space of those users. In another general aspect, virtual elements may be sent, shared, or exchanged between different client devices whether the communication sharing the virtual element occurs synchronously (e.g., in real time) or asynchronously (e.g., at a time of a recipient's choosing).

In one general aspect, a method implemented by a client system includes sensing, by one or more sensors, a three-dimensional (3-D) volumetric environment around the user of the client system; creating, by a client system, a 3-D virtual space mapped to the sensed environment; providing a virtual element within the 3-D virtual space; determining from input of at least one of the one or more sensors an interaction between a sensed real world object and the virtual element; generating a digital message that includes data used to render the virtual element within a 3-D space in response to the determined interaction; and transmitting the digital message.

The method also includes establishing communications by the client system with a server system, wherein the digital message is transmitted to the server system.

The method also includes establishing communications by the client system with at least one other client system, wherein the digital message is transmitted to the at least one other client system.

The method also includes determining spatial coordinates of a volume within the 3-D virtual space, wherein determining the interaction further includes determining a spatial relation between the location of the virtual element in the 3-D virtual space and the spatial coordinates of the volume.

Determining the interaction may include determining the virtual element in the 3-D virtual space is within the volume.

The interaction may include translating the location of the virtual element within the 3-D virtual space and rendering the virtual element within the volume.

The method also includes representing the location of the volume within the 3-D virtual space by rendering a second virtual element in proximity to the location of the volume within the 3-D virtual space.

The method also includes removing the virtual element from the 3-D virtual space after the message has been transmitted.

Determining the interaction may include determining the real world object has interacted with the virtual element; has moved the virtual element within the volume; and has disengaged the virtual element.

In one example, the real world object may be a hand.

In one general aspect, a system includes: one or more one sensors; a display; an optical element; and one or more data processing devices configured by machine-readable instructions to: determine a three-dimensional (3-D) volumetric environment around the user of the system based on input from at least one of the one or more sensors; create a 3-D virtual space mapped to the environment; provide a virtual element within the 3-D virtual space by rendering an image on the display that is reflected or directed to the eyes of the user; determine from the input of at least one of the one or more sensors that an interaction between a sensed real world object and the virtual element has taken place; generate a digital message that includes data used to render the virtual element within a 3-D space in response to the determined interaction; and transmit the digital message.

In one general aspect, a method implemented by a client system includes: sensing, by one or more sensors, a three-dimensional (3-D) volumetric environment around the user of the client system; creating, by a client system, a 3-D virtual space mapped to the sensed environment; determining spatial coordinates of a volume within the 3-D virtual space; receiving a digital message including that includes data used to render a virtual element within a 3-D space; and providing the virtual element within the 3-D virtual space located within the volume by processing the data.

The method also includes establishing communications by the client system with a server system, wherein the digital message is received from the server system.

The method also includes establishing communications by the client system with at least one other client system, wherein the digital message is received from the at least one other client system.

The method also includes determining from input of at least one of the one or more sensors an interaction between a sensed real world object and the virtual element; and translating the virtual element from the volume to another location within the 3-D virtual space outside of the volume.

The method also includes translating the virtual element from the volume to another location within the 3-D virtual space outside of the volume triggers storing the data used to render the virtual element within a 3-D space in a desired location within a storage device accessed by the client system.

The provided virtual element may be a low-fidelity virtual element, and method also includes: determining from input of at least one of the one or more sensors an interaction between a sensed real world object and the virtual element; and translating the low fidelity virtual element from the volume to another location within the 3-D virtual space outside of the volume; and providing a high fidelity virtual element in place of the low fidelity virtual element in response to the translation of the low fidelity virtual element outside of the volume.

The method also includes providing a virtual panel or frame in the virtual space presenting data from a communications application; and wherein determining the spatial coordinates of a volume within the 3-D virtual space include placing the coordinates in proximity the panel or frame.

In one general aspect, a system includes: one or more one sensors; a display; an optical element; one or more data processing devices configured by machine-readable instructions to: determine a three-dimensional (3-D) volumetric environment around the user of the system based on input from at least one of the one or more sensors; create a 3-D virtual space mapped to the environment; determine spatial coordinates of a volume within the 3-D virtual space; receive a digital message including data used to render the virtual element within a 3-D space; and provide a virtual element within the 3-D virtual space located within the volume by processing the data.

The details of various embodiments are set forth in the accompanying drawings and the description below. Other features and advantages will be apparent from the following description, the drawings, and the claims.

BRIEF DESCRIPTION OF THE DRAWINGS

The following description illustrates aspects of embodiments of the disclosed apparatuses, methods and systems in more detail, by way of examples, which are intended to be non-limiting and illustrative with reference to the accompanying drawings, in which:

FIG. 2A is an example of a workspace element descriptor;

FIG. 8A is an example of process flow for a client system to send virtual elements;

FIG. 8B is an example of process flow for a server system to receive virtual elements;

FIG. 8C is an example of process flow for a client system to receive virtual elements;

FIG. 8D is an example of process flow for a server system distribute virtual elements;

FIGS. 9A, 9B, 9C, 9D, 9E, 9F, 9G, 9H, 9I, 9J, 9K, 9L, 9M, 9N, and 9O show examples of virtual environments for sharing virtual elements;

DETAILED DESCRIPTION

Overview

Figure 1:
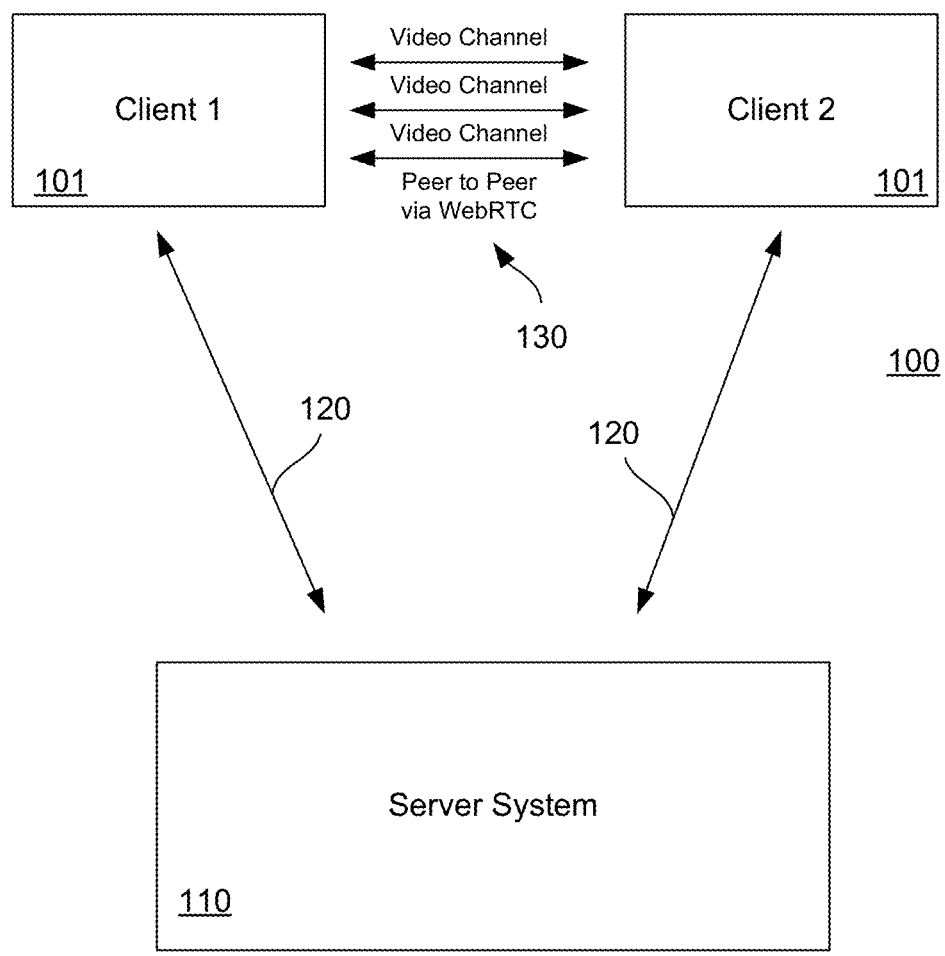
FIG. 1 is a block diagram showing an example of cloud, server, and client interactions for a collaborative augmented reality system.

The human perceptual system has the ability to combine various sensory cues in an efficient manner in order to perceive physically plausible virtual content in real-world space. For example, the human perceptual system has the ability to integrate, among other things, sensory cues such as one or more of luminance, depth, and/or shape information to form or perceive coherent virtual content in the real-world. As a result, the properties of the human perception may be exploited through visual systems employing hardware and/or software architectures to form virtual content that may be perceived to be located in real-world space by virtue of the principles of the depth sensitive modules of the human brain. The views of virtual content, in addition to the views of the real-world within a user's field-of-view, may define an augmented reality environment.

In some general aspects, an augmented reality display system incorporates transparent optics that have the capability of relaying projected images to the viewer while allowing the viewer also to see his or her real world environment. These systems create a virtual a three-dimensional (3D) space based on, for example, input translated from real-world 3-D point data observed by one or more sensors of the display system to overlay the virtual 3-D space over the mapped real world environment of the viewer.

In some implementations, simulated manipulation of virtual content in an augmented reality environment may be based on user input and/or other input. For example, user input may comprise gesture-based input and/or other input. In some implementations, gesture-based input is based on tracking of one or more human features of a user. For example, gesture-based input may be based on tracking one or more of a hand, an arm, a torso, and/or other features of a user. By tracking one or more hands of a user, gestures including one or more of reaching, grabbing, releasing, touching, swiping, pointing, poking, and/or other gestures may be identified. The identified gestures may be provided as input for simulating manipulation of virtual content within a user's field-of-view. For example, an identified gesture may be correlated to a perceived position of a virtual element within a user's field-of-view. The virtual element may be configured to react to the gesture in an interactive manner. In another implementation, a discrete gesture may be used. For example, a set of specific discrete hand positions may be interpreted by the system interact with or manipulate virtual element.

In another example, user input may be determined when at least one sensor of the display system determines that the translated position of a real-world object, such as a hand or finger, into the 3-D virtual space enters an interactive boundary of a virtual element. In this example, the display system determines the force exerted on the virtual element by the translated real-world object according to a certain parameters associated with the interactive boundary of the virtual element. The virtual element responds to the exerted force based on the properties assigned to the virtual element and based on the properties of the virtual environment in which the virtual element and translated real-world object are present.

In some embodiments, virtual content may consist of one or more virtual elements. In one example, a virtual element may be any shape rendered as a digital image by at least one light source, such as a display, a projector, or other imaging component capable of generating a visible image of the shape within a virtual 3-D space. Each virtual element may have associated content and a number of assigned properties to model the behavior and interaction with the virtual element within a virtual 3-D interactive space.

Traditional digital communications systems, whether asynchronous or synchronous, allow individuals to communicate with each other over a distance and share digital content. However, current communication architectures and platforms do not provide any means of sharing or sending 3-D virtual elements between users that are interacting with disparate 3-D virtual spaces or environments (that do not physically exist). Many other technical challenges must be overcome to allow users to share virtual elements designed for use and manipulation in 3-D virtual environment. In addition, technical challenges exist to leveraging traditional forms of sharing digital content, such as, for example, real time web-based video conferencing, or asynchronous, such as, for example, email or instant messaging applications for use in a virtual environment In one general aspect, the following description provides solutions to these technical challenges with apparatuses, methods, systems, components and techniques that allow users interacting with virtual elements populating a three-dimensional (3D) virtual space mapped to the user's environment to send, transmit, receive, and otherwise share the virtual elements from the virtual space. In other general aspects, virtual elements may be shared between users by placing the virtual element within a share volume located in the 3-D virtual space. Once placed in the share volume, the virtual element is shared with one or more other users and may be populated in the 3-D virtual space of those users. In another general aspect, virtual elements may be sent, shared, or exchanged between different client devices whether the communication sharing the virtual element occurs synchronously (e.g., in real time) or asynchronously (e.g., at a time of a recipient's choosing).

Communications System

FIG. 1 is a block diagram showing an example of a server system and client systems interactions for sharing 3-D virtual using a communications system 100. In some implementations, the communications system includes one or more client systems 101 (e.g., client 1 and client 2) that interact with a server system 110 (e.g., at least one web server including a web service and a data store). FIG. 1 shows only two client systems by way of example for ease of description; however, one skilled in the art will appreciate that additional client systems may be implemented in any of the embodiments described below to accommodate a given number of users in any particular example or implementation. Similarly, although the web server system is shown as a single entity multiple servers may be provided, as described in further detail below. In general, the client systems include one or more client processing devices, interfaces, and storage devices. The client processing device is configured to execute instructions stored and/or accessed from a non-transitory machine-readable storage medium used to encode or store the executable instructions. The instructions may include various processes, programs, software, code, and the like that cause the processing device to carry out the operations described in detail below.

In addition, the client system also may include an array of one or more sensors that provide data to the client processing device about the real world environment. For example, depth, positional, and camera data metrics may be used by the communication processes to map an environment, create and map a 3-D virtual workspace within the environment, orient a user with regard to the workspace, present one or more virtual elements within a workspace, allow a user to interact with and otherwise manipulate the virtual elements, and share virtual elements via communications between users in an synchronous and/or asynchronous manner, as explained in further detail below.

The client system also includes a light source, and an optical element for generating the virtual content that is perceived within a three-dimensional virtual space. In some implementations, one or more of the light source, optical element, and/or other components may be incorporated into a head-mounted display system. Light emitted from the light source as a beam may be reflected or partially reflected off or through the optical element into a user's eye to provide a virtual reality or augmented realty, respectively. Light from the beam may be part of light generated by light source to depict a digital image corresponding to virtual content as rendered by a processing device of the client system and perceived by the user as a virtual image within the three-dimensional space.

The server system may include one or more interfaces, storage devices, and processing devices implementing one or more servers and web services. A server system processing device is configured to execute instructions stored and/or accessed from a non-transitory machine-readable storage medium used to encode or store the executable instructions. The instructions may include various processes, programs, software, code, and the like that cause the processing device to carry out the operations described in detail below. The server system may implement one or more data stores to store workspace element descriptors and virtual element descriptors among other items used to receive, transmit, send, and otherwise share or transfer virtual elements using communication paths of the system. The web servers also may provide web services, such as authentication, communications, and session management among others via an interface of the web server system.

During communications, the client systems may establish a communications link 120 over a communications path with the server system, such as for example, a host/client link using interfaces of the client system and the server system. In one example, TCP/IP or UPD/IP protocols are used to send data over the communications link. The link is used to provide data between the client and server systems. For example, the link may be used to share geometry and workspace definitions. In some implementations, the link also may be used to send virtual element to the client systems and receive virtual elements from the client systems. Updates between the server and client systems also may be provided via this link. In one example, the communications link between the client system and the server system may be implemented using a computer communications protocol and/or application programming interfaces, providing full-duplex communication channels over a single TCP connection, such as the protocol WebSockets.

In addition, the client systems also may establish a communications link 130 on a communications path between the client systems, such as, for example, a peer-to-peer link. In one example, the peer-to-peer link may be implemented using a collection of communications protocols and application programming interfaces that enable real-time communication over peer-to-peer connections allowing sharing between client system processes without the need of either internal or external plugins. The client systems may use the peer-to-peer link to send changes that result from user interaction with content presented in a workspace. In one example, WebRTC may be used to provide the peer-to-peer link between client devices. For example, WebRTC is an API that supports browser-to-browser applications for voice calling, video chat, and peer-to-peer ("P2P") file sharing without the need of either internal or external plugins. The client systems use the P2P link to establish various communication channels, such as a video channel (e.g., for sharing video data), and audio channel (e.g., for sharing audio data) and a data channel (e.g., for sending communications and other digital data).

The various connections may be used by the client devices to communicate. In one example, the client devices may communicate using a communication application. For example, the connections may be established by communication applications, such as, for example, a web/video conferencing application, a messaging application, an email application, and the like used to communicate data between the client systems. In this example, the client may establish a sharing session using the communication application. In one embodiment, the sharing session may be used to share a virtual element between client systems participating in the session. Examples of sharing sessions are described in further detail below.

In some implementations, a 3-D virtual workspace is a defined virtual space or volume (e.g., a "workspace") with spatial 3-D coordinates that is used to provide a place where users can interact with virtual elements within a virtual environment or an augmented environment. Each client system is capable of rendering a view of the workspace from the perspective of the user of the client system participating in a communication. In one example, the workspace includes one or more virtual elements. Each user may interact with one or more of the virtual elements populating the workspace. For example, the users may create, move, translate, manipulate, change, edit, and otherwise interact with the virtual elements populating the workspace. In some implementations, virtual elements may be rendered in the workspace according to a virtual element descriptor, described in further detail below.

In some implementations, the client system uses a workspace element descriptor to establish a 3-D workspace. Using such a descriptor, different versions of workspaces may be generated by the client system. For example, a particular version of a workspace may have associated different properties, such as size, scale, and layout. In addition, different workspaces may be populated with different 3-D virtual elements, combinations of elements, and layout of elements. The workspace element descriptor is described in further detail below. Each instance of a workspace may be saved or stored. In addition, a default or an initial workspace may be provided to start or establish a new or fresh instance of a workspace allowing a user to add, arrange, or otherwise change or customize the layout of a workspace. In one example, a user can create a workspace and give the workspace a name (e.g., "Home Desktop" or "Work Desktop"). The workspace is then persisted by the server system and uniquely identified with a locator, such as, for example, a uniform resource location (URL). Various virtual elements and other virtual content may be placed in and/or arranged in the workspace. The type, number, state, and arrangement of virtual elements may be stored using the workplace element descriptors of the workplace document. However, a workspace does not need to be predefined by or loaded from an existing workspace descriptor, and, in its broadest sense, may be a defined virtual space or volume with spatial 3-D coordinates that is sensed or mapped based on input from one or more sensors to provide a place where a user can interact with the virtual elements within a virtual environment or an augmented environment.

Authentication

In one example, each instance of an individual workspace may be stored by, managed by, and accessed from the sever system. In one example, the client systems are authenticated to access an individual instance of a workspace from the server system. In one example, upon startup, the client system prompts the user to login. For example, credentials are captured by the client system and are submitted to the server system for verification and/or authentication. Examples of credentials that may be submitted to the server system include an identification (ID) and password, tokens, cookies, user and machine agents, digital certificates, and the like, or combinations thereof. The server system verifies and/or authenticates the credentials for each client system. In one embodiment, one or more conditions are used to authenticate a user. For example, the system may verify that the submitted credentials are valid when compared against known information or accounts of the server system. In addition, the server system may determine that an account is in good standing and/or active. In one example, if both of these conditions are met, then the user is authenticated and the client system is given access to the user's workspaces stored by the server system. In one implementation, the authentication may be used to establish a communications session between the server and client. However, the preceding examples are illustrative only and any number of credentialing and authentication schemes may be used in conjunction with the teachings provided herein to establish and manage communications between a client and a server system.

Workspaces

In some implementations, the server system manages the individual instances of a new, saved, or default workspace. For example, an individual instance of a workspace may be saved using a workspace document with workspace descriptors within one or more databases or data stores maintained by the sever system. Each document has a unique address within the server system. In one implementation, the workspaces may be represented declaratively in JavaScript Object Notation (JSON)-encoded documents. JSON is an open-standard format that uses human-readable text to transmit data objects consisting of attribute-value pairs. Similarly, the server system may implement using a relational database (DB) structure. In one example, a cross-platform document-oriented database, or a NoSQL database, such as, for example, a MongoDB is used, wherein each workspace document encodes all of the information required for the reconstruction of that workspace. This information includes static information such as workspace name, and dynamic information, such as extensible scripts that perform some function and layout rules in the workspace environment. Once downloaded, the client begins the reconstruction of the workspace by parsing the JSON-encoded file. While the server system has be described in terms of a MongoDB storing JSON documents, these examples are illustrative and other data stores and documents may be used consistent with the descriptions herein. In some implementations, the workspace document with workspace descriptors may be stored and accessed by the client system without access to the server system.

In one implementation of the communications system shown FIG. 1, the client system saves any changes to the workspace over the communication paths back to the server system. In one example, saving may be implemented in real time whenever a change to the workspace is registered. In addition, manipulation of virtual elements within the workspace (e.g., moves, rotations, creations, edits, and other like events) are written back up to the server system via the communications link. In one general aspect, the real-time saving configuration provided by the communications system shown in FIG. 1 allows the communications system to effectively recreate workspaces exactly as the space was last used or updated. In other implementations, changes or interactions with the workspace are managed and/or stored locally by the client system. For example, change to the workspace and a workspace descriptor may be locally stored. In some examples, updates or changes to the workspace may be provided asynchronously (e.g., at a later time, or periodically as designated by the user or by programming in the client system).

FIG. 2A shows one example of a workspace document with workspace element descriptors. In one example, the document may include group elements, such as, for example, metadata, physical space data, grid data, fiducial data, and virtual elements. Each group may organize or store one or more descriptors. For example, metadata may include a workspace name, a date first created, a data last saved, a date last opened. Physical space data may include a space name and space coordinates. Grid data may include a unique ID of a particular grid (e.g., corresponding to 3-D user environment, such as, for example a surface (e.g., a desktop) or a room (e.g., family room)). Fiducial data may include unique IDs of fiducials provided in a scene (e.g., in one implementation a workspace can have an arbitrary number of fiducial markers, each allowing the client system to establish a unique coordinate system, such as, images, barcodes, surfaces, or objects). Virtual elements may include a list of unique IDs of virtual elements populated in a scene. In some implementations, the unique IDs correspond to virtual element descriptors, which include the information used by the client system to render and interact with the virtual element. In one example, the elements are managed using the document stored in at the server system.

Once a communications link and/or session is established with the server system, the client system may retrieve the workspace document. In some implementations, the communications link and/or session between the server system and the client system may be used to send, receive, and otherwise share a virtual element between client systems, as described in further detail below. This document is used by the client system to process a context or an instance of a workspace as saved. The context or instance may include a catalog of virtual elements, their position, orientation, and behavior. For example, a virtual element of a virtual frame may indicate what state the frame was in (e.g., what content was mapped to the frame, such as what spreadsheet, file, or webpage was open when the frame was last rendered in the workspace) and any associated metadata, whether visual (e.g., an annotation) or not. With this information, the client system implements a layout process.

Virtual Elements

In some implementations, a virtual element may be any shape rendered as a synthetic 3-D image by at least one light source of the display system, such as a one or more displays, a projector, or other imaging component in conjunction with optics to create a visible virtual image of the shape within a virtual 3-D space. In addition, one or more virtual elements may be combined to make additional virtual elements.

Figure 2B:
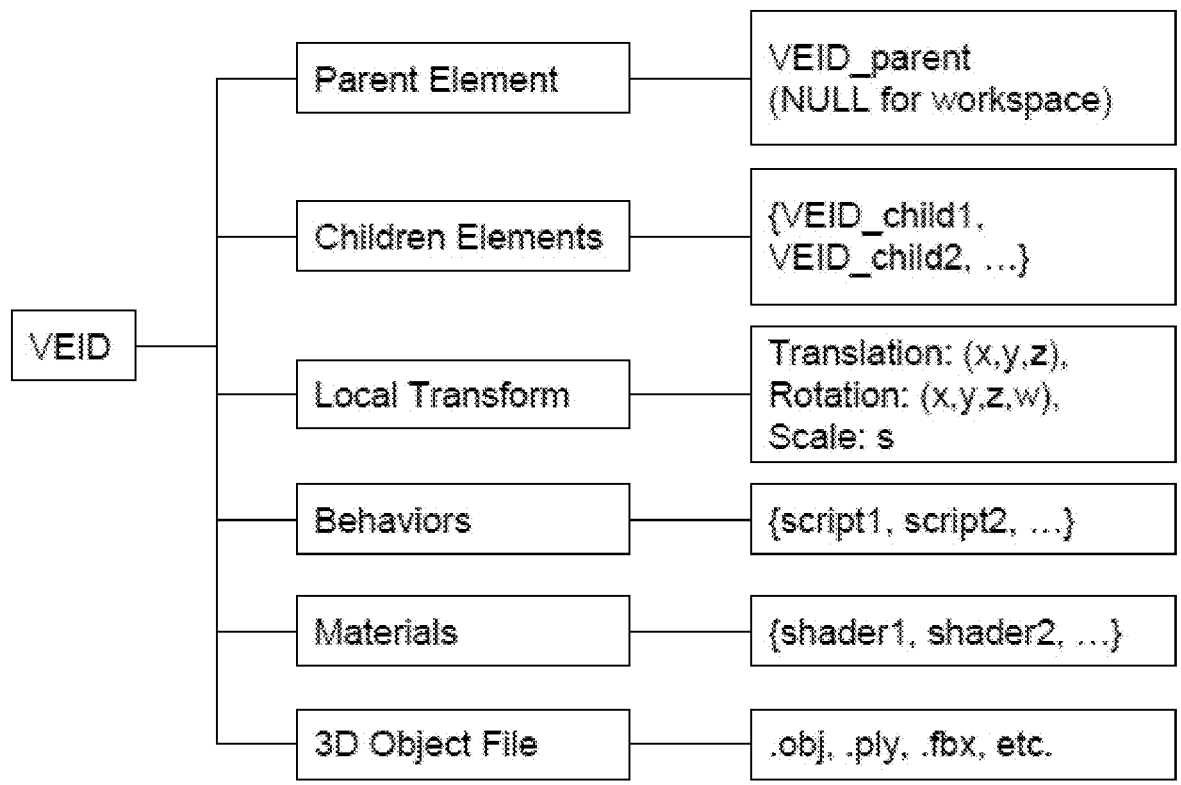
FIG. 2B is an example of a virtual element descriptor.

FIG. 2B shows one example of a virtual element descriptor, which may be used by a client system to model and generate a virtual element. As shown in FIG. 2B, the descriptor may include various information used by the client system to model and generate a virtual element, such as an ID, a parent element, child elements, local transforms, behaviors, materials, and/or a parameter file. The data associated with this structure may be used by a 3-D graphics engine implemented by the processing device of the client system to render a high or low fidelity virtual element.

In some implementations, the descriptor may include a group of components storing information used by a rendering/graphics platform operated by at least one processing device of the client system to create, render, and present manipulation of a virtual element in the workspace. Each virtual element may have an identifier (e.g., VEID) used to locate, access, and store the virtual element and its related data. The virtual element may include an identifier of any parent virtual element (e.g., VEID_parent). The virtual element also may include an identifier of any child virtual element (e.g., VEID_child). The identifiers may be used to identify relationships between virtual elements.

The virtual element may include a number of assigned visual and behavioral parameters that are used to model the properties of the virtual element within a virtual 3-D interactive space. The visual and behavioral parameters are processed to render the virtual element and determine the behavior of the virtual element within the virtual 3-D space. For example, the descriptor may include components of a local transform, behaviors, materials, and a 3-D visual object file. In one example, the virtual element is based on a 3-D model including at least one file, such as a visual object file, specifying a geometry of the virtual element. For example, the file may include vertex data, free-form curve/surface attributes, elements, free-form curve/surface body statements, connectivity between free-form surfaces, grouping, and display/render attribute information. Examples of common elements used to model and render a virtual element include geometric vertices, texture coordinates, vertex normals, and polygonal faces. In one example, an .OBJ file may be used or other similar format, such as, .STL, .FXB, and .PLY to store geometric information depending on the graphics rendering platform of the client system.

The descriptor also may include or reference additional components and/or metadata used by the display system to create the virtual element in the virtual 3-D space. For example, additional files or libraries may be referenced to describe material properties of virtual elements (e.g., surface shading), such as for example, .MTL files (called "material libraries"). Certain parameters, such as primitives, charges, and/or collider volumes or meshes also may be mapped to or associated with the geometry of the virtual element to provide, for example, an interactive boundary to model interaction of the virtual element in response to inputs from a user or the real world environment (e.g., point cloud data associated with real world elements like a user's hands or other environment elements, such as table surface on which a virtual element rests). Other elements and/or metadata also may be associated with or stored by the file including, callouts, exploding views, scripts, animations, a visual and an auditory feedback, and the like. For example, call outs may be attached to a vertex ID like a note with layout performed using a graph layout algorithm. Additionally, the virtual element may include information about its orientation and scale. For example, the virtual element may reference local transform data including translations within a 3-D coordinate system (e.g., x, y, z), a rotation (e.g., x, y, z, w), and a scale (e.g., s).

The virtual element also may include an audio component. For example, mAudio may be localized in 3-D to an element, using for example, multiple speakers positioned relative to a user to provide 3-D binaural rendered audio perceived as emanating from a position in space. For example, based on an element's location in 3-D virtual space and relative position of a viewer (e.g., calculated using a head-related transfer function), sound is binaurally rendered as emanating from the location of the virtual element in space.

In one example, two or more versions or models of a virtual element may be stored by the server and client system (e.g., a low fidelity virtual element and a high fidelity virtual element). For example, a low-fidelity virtual element may include a lower resolution image (e.g., with less polygons forming the image) and/or properties or metadata limiting the elements behavior and manipulation within the virtual space. A high-fidelity virtual element may include higher resolution images and additional properties and metadata (e.g., callouts, exploding views, animations, a visual and an auditory feedback, and the like).

Mapping the Workspace

Figure 3A:
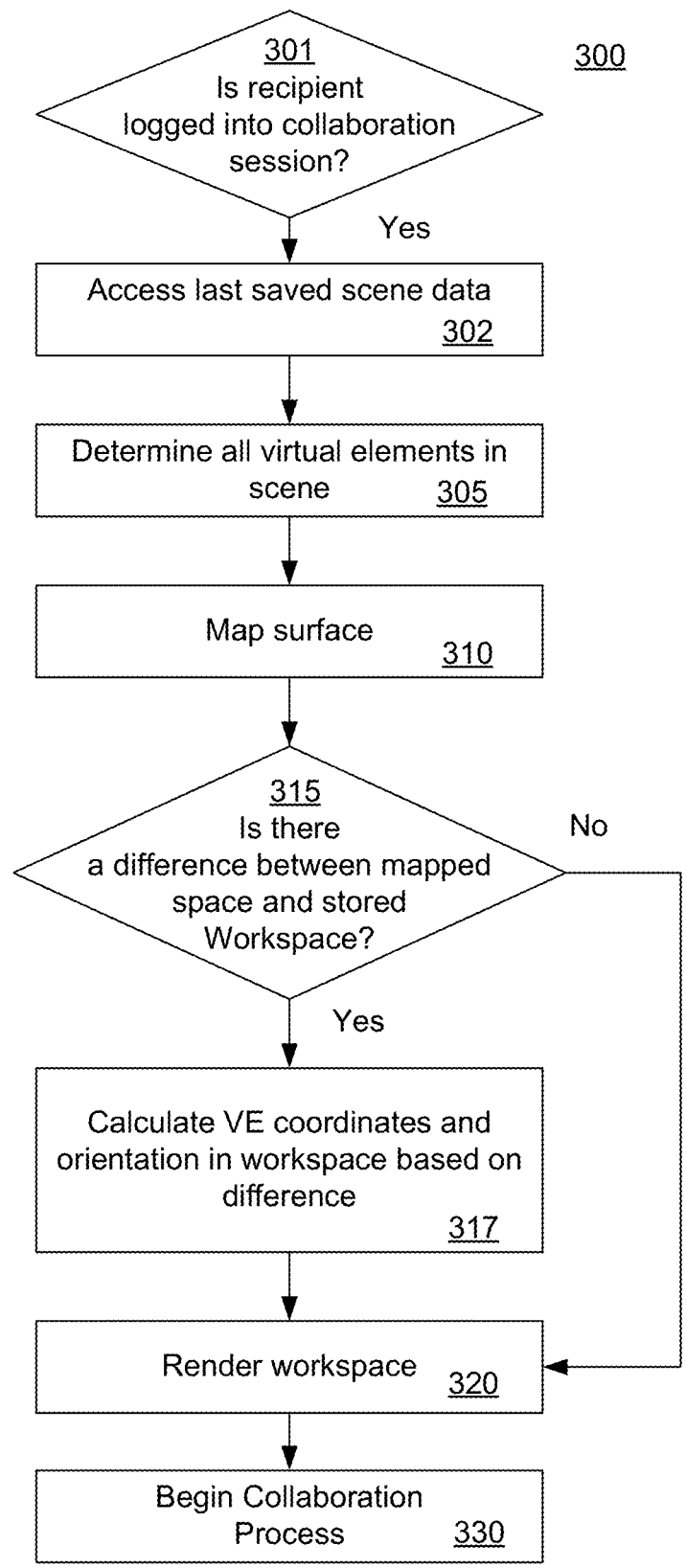
FIG. 3A is an example of a process flow for three-dimension (3-D) space creation.

FIG. 3A shows an example of a process flow for three-dimension workspace creation. The process authenticates users participating in a communication; accesses a saved workspace, maps an environment of the user in which the works space is instantiated, and renders the workspace for the mapped grid. The process may be implemented by a client system to understand the context of the workspace (e.g., the environment and objects within the workspace), map a grid, and render the workspace. For example, after retrieval of the workspace, the client system seeks to understand the real-world context that the user is currently in to in turn apply a coordinate system to that context. This process is referred to as surface tracking. There exist many methods to attain surface tracking. One is the use of a third-party camera system such as "optitrack", which leverages a set of external cameras to map the environment, features and landmarks within it in a low latency manner. Another is leveraging fiducial markers present in the environment to build a coordinate system. In another example, shown in FIG. 3A, a "canvassing" algorithm is used to implement surface tracking. Canvassing may be implemented using data from one or more sensors (e.g., a depth sensor and/or one or more monochrome cameras, in conjunction with user orientation data, for example, provided from an inertial measurement unit) to map and determiner surfaces within the environment.

As shown in FIG. 3A, in this example, a user logs in. In operation 301, the system first determines whether the connection or link is established with the server. After login establishes a communication link, in operation 302 each client system retrieves their respective workspace data (e.g., access the last saved workspace data for a unique workspace ID) to load a workspace for communication. For example, the client system accesses the workspace descriptor associated with a unique workspace ID, which includes scene data from a last instance of the workspace. In operation 305, client system processes the workspace data returned by the server system to determine what virtual elements are located in the default scene corresponding to the workspace. In operation 310, the client system maps a surface on which the instance of the workspace is created. For example, the client system may execute one or more mapping processes, such as 3-D canvassing to implement a surface recognition and reconstruction process and create a Cartesian grid on a bounded physical surface.

In operation 315, the system determines whether there is a difference between the canvassed 3-D space and the retrieved 3-D workspace. For example, the client system may determine whether the grid of the canvassed surface matches the grid of a workspace (e.g., with regard to surface area, orientation, scale, and the like). If there is no difference, in operation 320, the client system renders the workspace (e.g., renders a scene a specified by the descriptors of the document retrieved for the scene). If a difference does exist, in operation 317 the client system applies a transformation or maps the retrieved coordinates to the canvassed 3-D space and then renders the workspace. For example, once the retrieved 3-D space and canvassed surface have been defined, the client system compares the size and/or orientation of the discovered surface to a surface of the stored workspace to determine if a delta exists between the two. If the system determines that there exists a delta, the system begins the process of instantiating a new Cartesian coordinate system for mapping the stored scene to the workspace, and then renders the workspace in operation 320.

Figure 3B:
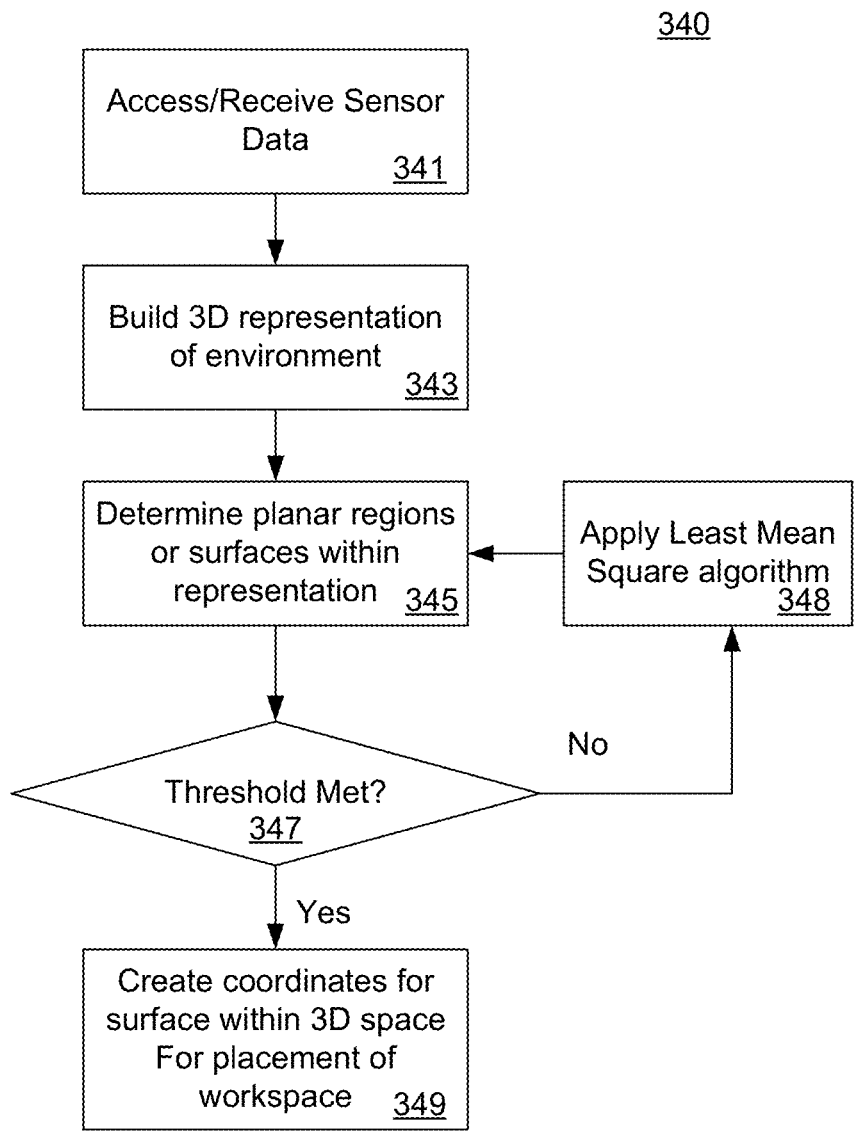
FIG. 3B is an example of a process flow for surface tracking.

FIG. 3B is an example of a process flow for detecting a canvassed 3D space and defining a coordinate grid on it. In some implementations, this process 340 may be used in the implementation of operation 310 described above with regard to FIG. 3A. In operation 341, the client system accesses data from one or more sensors. For example, the client system may include a sensor array with one or more sensor that detect information about the user and user's environment. The sensors may include one or more depth sensors, monochrome cameras, and inertial measurement units, and the like. The sensor array and sensors are described in further detail below. The client system may prompts a user to gaze at a real world environment or even a real world element in the environment that the user wishes the workspace to be layered or presented on. In one example, the real world element is a surface (e.g., a tabletop, a desktop, a countertop, a wall, and the like). The user may gaze at one or more corners of the surface to map the surface using one or more sensors of the client system. In operation 343, the client system uses the sensor data to build a 3D representation of the environment or surface. In some implementations, point cloud data from a depth camera may be used to build the 3D representation. In other implementation, additional sensor data may be used such as sparse input from one or more monochrome cameras fused combination with an IMU input to implement a SLAM process to determine rotation and translation information. In other implementations, the dense mapping from the depth sensor point cloud may be combined with the sparse points of the SLAM process to develop a mesh representation of the environment, which may then be used to find suitable locations for a workspace. In operations 345, 347, and 348, the client system processes the 3D representation to determine the location of a suitable surface (e.g., a planar surface). For example, the client system implements a process to detect area within the representation having a collection of data points or areas within a mesh that indicate the likelihood of a planar region. In one example, the client system uses a least squares algorithm, or similar method for fitting a plane to a collection of points, to first find a plane and then look for high curvature areas within those planes (e.g., corner and edges of a table or desk, meeting at a right angle). Once the client system locates a suitable surface via a canvassing operation or through the recognition of a fiducial designating a suitable surface, in operation 349 the client system creates the 3D coordinate system built from and/or anchored to the detected location in which the workspace is rendered. In one example, the coordinate system may correspond to a detected surface location upon which the workspace is layered.

Figure 4:
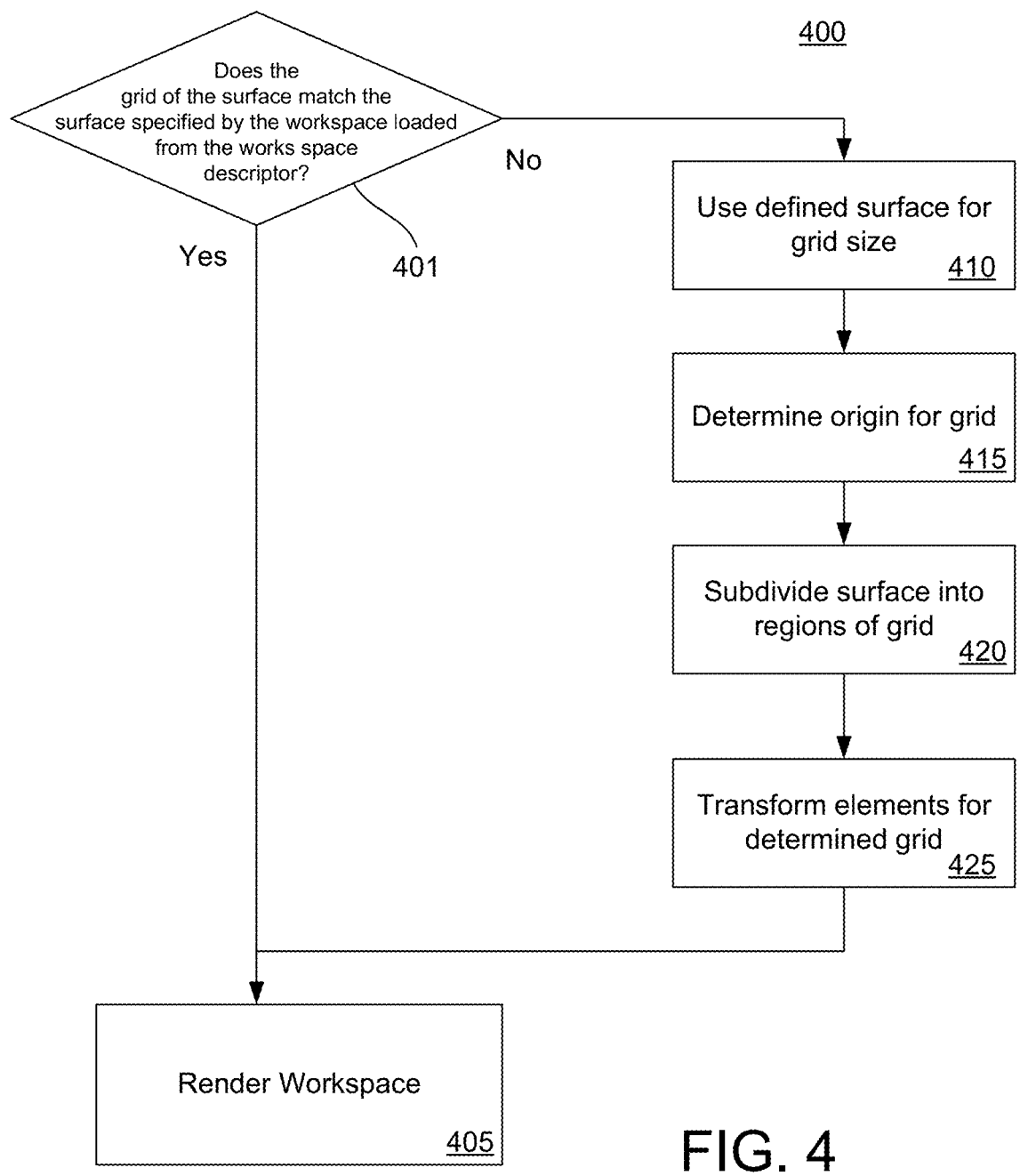
FIG. 4 is an example of a process flow for grid generation.

FIG. 4 is an example of a process flow 400 for grid generation for a surface upon which a workspace may be established. In some implementations, this process may be used in the implementation of operations 315 and 317 described above in FIG. 3A. In one example, the method for generating a grid may be implemented as follows. In operation 401, the client system determines whether the identified or candidate surface matches a saved surface corresponding to a current workspace in which communication is to be initiated (e.g., the surface of the real world element, such as a desk is the same desk surface that a virtual work space was previously created for). If the surface matches, in operation 405 the workspace is rendered according to the coordinates included in the workspace descriptor. If not, in operation 410 the grid size is determined. For example, the grid size based on surface dimensions are determined from sensor input used to mapping the surface, such as input from a depth camera. In operation 415, the client system anchors an origin for the grid to a position on the surface, such as, for example, the bottom left corner of the surface or the center of the surface. Dimensions for the grid area may be determined for the surface. For example, the two axes of the grid (e.g., an x-axis and a y-axis) may be determined based on the origin. For example, the tangent at a determined corner of the surface towards the user may be used as one dimension (e.g., an x-axis), and a second dimension (e.g., the y-axis) may be determined as the cross product to the first dimension and a surface normal. In operation 420, the surface is then subdivided into a grid coordinates. In one example, the surface is divided into square regions with all four points of the square having coordinates. In operation, 425 any transforms for placement of the virtual elements according to the determined grid are performed. In operation 405, the client system renders workspace with the virtual elements according to a scene of the workspace indicated by the workspace descriptor.

Figure 5:
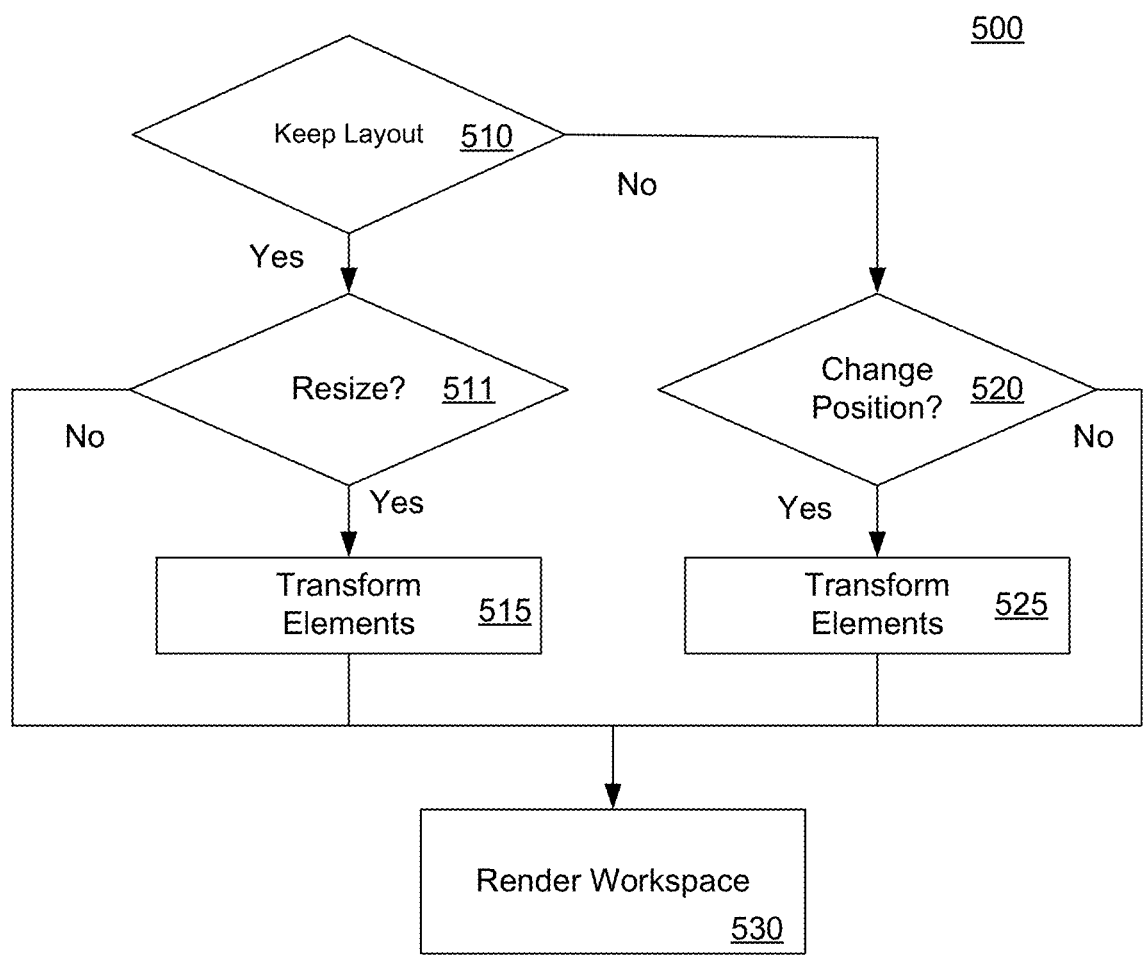
FIG. 5 is an example of a process flow for a responsive process.

FIG. 5 shows one example of a process flow 500 of for placement of elements within the workspace. In some implementations, the process 500 may be used to implement the operation 425 described above with regard to FIG. 4. In one example, virtual element placement happens in a responsive manner, that is, in a fluid way where the grid or the elements themselves can be transformed to meet user preference. In one example, by default the client system transforms the workspace to maximize the virtual object sizes. For example, the client system may sacrifice placement of virtual elements to maximize their size and while keeping the scene as close as possible to the original specs provided by the descriptors in the document. In operation, 510, the client system may present a user with an option to maintain the layout of the scene during transformation. If the user decides to keep the layout, in operation 511 the client system determines whether it needs to resize the virtual elements in order to keep the layout and their location respective of each other as intact as possible. If necessary, in operation 515 the client device performs any transformed need. If the user decided change the layout, in operation 520 the client system determines whether the positioning needs to change in order to maintain the virtual elements size. If necessary, in operation 525 the client device performs any transforms that may be needed.

Once any transformations are completed, the client system renders the workspace in operation 530. Once the virtual elements are placed unto the workspace, the environment or scene provided in the workspace may be shared between users.

The preceding examples describe one exemplary implementation of mapping a workspace to a surface in the user's environment. However, a workspace does not need to be mapped to a surface in the real world Environment. In some implementations, certain operations from the processes describe above may be omitted to provide a workspace that includes any virtual space or volume with spatial 3-D coordinates that is sensed and/or mapped based on input from one or more sensors to provide a virtual space where a user can interact with the virtual elements within a virtual environment or an augmented environment. For example, the workspace may map a room or a location of the client system.

Tracking the User within the Workspace

Figure 6:
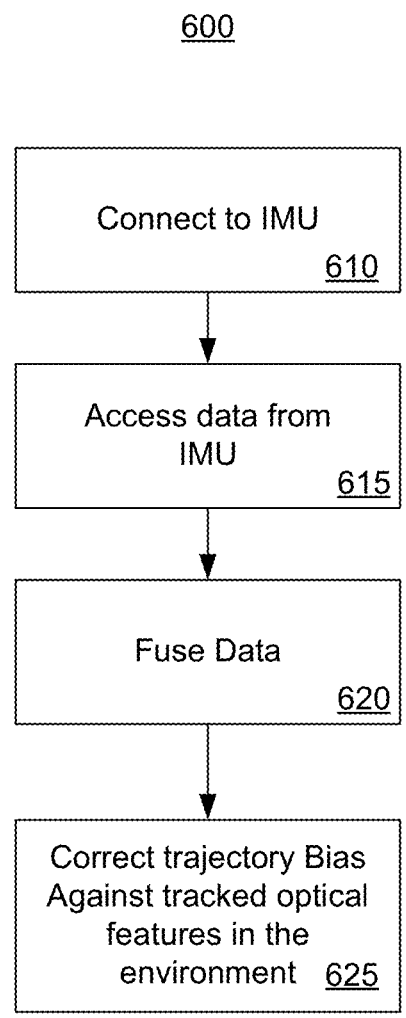
FIG. 6 is an example of a process flow for IMU data processing.
Figure 7:
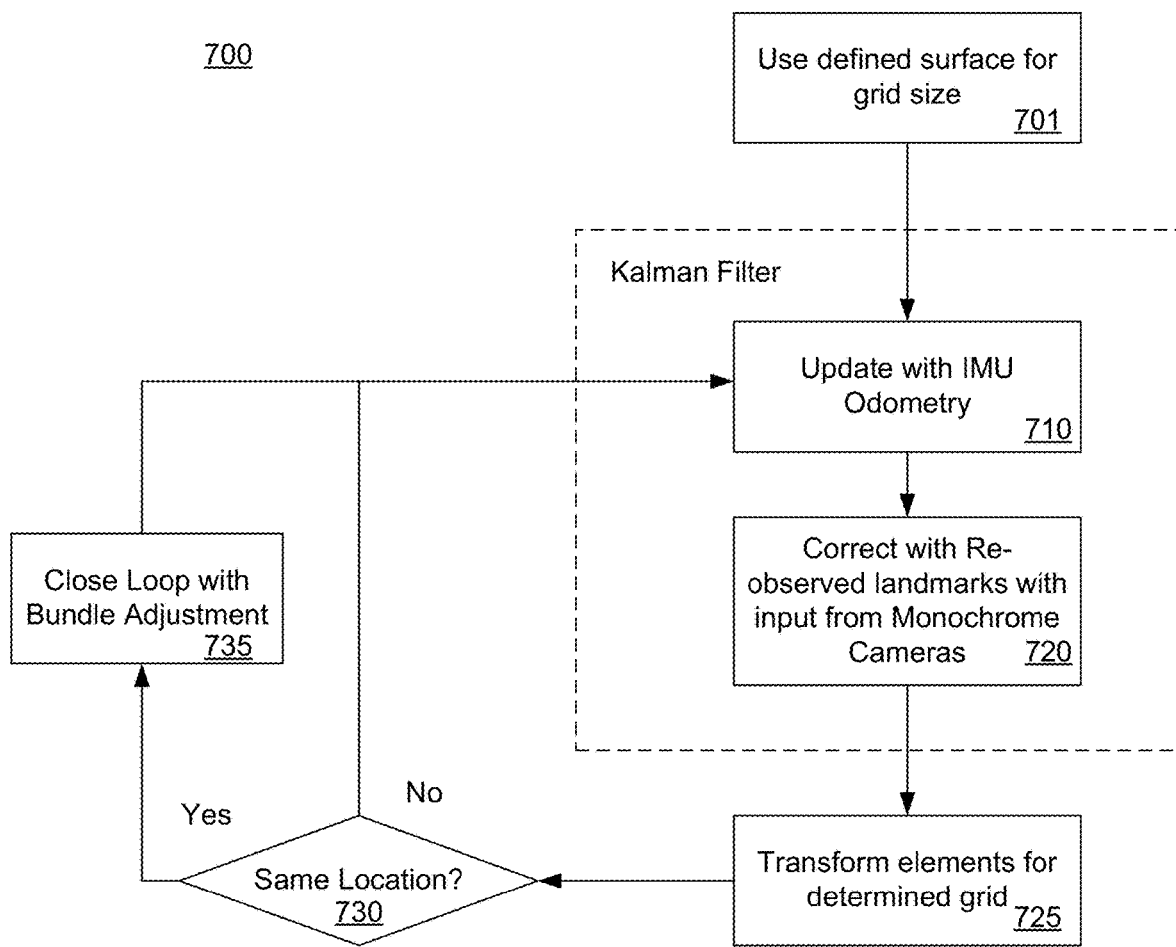
FIG. 7 is an example of a process flow for localization.

Once a workspace is mapped to an environment, a user's position relative to the workspace is determined in a process referred to as localization. FIGS. 6 and 7 provide examples of process flows used for localization. During a communication session (e.g., a sharing of a workspace between users whether in real time or asynchronously), the user's position is determined relative to the workspace so that the view of the workspace may change as the user moves in their real environment. During a live or real time communication between two or more parties, this process of localization is happening simultaneously with all parties connected to the session.

FIG. 6 is an example of a process follow 600 for localization using the Inertial Measurement Units (IMU) Data Processing. As shown in FIG. 6, in operation 610, the client system connects to the IMU, and in operation 615 the client system accesses data feed to supply input to a sensor fusion algorithm. In operation 620, the client system applies a sensor fusion algorithm to the IMU data to create six degree of freedom (6DOF) tracking of the user in the environment. In operation 625, the client system uses the output of the sensor fusion to correct the trajectory bias by combining it in a Kalman Filter against tracked optical features in the environment.

Once the client system establishes the IMU feed, the process 700 shown in FIG. 7 is used to calculate a user position and trajectory. In one example, (Oriented FAST and Rotated BRIEF) ORB, Simultaneous localization and mapping (SLAM) processes are used to perform these calculations.

In operation 701, the user defined grid surface for the calculated grid size is provided to the Kalman filter. In operation 710, the filter is updated with the IMU odometry. In operation 720, a SLAM process corrects the re-observed landmarks with input from the monochrome cameras. In operation 725, the output from the Kalman filter is used to transform the elements for the determined grid. In operation 730, it is determined whether the user is in the same location. If yes, the operations 710, 720, and 725 are performed. If no, operation 735 is performed to close loop with bundle adjustment. For example, if a user walks around a location such as a building and returns to a room (their office), the client system recognizes that they are back in the office. The client system then "closes the loop", which means that the client system adjusts the map of the whole building so that the user starts and ends in the same spot, creating a closed loop. This is an iterative process, so the process may be repeated throughout the session.

With the processes of FIGS. 6 and 7 running constantly in the background, the client system can track the user across the workspace environment.

Sharing Virtual Elements

In some implementations, as described above, a virtual element may be any shape rendered as a virtual 3-D image by at least one light source of the client system, such as a one or more of displays, projectors, or other imaging components in conjunction with optics to create a visible virtual image of the shape within a virtual 3-D space. Each virtual element may have associated content and a number of assigned parameters to model the properties and behavior of the virtual element in a virtual 3-D interactive space. The content and parameters are provided as input to the model to render the virtual image and determine the behavior of the element within the virtual 3-D space.

In order to send, transmit, and/or share a virtual element, the client system maps a share volume or bounding volume. In one example, a share volume includes a defined 3-D space or volume located within the virtual 3-D space, such as, for example, a workspace. The volume may be used to trigger sending or sharing of virtual elements. Similarly, a receive volume may be populated with virtual elements received from other client systems. In one example, the share and receive volumes are a rectangular bounding box. The following examples describe the use of a bounding box as the volume; however, the box is merely illustrative and any defined volumetric shape (e.g., a cube, a sphere, a cylinder, a polyhedron, or other complex and/or non-linear shape) may be used in accordance with the descriptions provided herein. For example, other volumes may be used in any particular implementation, for example, based on the context, application, or implementation within a 3-D virtual space.

In some implementations, the share volume may be used to facilitate the transfer of a virtual element from one virtual space to another virtual space forming a virtual "wormhole" between virtual workspaces through which the virtual element "passes." In some implementations, a receive volume may be used to form a receptacle to which the transferred virtual element is deposited within the virtual space after transfer.

In some implementations, when a user wishes to send or transfer a virtual element, the user may move or otherwise manipulate the virtual element so that one or more conditions are met within the 3-D workspace with relation to the share volume. For example, one condition may be the virtual object's location relative to a position (e.g., virtual coordinates of the 3-D space) of the share volume or bounding volume. In this example, the client system may determine whether the virtual element has been placed or positioned within the bounding volume defined by the share volume. This positioning may be used as a trigger to start the sharing process. In some examples, placing the virtual element within the share volume may require scaling a size of the virtual element to fit within the volume. Other conditions also may be used. For example, the combination of one or more manipulations may be used. In one example, engaging (e.g., a selection or a grab input) a virtual element, moving of the virtual element to be located within the share volume, and disengaging (e.g., a deselection, a drop, or a release input) of the virtual element within the share volume may be used as a condition to trigger the sharing process. Once the virtual element has been shared, rendering of the virtual element within the workspace may cease. In some implementations, the virtual element descriptor, data, and any associated files are removed from the client device in response to sending or sharing the virtual element with another. In this example, the virtual object more closely models a real world object that can only exist in one place at a time.

In some implantations, the share volume may be configured prior to sharing with a specific identification of the destination of the virtual element. In one example, the identification may be an ID or descriptor of another user, client system, or workspace. In some examples, possible identifications may be selected from a file or user contacts. In other examples, a user avatar or other visual indication in conjunction with a share volume may be used to select a destination to which the virtual element is to be sent.

In one example, special properties, interactive boundaries or force fields may be associated with the share volume using primitives of the share volume. For example, in order to record or conform user intent to share, the client system "listens" for a 3-D virtual element being pushed into the sharing bounding box. Relying on system physics modeling, an interactive boundary of the share volume may have an associated a force field with a repellant charge relative the virtual element. As a result, when 3-D virtual element approaches the bounding box, greater effort (force) is required to break the plane of the box and trigger the sharing process. To the user of the workspace, this may simulate friction, to help reduce false positives of virtual element being moved to the bounding box (e.g., preventing unintentional sharing of a virtual element.

The receive volume may be used to receive the virtual element shared from another virtual space. In this example, the virtual element may be rendered as being located within a receive volume indicating transfer or receipt of the virtual element. In some implementations, the scale of the virtual element is adjusted to fit within the receive volume. The user may remove the virtual element from the share volume into the 3-D virtual space to use and manipulate the virtual element.

In one example, removal of the virtual element from the receive volume indicates the acceptance of the virtual object to the communications system. In one embodiment, the virtual element may initially be rendered using a low fidelity model of the virtual element, and upon extraction of the low fidelity virtual element from the volume, the high-fidelity version of the virtual element is rendered for use and manipulation within the workspace. In another example, the virtual element descriptor and/or associated data and files used to render the virtual element may initially be stored in a temporary folder, cache, or memory of the client system, and upon extraction the virtual element descriptor and/or associated data and files used to render the virtual element may be stored or copies to a permanent location of the client system. In another embodiment, the virtual element placed into the share volume may persist in the share volume until the user intended for receipt (or the user who initially placed the virtual element into the share volume) either removes it from the share volume, or refuses or cancels the transfer.

In some implementations, the share volume and receive volume may be the same volume. In some implementations, the share volume and the receive volume may be separate volumes. In some implementations, the share volume and receive volume may have the same or different dimensions and/or shapes.

Holographic images or avatars of other users of client devices also may be presented as virtual elements within the 3-D space during a sharing session.

The share or receive volume may have an associated visual image or other visual indication to aid a user in location of the volume within the virtual space. For example, some of the implementations below use an image of a virtual sharing pedestal as a visual cue to indicate the location of a share volume. Similarly an image of a virtual shelf as a visual cue to a user to indicate the location of a receive volume. The visual image of the share location may include a visual indication of the destination of the virtual element being shared. Likewise, in some implementations, the indication of the receive volume may include a visual indication of the sender of the virtual element being shared. In these examples, the volume itself is not visible to the user. Moreover, the images of a pedestal and shelf are illustrative and other images and shapes may be used.

Some examples of implementations of virtual elements that may be used in a virtual 3-D space include one or more virtual frames. A virtual frame may be thought of as a canvas on which content may be rendered (e.g., example like a virtual display or window). Content may be mapped to the virtual frame from any application that can rendered as output to a display. For example, communication applications, such as a web browser, an instant messaging application, and web/video conferencing applications and the like may be mapped to one or more frames to create one or more virtual displays within the workspace for presenting a web page; a chat window, a message window with timeline, and a web/video conference window, as explained in more detail below.

One example of a virtual 3-D space is a workspace. A workspace may be useful to help a user organize virtual elements into a desired or preconfigured orientation. The workspace defined as any spatial volume that is mapped to the user's real world environment. Some examples herein describe the mapping of a workspace to a particular surface or location; however, one skilled in the art will appreciate that the sharing processes and systems described herein can be used in used in conjunction with any mapped virtual 3-D space or volume. In addition, a workspace may be implemented according to a number of configurations and/or orientations, such as a flat surface, a curved surface, multiple surfaces, a location such as a room, or a spatial volume.

FIG. 8A is an example of process flow for a client system to send or share virtual elements. In operation 801, the client system sends a communication to server system. For example, the client system may send information to establish a session with a server system. In operation 803, the client system establishes a communications session through the exchange and authentication of credentials. In operation 805, the client system configures a share or bounding volume within a 3D virtual space. For example, a user provides an indication of one or more destinations, client devices, and/or users to which any virtual element placed in the volume may be shared. The volume configuration may be made in conjunction with a contract list or one or more avatars. In addition, the volume may be reconfigured to change an indication of one or more destinations, client devices, and/or users to which any virtual element placed in the volume may be shared. In operation 807, the client system determines whether a virtual element has been placed in a share or bounding volume with conditions to trigger sending the virtual element. For example, the client system determines whether the spatial coordinates of virtual element with the virtual space are within the volume. In some implementations, scaling of the virtual element via input to the client system to fit the virtual element within the bounding volume may be performed prior to placing the virtual element within the share volume. In some implementations, a trigger input may be received by the client system in conjunction with the placement of the virtual element within the volume, such as a disengage, a deselect, a drop, a release input (e.g., sensing the hand of a user making an input, such as a release or drop gesture). In operation 808, the client system generates a communication, a transmission, or a message to server system. In operation 809, the client system attaches the virtual element or otherwise places the virtual element within the communication, transmission, or message. In operation 810, the client system sends the communication including the virtual element to the server system. For example, the client system formats the communication, transmission, or message according to an interface and type of medium in which the communication is being transmitted, and transmits the communication, transmission, or message to the server system. In operation 811, the client system decides whether the user needs to reconfigure the share volume for another destination. In operation 812, the client system determines whether the user of the workspace rendering application has ended and/or if the session with the server system is expired.

FIG. 8B is an example of process flow for a server system receiving virtual elements. In operation 815, the server system receives a communication request from a client system to begin a session or otherwise communication with the server system. In operation 817, the server system establishes a session and/or authenticates the client device. In operation 819, the server system monitors for a communication, transmission, or message including a virtual element from client system. In operation 820, the server system receives the request, communication, transmission, or message to share, send, or transmit a virtual element with another client system or destination. In operation 821, the server system determines the destination or entity to which virtual element is addressed. In operation 822, the server system stores the virtual element for the entity in database of the server system. In one example, an optional operation 823 may be implemented by the server system to provide an indication to the entity to which the virtual element was addressed that the virtual element is available for retrieval. For example, an instant message, email, or indication may be generated. In operation 825, the server system determines whether the session has expired. If it has the session ends. If not, the server continues to monitor for communication from the client system in operation 819.

FIG. 8C is an example of process flow for a client system to receive virtual elements. In operation 827, the client system sends a communication to the server system. For example, the client system may send information to establish a session with a server system. In operation 829, the client system establishes a communications session through the exchange and authentication of credentials. In operation 830, the client system determines whether one or more virtual elements are available for download from the server system. In operation 831, the client system receives one or more communications, transmission, or messages that include one or more virtual elements available to be received from the server system. In operation 833, the client system stores the received one or more virtual elements in a local storage accessible by the client system. In operation 835, the client system displays the virtual element in the 3D virtual workspace. For example, the client system may model and render the virtual element within a receive volume of the recipient's workspace. In operation 836, the client system determines whether the user of the workspace rendering application has ended and/or if the session with the server system is expired. If not, the client system continues to monitor or determine whether one or more virtual elements are available for download from the server system, in operation 841.

FIG. 8D is an example of a process flow for a server system to distribute virtual elements. In operation 837, the server system receives a communication request from a client system to begin a session or otherwise communication with the server system. In operation 839, the server system establishes a session and/or authenticates the client device. In operation 843, the server system determines whether there are any virtual elements available for client system. If any virtual elements are available, in operation 844, the server system retrieves the virtual element(s) from the database. In operation 846, the server system sends virtual element to client system. For example, the server system formats a communication, transmission, or message according to an interface and type of medium in which the communication is being transmitted, and transmits the communication, transmission, or message to the client system. In operation 848, the server system determines whether the session has expired. If it has the session ends. If not, the server continues to monitor for communication from the client system in operation 841. For example, the server system can monitor for pings from the client system and determine whether there are any virtual elements available for client system.

Figure 8E:
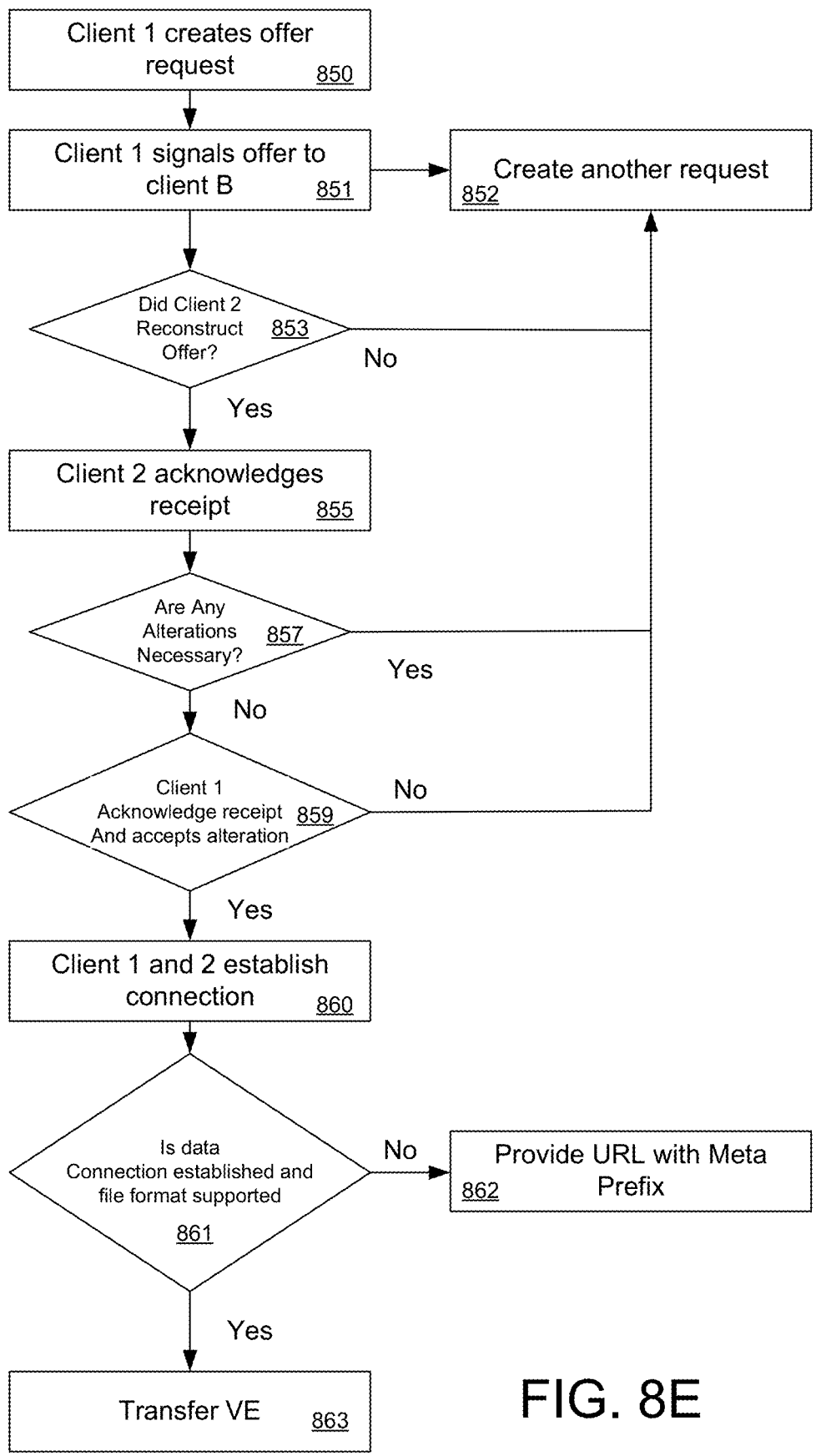
FIGS. 8E, 8F, and 8G are examples of process flows for sharing virtual elements in various communication environments.

FIG. 8E illustrates one example of a process for use by the communications system in FIG. 1 for a synchronous sharing session.

In one embodiment, any client system participating in a sharing session establishes a network connection. A host client (e.g., referred to in this example as Client 1) initiates the session by creating an offer request (850). The offer request includes information or data that is used by the client systems to establish a peer-to-peer link. For example, the request may include data specifying which channel(s) that Client 1 is requesting to use during the session (e.g., audio/video and data), as well as the file formats that are to be used to exchange data.

Client 1 communicates or signals the offer to all client systems participating in the session (e.g., client 2) (851). In one example, the signaling between client systems is handled via a third party (not shown), such as, a java script (JS) server.

Having established a network connection, Client 2 listens for offers and attempts to reconstruct any such offers (853). In other words, Client 2 determines what channels are being requested and what file formats to support during a session. If Client 2 cannot reconstruct the offer, client 1 can attempt to create another offer request (852). After acknowledging receipt of the offer, client 2 may or may not alter the offer depending what Client 2 supports (e.g., hardware and/or software) (855). For example, if Client 2 does not support certain hardware (e.g., a display capable of projecting a stereoscopic image), or software requirements (e.g., a file format in the request is not supported), then the request may not be accepted and Client 1 may create another offer request that is within the hardware and software capabilities of Client 2.

Client 2 also can propose any alterations necessary (e.g., an alternative file format) and send a request/counteroffer back to Client 1 (857). If Client 1 accepts the counteroffer (859), a connection is established across the agreed upon channels (e.g., audio, video, data) (860). If the counteroffer is not accepted, then Client 1 can create another offer request should it desire to do so (852).

Once a connection between client systems is established, the connection may be used to share virtual elements. The clients may determine whether the data connection established and file format are supported (861). The type of sharing may be predicated on the type of connection. For example, if the connection is established, but Client 2 does not support displaying of a particular virtual element, Client 1 can send the virtual element in the form of a uniquely-prefixed URL (e.g., meta:///metastore/GUID/<insertGuid>) (862).

In another example of such a connection, an HTML tag—for example, an IMG tag (e.g., <img src="xy.png" data-meta-hologram=GUID data-viral-id=UID>)—could be inserted in a chat window, email, or on a web page. In this example, a virtual frame supporting the inter-client communication presents content received from the server system in the form of a 2-D thumbnail image corresponding to the virtual element identified by the GUID. In addition, a button may rendered within such a chat window, email, or on a web page to indicate that an image has an associated virtual element that may be called and accessed by the recipient of the communication. For example, user interaction with such a button—such as, for example, a hover over the button input—results in the rendering of a message and a hyperlink. One example of a notification message that may be presented to a user if hover over the button input is detected, for example, is the message: "Your browser does not support MetaAR. To enjoy MetaAR, us an AR-compatible headset. Learn more here." As noted above, the notification message is an example of a message that could be displayed to a user to indicate that the system being used by the user does not have the necessary hardware or software components to display the 3-D virtual element in an augmented reality environment.

If the virtual element file format is supported (863), a model of the virtual element may be packaged in accordance with the format or nature of the data connection and sent to another client system (e.g., Client 2) via a peer-to-peer connection, such as that described in FIG. 1. In one example, the transfer package (e.g., a group of data packets) may include a low-fidelity model and/or a high-fidelity model including data used by the receiving client to render the virtual element within a 3-D virtual space.

It is noted that the above communication system supports transfer of virtual element to multiple client systems (e.g., multiple Client 2 systems) and that sharing may be achieved, through any means of addressing the communication: (1) between all clients that are part of the sharing session; (2) select clients; or (3) groups of select clients.

Figure 8F:
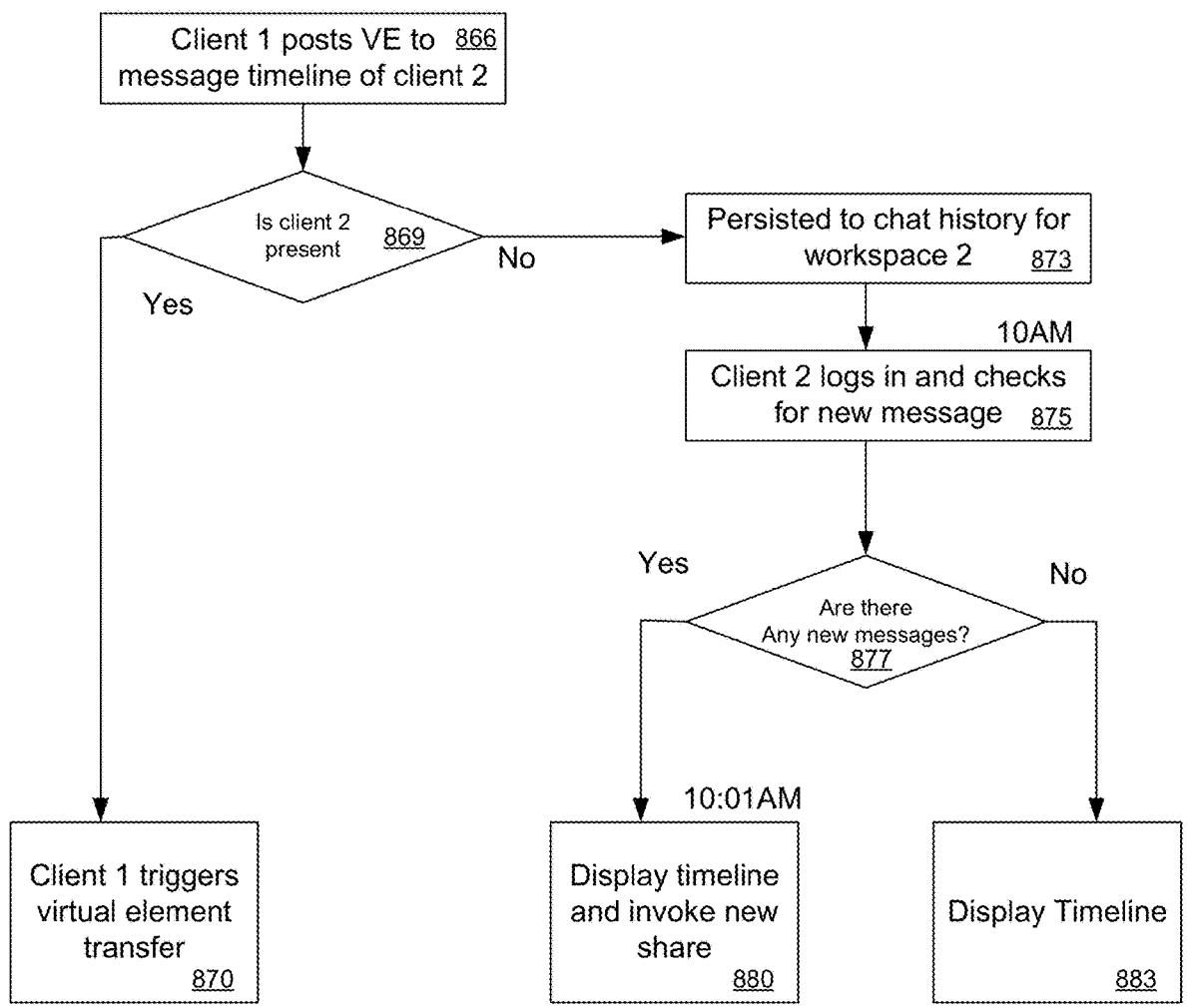

FIG. 8F shows an example of an asynchronous communication, using a chat/messenger application. For example, at 9:00 AM, Client 1 adds a virtual element to a chat timeline for sharing with Client 2 in the 3-D virtual space of Client 1 and attempts to share the virtual element (866). A determination is made whether client 2 is present (869). If the Client 2 is present (e.g., connected to the network) and accepts the offer of the virtual element (e.g., through removal of the virtual element from the sharing space), Client 1 triggers the sharing of the virtual element (870) as described above for FIG. 8A.

If Client 2 is not present (e.g., is not connected to the communications network), Client 1 publishes the message to the server system to persist the message in the chat history between the two devices (873). When Client 2 is again present (e.g., logs into the communication application or its workspace), the client system checks, receives notification, and fetches new messages from the server system (875). A determination is made whether new messages are available (877). While fetching the messages, a link to the low and high fidelity models of the transferred virtual element is passed from the server system (e.g., the MongoDB) to the Client 2. The Client 2 then accesses the model specified in the link. If no new messages are present, the client system of Client 2 displays the timeline (853). If a new message is indicated, the Client 2 displays the timeline with message and renders the virtual element for sharing in the 3-D virtual space (e.g., rendering the virtual element in a share volume) (880).

Figure 8G:
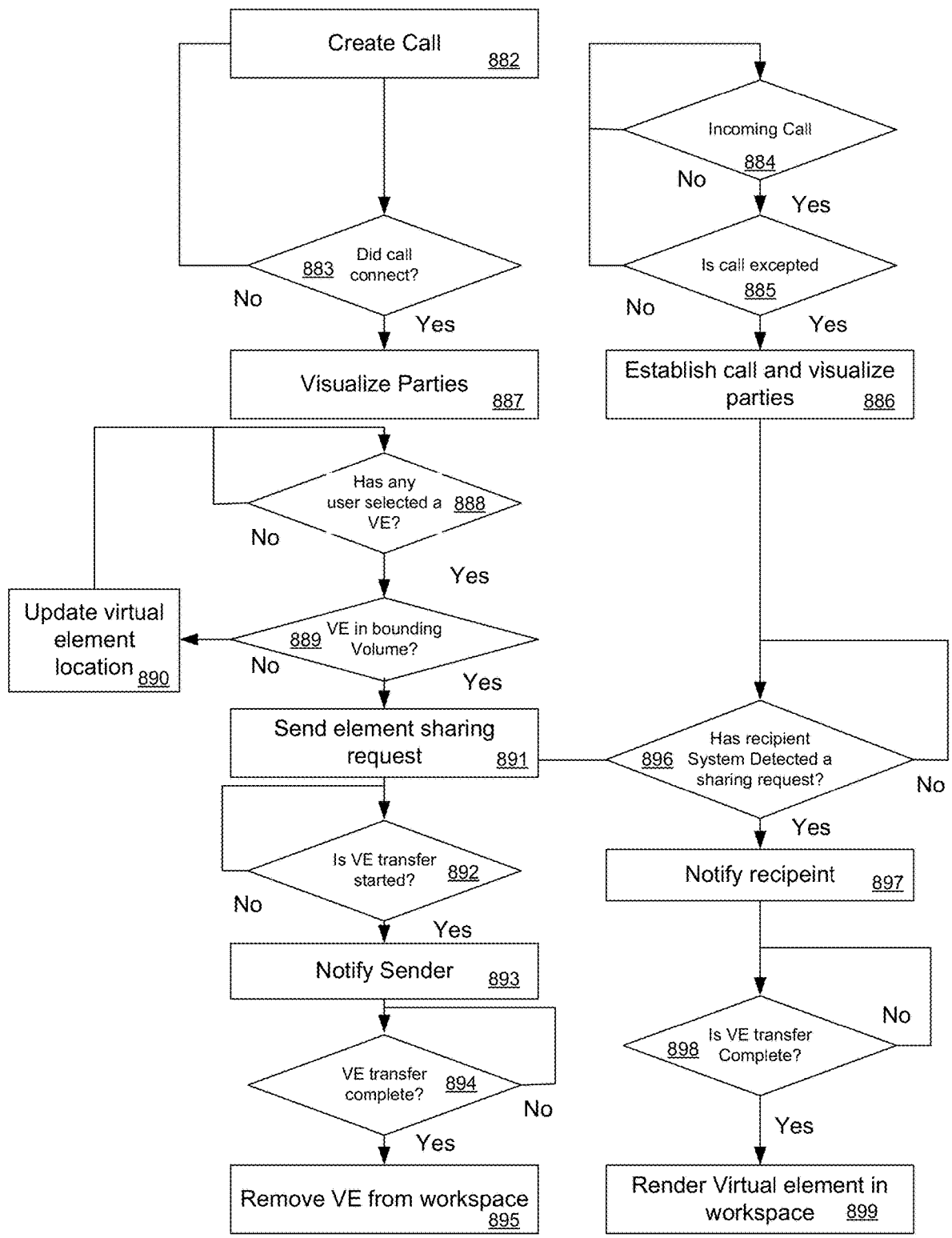

FIG. 8G shows an example of a communication session via a web conferencing application between client systems supporting the rendering of 3-D virtual elements.

As shown in FIG. 8G, Client 1 creates the call (882). Other clients (e.g., one or more clients 2) detect an incoming call (884) and can accept the call (885). If a call is connected between two or more parties (e.g., Client 1 and one or more Clients 2), the call is established via a communications link, and the parties—or representations of the parties—are visualized (863, 887, 885, and 886). In one example, the call may be visualized on a virtual frame within the virtual 3-D virtual space. For example, a video feed from each client device may be rendered within the frame of the window.

If a defined workspace is being utilized by a client system (e.g., Client 1), the client system determines whether a user is manipulating a virtual element within the workspace and renders the manipulation (e.g., applying a force or determining an input to move the virtual element within the workspace) (888). For example, the client system determines if a point cloud associated with a real world object has penetrated a force field associated with the 3-D virtual element. If there is no interaction, the client system continues to determine whether there is user interaction with the virtual element. If the client system determines there has been user interaction, the client system applies the interaction to the low-fidelity virtual element. For example, if the point cloud associated with a real world object has penetrated a force field associated with the 3-D virtual element, the system determines a force applied to the virtual element and renders the resulting application of the force (890).

The system also determines whether the user wishes to share the virtual element (889). This may be determined using a share volume virtual element within the virtual workspace. For example, the system may determine if a user has manipulated a virtual element to be located within the share volume (e.g., using a drag/release gesture of the virtual element in a position in the 3-D virtual workspace corresponding to the share volume). If so, the client system (e.g., Client 1) sends a virtual element sharing request to any client with whom the element is to be shared (e.g., Client 2) (891). The receiving client system (e.g., Client 2) detects a sharing request (896), notifies the user of the client system (897), transfers the virtual element upon acceptance of the request, and then renders the virtual element within the workspace of the recipient user (899). Once the sharing is started (892), the sharing client system (e.g., Client 1) notifies the sender (893), determines whether the transfer is complete (894), and when completed removes the rendering of the shared virtual element from the workspace (895).

Virtual Environment

FIGS. 9A-9E show examples of shared virtual environment for sharing a virtual element.

FIG. 9A shows an example of a real world user environment. In this example, a surface 900, such as the user's desk is shown on which two real world objects are placed, such as for example, a keyboard 901 and a pencil holder 902.

Figure 9B:
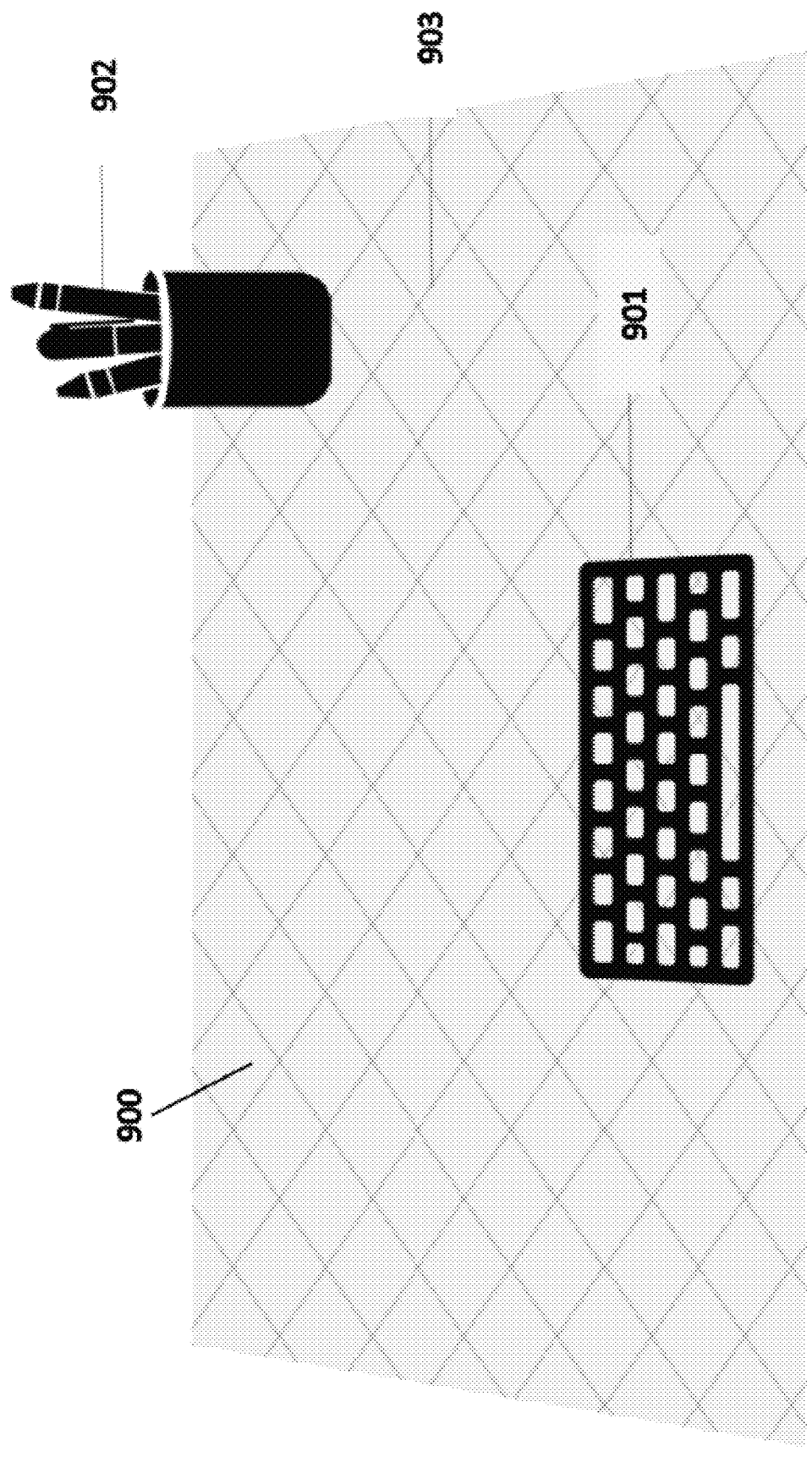

FIG. 9B shows an example of the real world environment on which a virtual grid is mapped to create a 3-D virtual workspace. The workspace may be used for collaboration. In this example, the grid 903 is generated and mapped onto the surface 900 using, for example, the processes shown in FIGS. 3-4. In this example, the grid is shown; however, the display of the grid is optional and/or an input for the client system may be used to toggle rendering of the grid on or off.

Figure 9C:
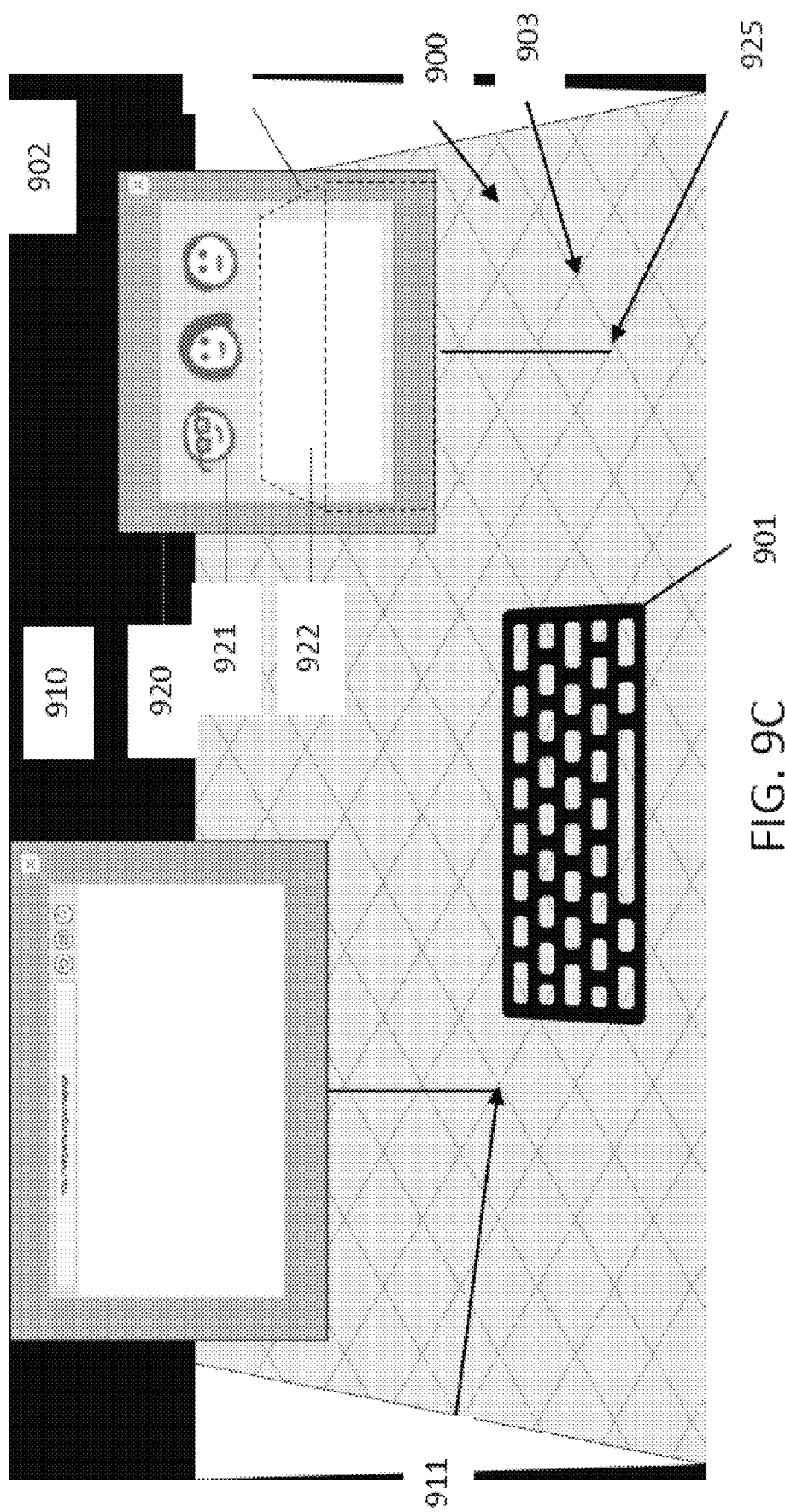

FIG. 9C shows an example of a workspace for communications from the perspective of a first user. As shown in FIG. 9C, the user environment includes a real world surface 900. Real world elements, for example, keyboard 901 and pencil holder 902 rest on the surface 900. The grid 903 has been generated by the client system and overlays the surface. The workspace includes several virtual elements. For example, a virtual frame 910 for presenting content (e.g., a browser window) is rendered in the workspace as anchored to a coordinate 911. In this example, a second virtual frame 920 presents a communication window (e.g., associated with a web conferencing application) rendered in the workspace as anchored to a coordinate 925. Although "anchored", the windows may be manipulated (as may any virtual element) to be positioned at another coordinate within the workspace. The window includes video frame 921 for three conferees using other clients, and a chat window 922. In addition, a virtual element share volume 930 is rendered in proximity to the virtual frame 920. In one example, position of the volume is linked or anchored to the rendered virtual frame 920. For example, the volume defined by the bounding box is positioned spatially adjacent to the frame 920 within the 3-D workspace.

Figure 9D:
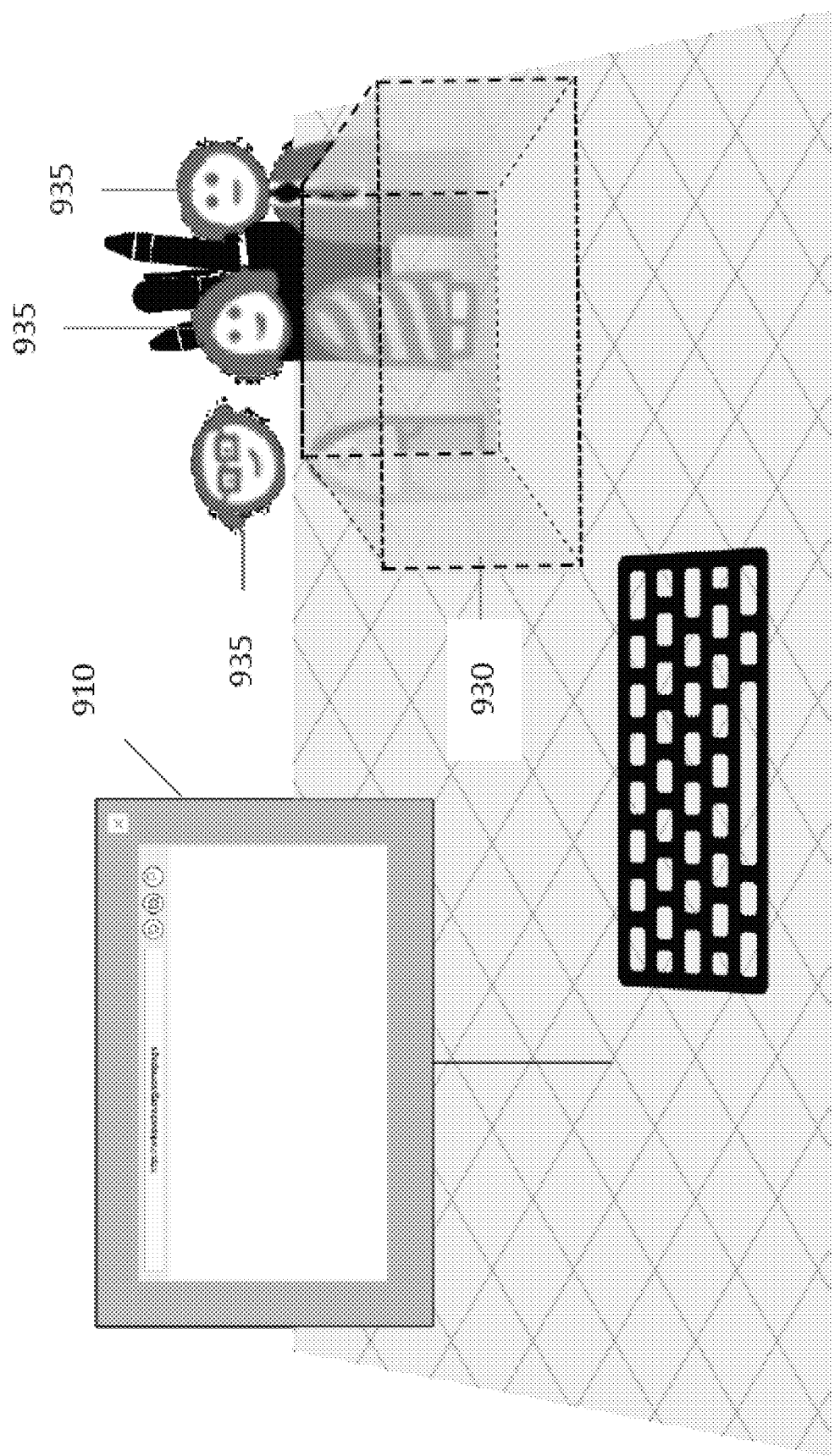

FIG. 9D shows an example of a workspace for communications from the perspective of a first user. This example is similar to that in FIG. 9C—however, instead of frame 920, each of the users is represented using a virtual element 935, such as a hologram or another virtual representation of or associated with the other users participating in the communications. The hologram may be used to simulate the presence of a user and support or simulate "handing" off a virtual element or receiving a virtual element from the hologram into the workspace. In this example, the share volume may be associated and positioned in relation to the hologram. In one example, the positioning may be used to simulate the hologram handing the virtual element to the receiver of the virtual element when the virtual element is received. In this example a single share volume 930 is shown; however, multiple share volumes may be used. For example, a share volume may be associated with each user and positioned in relation to the user's hologram. The share volume may then be used to share virtual elements directly with the user or to present virtual elements as they might be received or delivered from a particular user. A toggle input may be provided to switch between a universal share volume (e.g., for sending and receiving virtual element to the entire group) and individual share volumes associated with a particular user participating in the communication session.

Figure 9E:
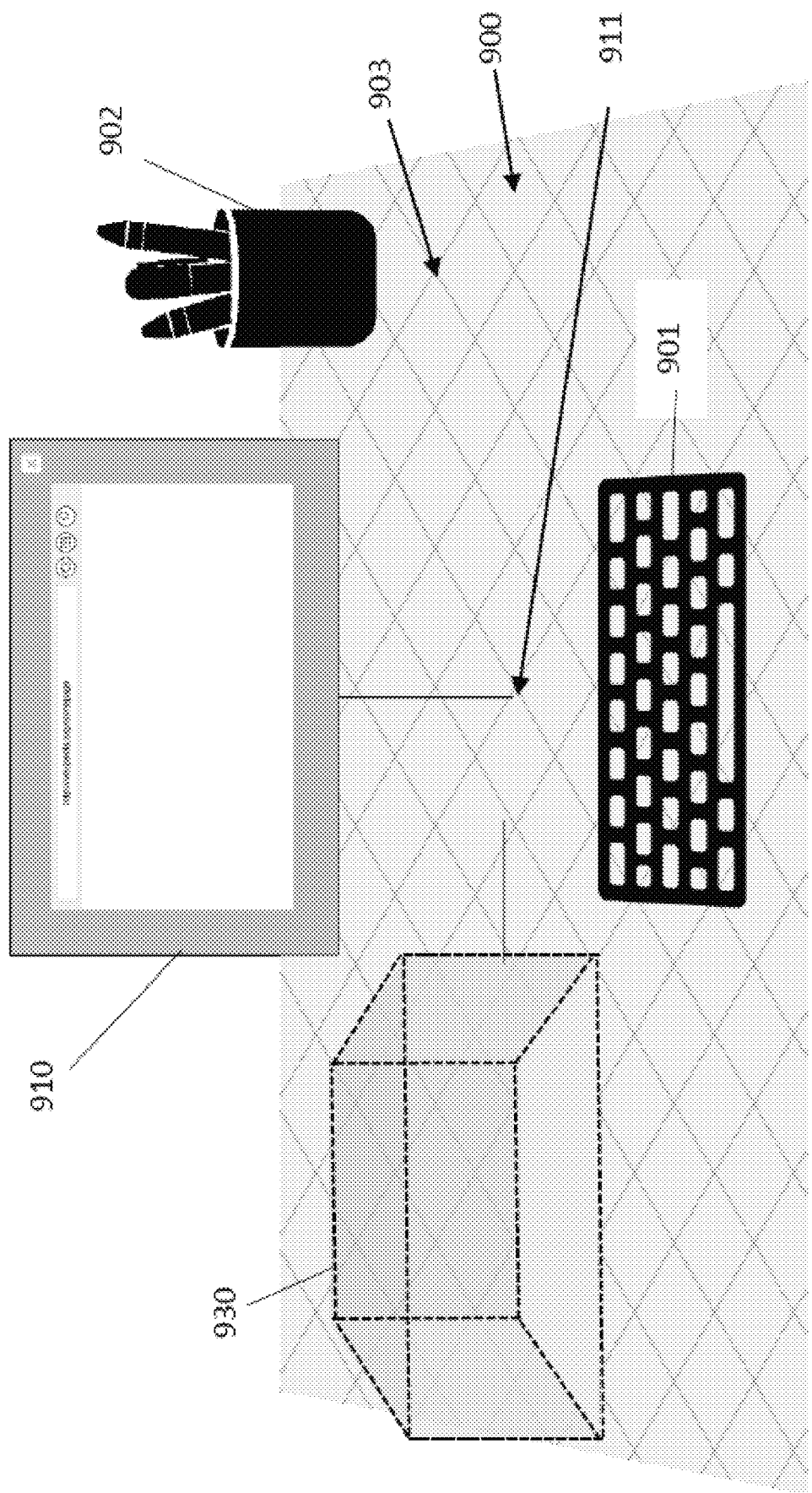

FIG. 9E shows an example of a 3-D workspace for communications. As shown in FIG. 9C, the user environment includes a real world surface 900. Real world elements, for example, keyboard 901 and pencil holder 902 rest on the surface 900. The grid 903 overlays the surface. The workspace includes two virtual elements. For example, a virtual frame 910 for presenting content (e.g., a browser window) is rendered in the workspace as anchored to a coordinate 911. In addition, a share volume 930 is rendered. In this example, the share volume may be positioned within the workspace to act as an inbox for virtual elements that are shared with the user of the workspace. The inbox may be useful in asynchronous applications. For example, in response to receiving an email with an embedded virtual element, upon opening of the email, a low-fidelity virtual element may be rendered in the bounding box for extraction by the user into the workspace.

Figure 9F:
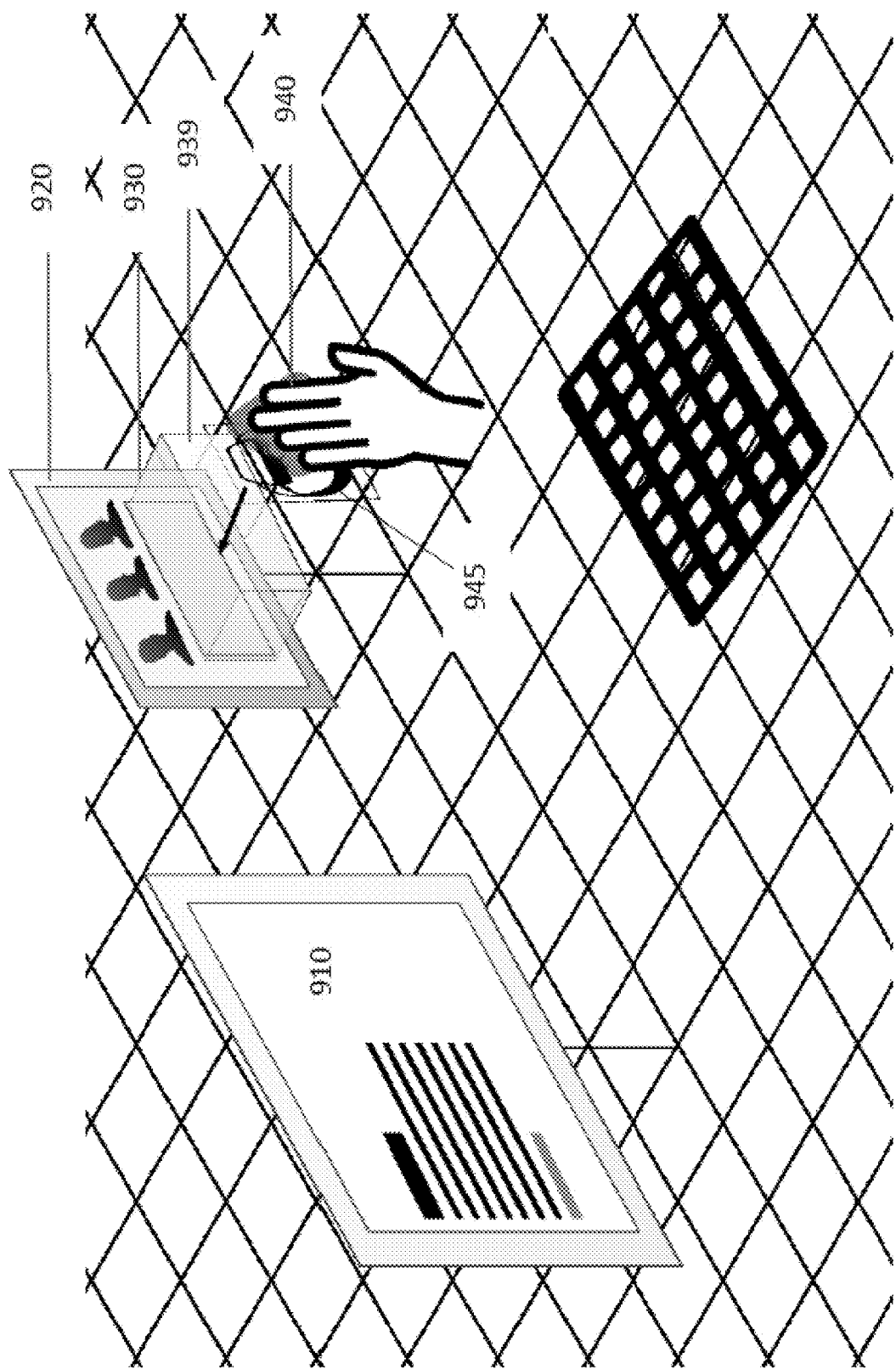

FIG. 9F shows an example of a 3-D workspace for communications in which a virtual element 945 is being manipulated into a share volume 930 tethered to frame 920 by a user's hand 940 applying forces to push the virtual element 945 into the volume to trigger sharing of the virtual element with one or more of the individuals shown in the frame 920. In this example, a force field may be applied to one or more surfaces 939 of the bonding box to simulate friction, as described above, to prevent accidental sharing.

FIG. 9G shows an example of a 3-D workspace for communications in which the virtual element 945' has been shared by the user of another client system participating in the communications, represented within frame 920. In this example, a low fidelity virtual element 945' is rendered in the share volume 930.

Figure 9H:
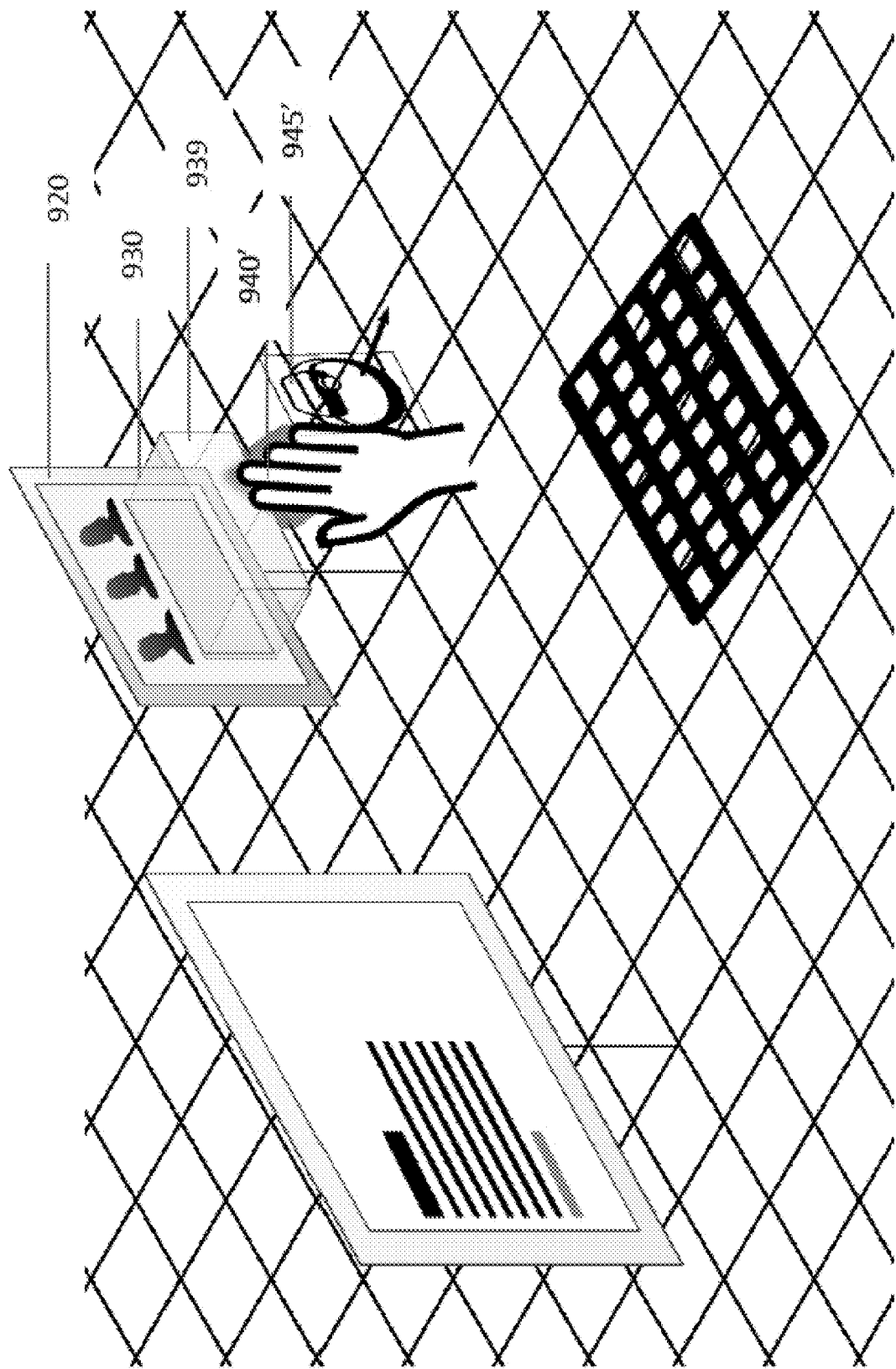

FIG. 9H shows an example of a 3-D workspace for communications in which a virtual element 945' is being extracted from the share volume 930 by a user's hand 940' applying forces to push or move the virtual element 945' out of the volume, which can trigger rendering of the high-fidelity virtual element within the user's workspace. For example, the client system may use the volume as a virtual boundary to control rendering of the high-fidelity virtual element. In one example, if the user's interaction moves the low-fidelity virtual element relative to a boundary of the volume, the interaction may be used as trigger to render the high-fidelity virtual element within the virtual workspace. For example, if the user's interaction moves the low-fidelity virtual element outside of the boundary or a portion of the low-fidelity virtual element (e.g., a percentage of the rendered low-fidelity virtual element) outside of the volume boundary, the rendering process of the high-fidelity virtual element may be commenced. In another example, a defined complex user interaction (e.g., a combination of several events) may be used as the trigger rendering of the high-fidelity virtual element. For example, the complex user interaction may be a "grab" action to move the low-fidelity virtual element outside of the volume and a "release" action outside of the volume to trigger rendering of the high-fidelity virtual element. The grab and release acts as a form of affirmative acceptance of the object preventing, for example, accidental acceptance into the workspace environment.

Figure 9I:
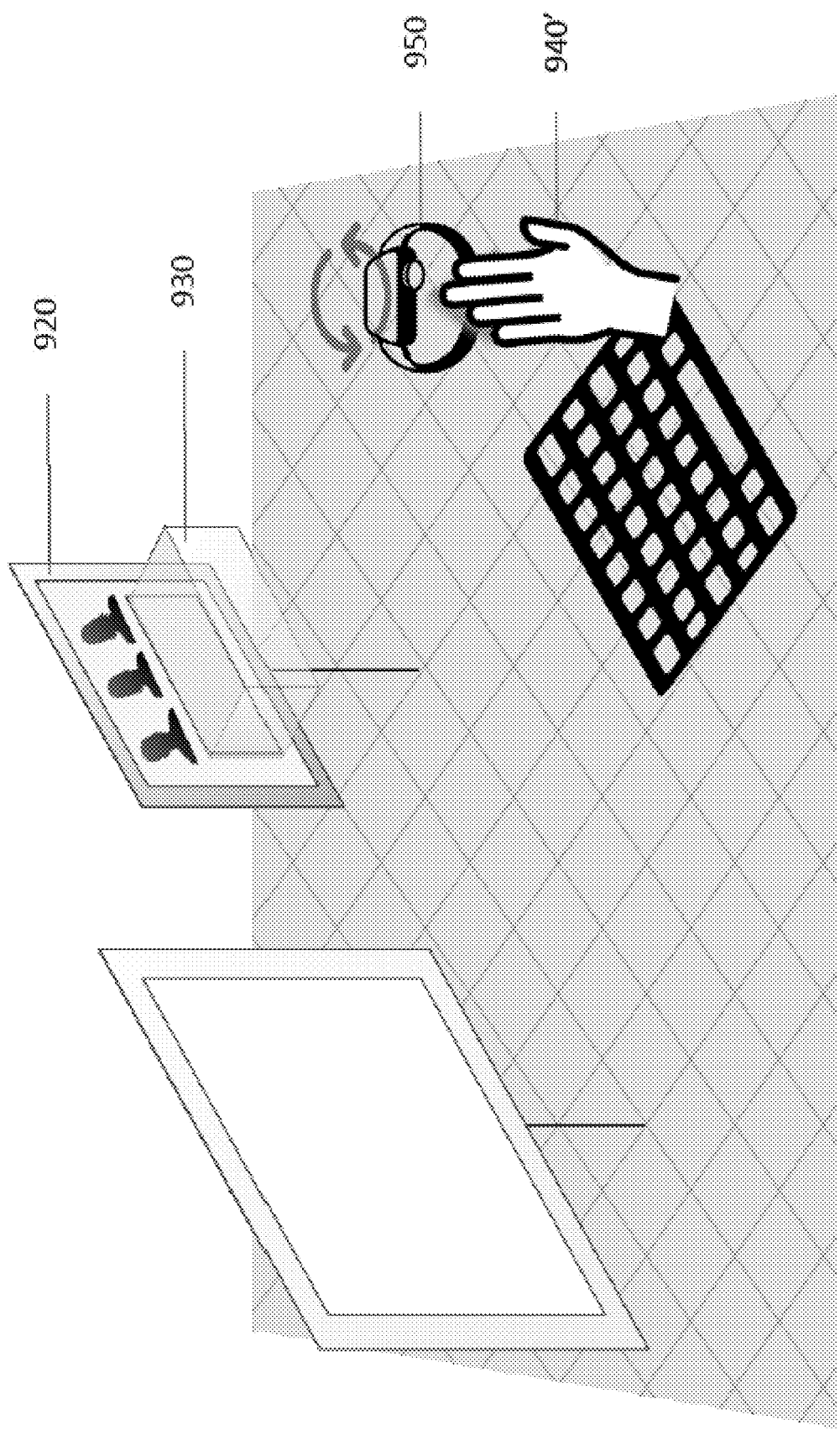

FIG. 9I shows an example of a 3-D workspace for communications in which the high-fidelity virtual element 950 has been completely removed from the share volume 930, rendered in the workspace and is being manipulated by the user's hand 940' through the application of forces to rotate the virtual element 950.

Figure 9J:
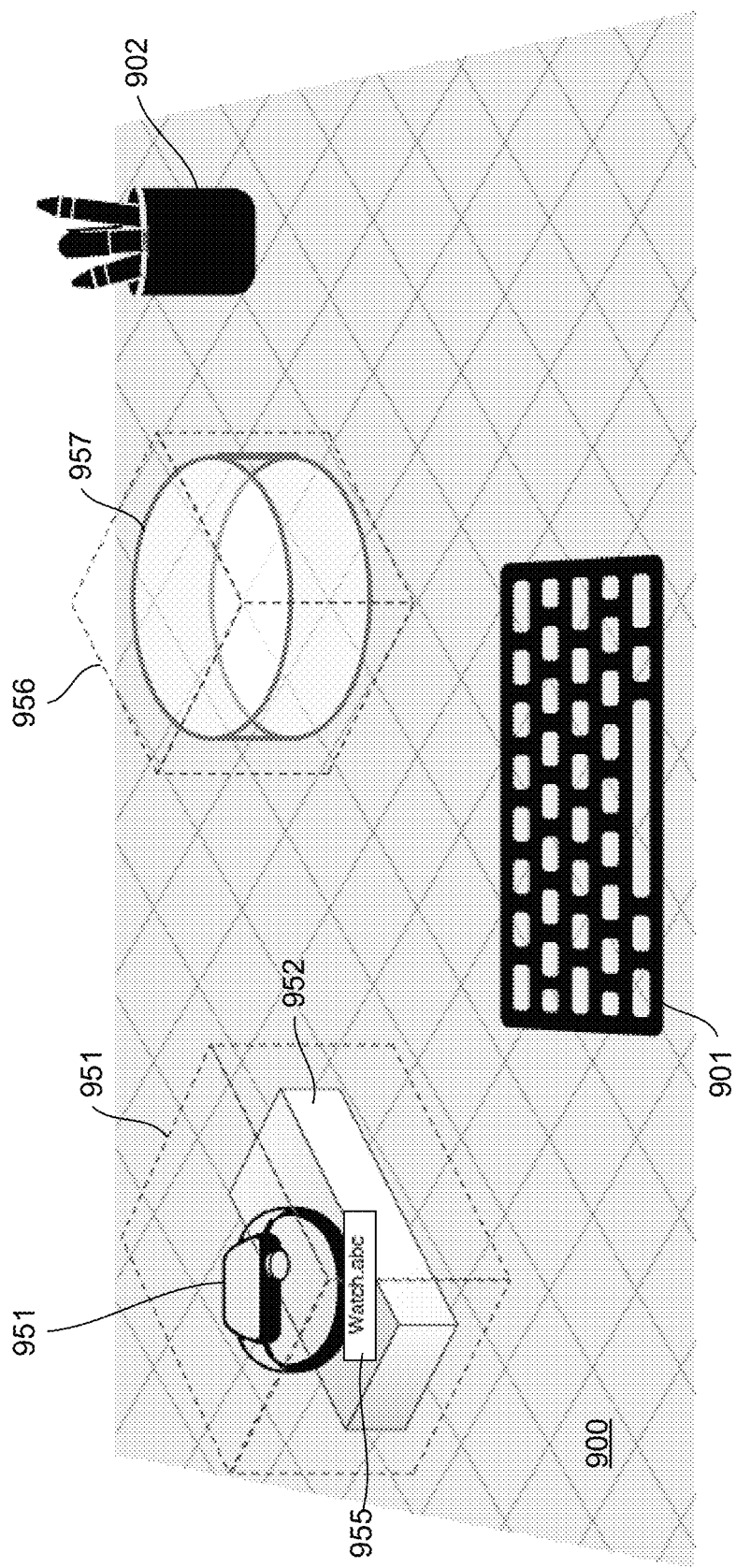

FIG. 9J shows an example of a 3-D workspace for sharing a virtual element. In this example, a surface 900, such as the user's desk is shown on which two real world objects are placed, such as for example, a keyboard 901 and a pencil holder 902. The workspace includes a local storage volume 951 including a visual indication of the volume 952, such as a virtual shelf. A virtual element 954, such as a model of a watch is shown placed on the shelf with in the local storage volume. A visual indication of an identifier 955 (e.g., "watch.abc") of a virtual element descriptor and/or file used by a model to render the virtual element within the workspace is shown. The workspace also includes a share volume 956 with a visual indication 957 of the share volume, such as pedestal.

Figure 9K:
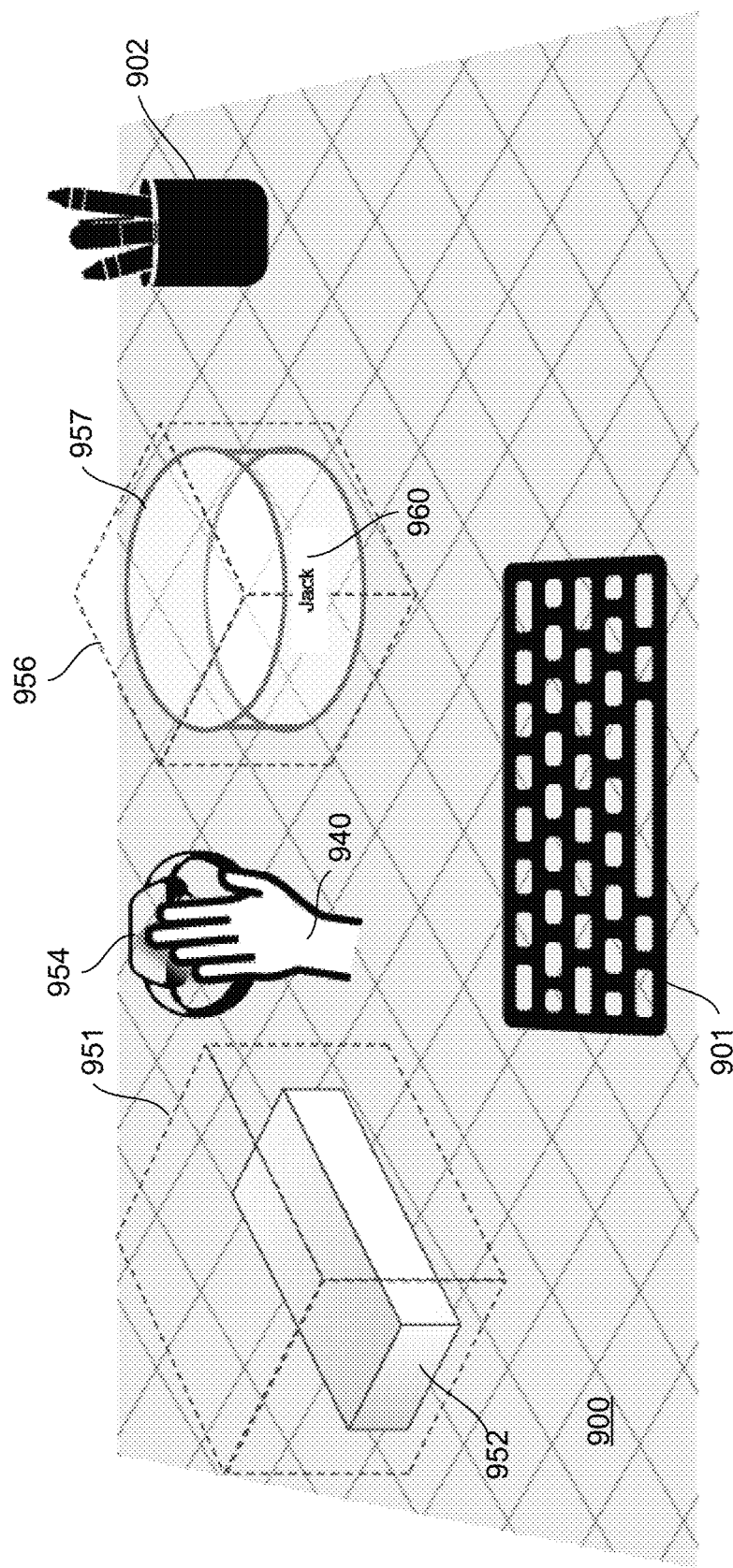

FIG. 9K shows an example of a 3-D workspace of FIG. 9J wherein a user's hand 940 has engaged or selected the virtual element 954 from the shelf to manipulate the virtual element within the workspace based on input from one or more sensors (e.g., remove the virtual element from the shelf and move it towards the share volume 956). The pedestal 957 includes a visual representation of an identifier 960 (e.g. "Jack") showing the pedestal has been configured to send virtual elements to a destination. In this example, the user is sending a virtual element modelling a watch to her coworker Jack.

Figure 9L:
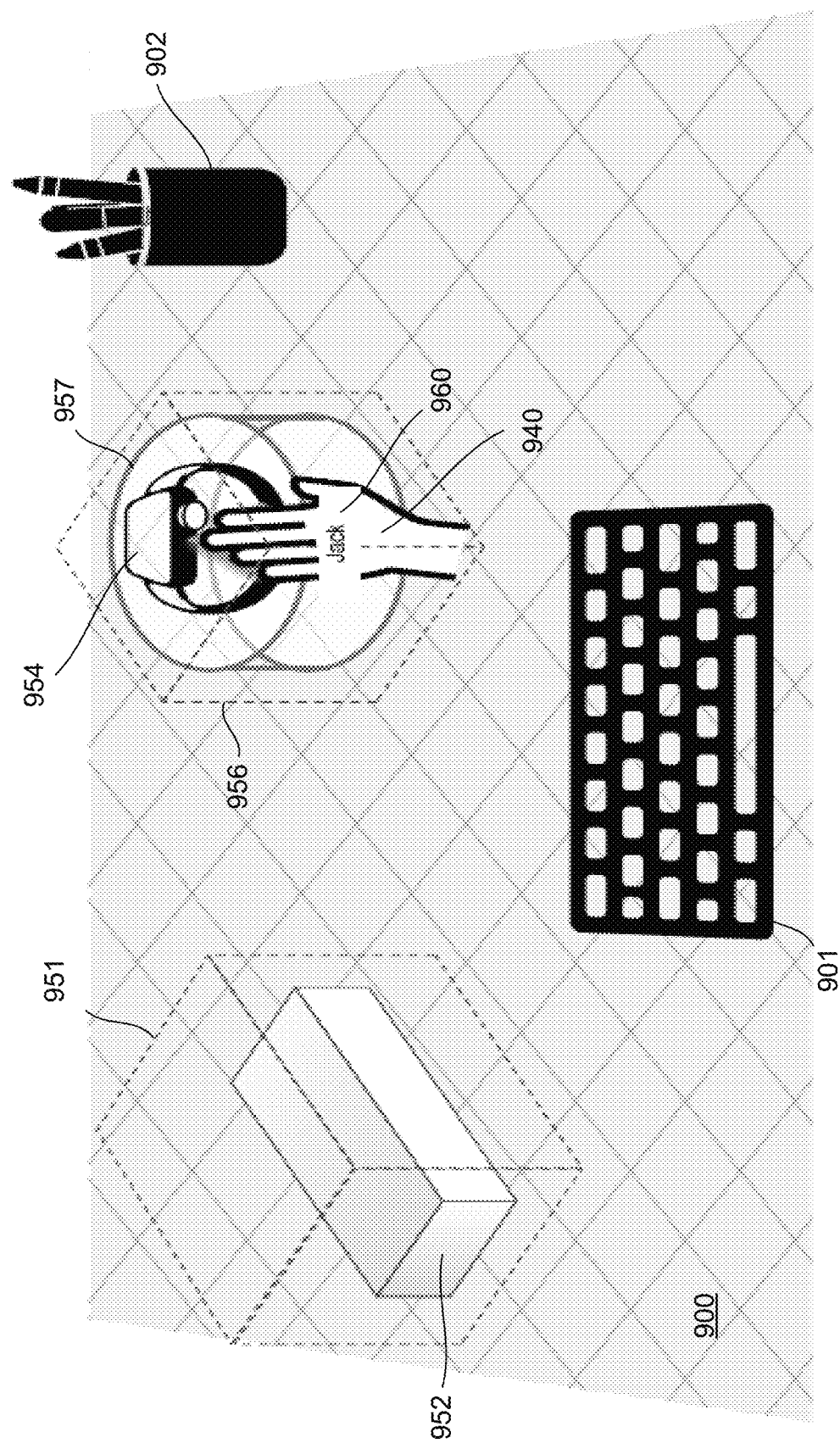
Figure 9M:
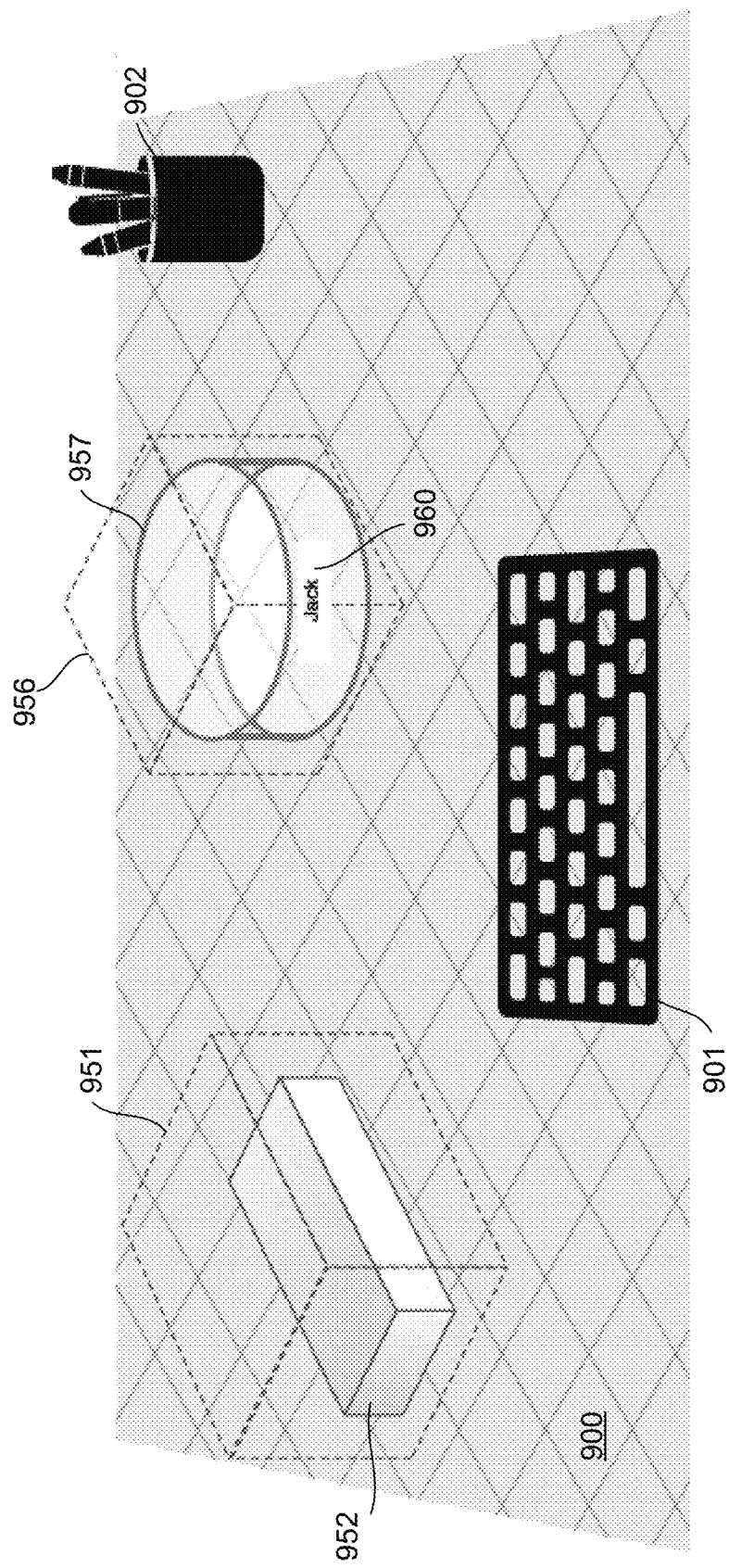

FIG. 9L shows an example of a 3-D workspace for workspace of FIG. 9K wherein the user has placed the virtual element 954 into the share volume. FIG. 9M shows an example of a 3-D workspace of FIG. 9K after the client system determines the user has disengaged the model (e.g., received an input of a release command or gesture). As shown in FIG. 9L, the virtual element 954 has been removed from the workplace.

Figure 9N:
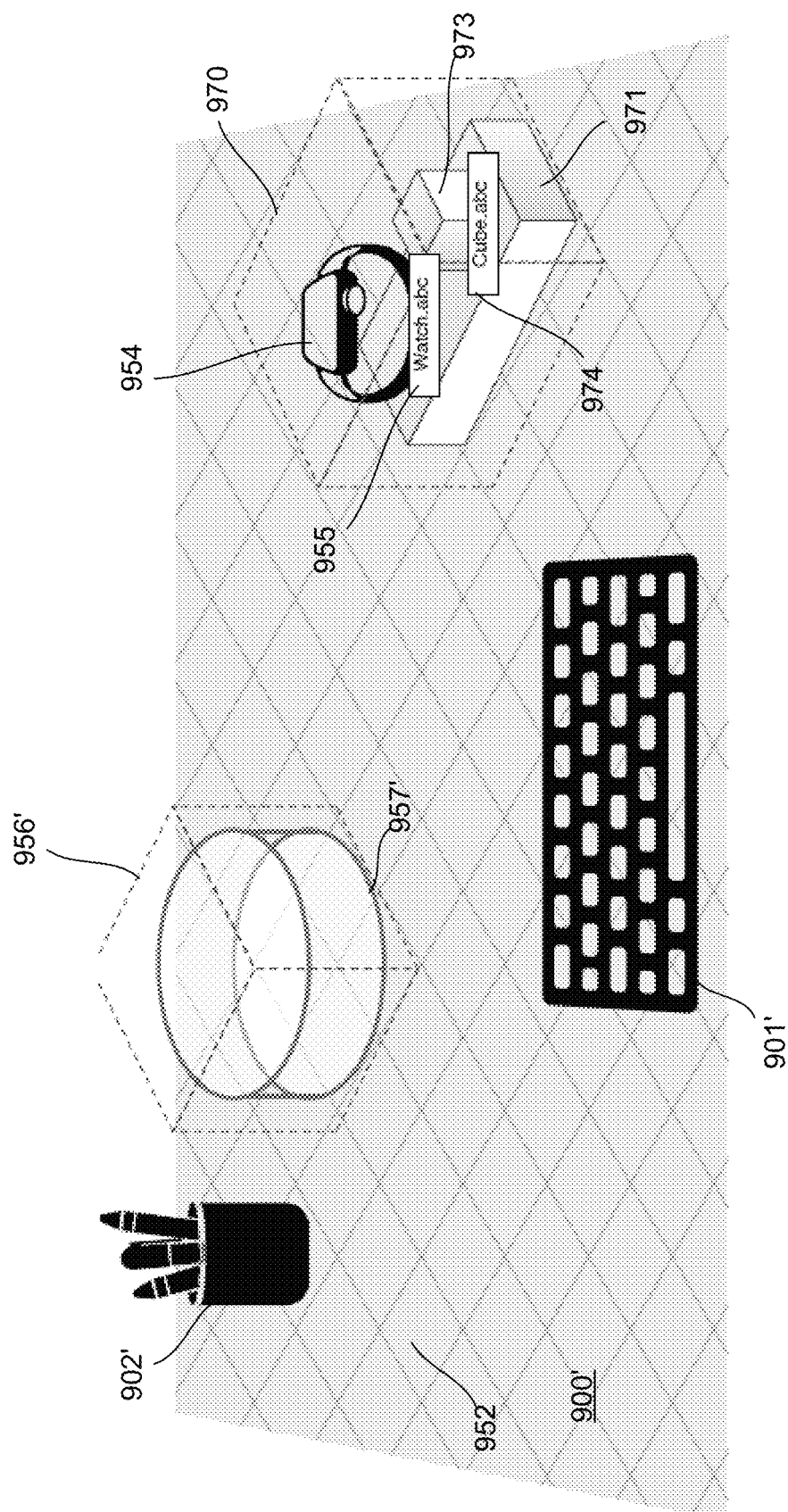

FIG. 9N shows an example of a 3-D workspace of a destination for the virtual element shared in FIGS. 9J-9M. In this example, Jack's workspace is shown. The workspace includes a real world surface 900', such as Jack's desk on which two real world objects are placed, such as for example, a keyboard 901' and a pencil holder 902'. The workspace includes a receive volume 970 including a visual indication of the volume 971, such as a virtual shelf. The virtual element 954 sent to Jack is shown placed on the shelf with in the receive volume. The receive volume also includes another virtual element 973, such as a cube. A visual indication of an identifier 955 (e.g., "watch.abc") for the watch of a virtual element and an identifier 974 (e.g., "Cube.abc") also is shown. The workspace also includes a share volume 956' with a visual indication 957' of the share volume, such as pedestal.

Figure 9O:
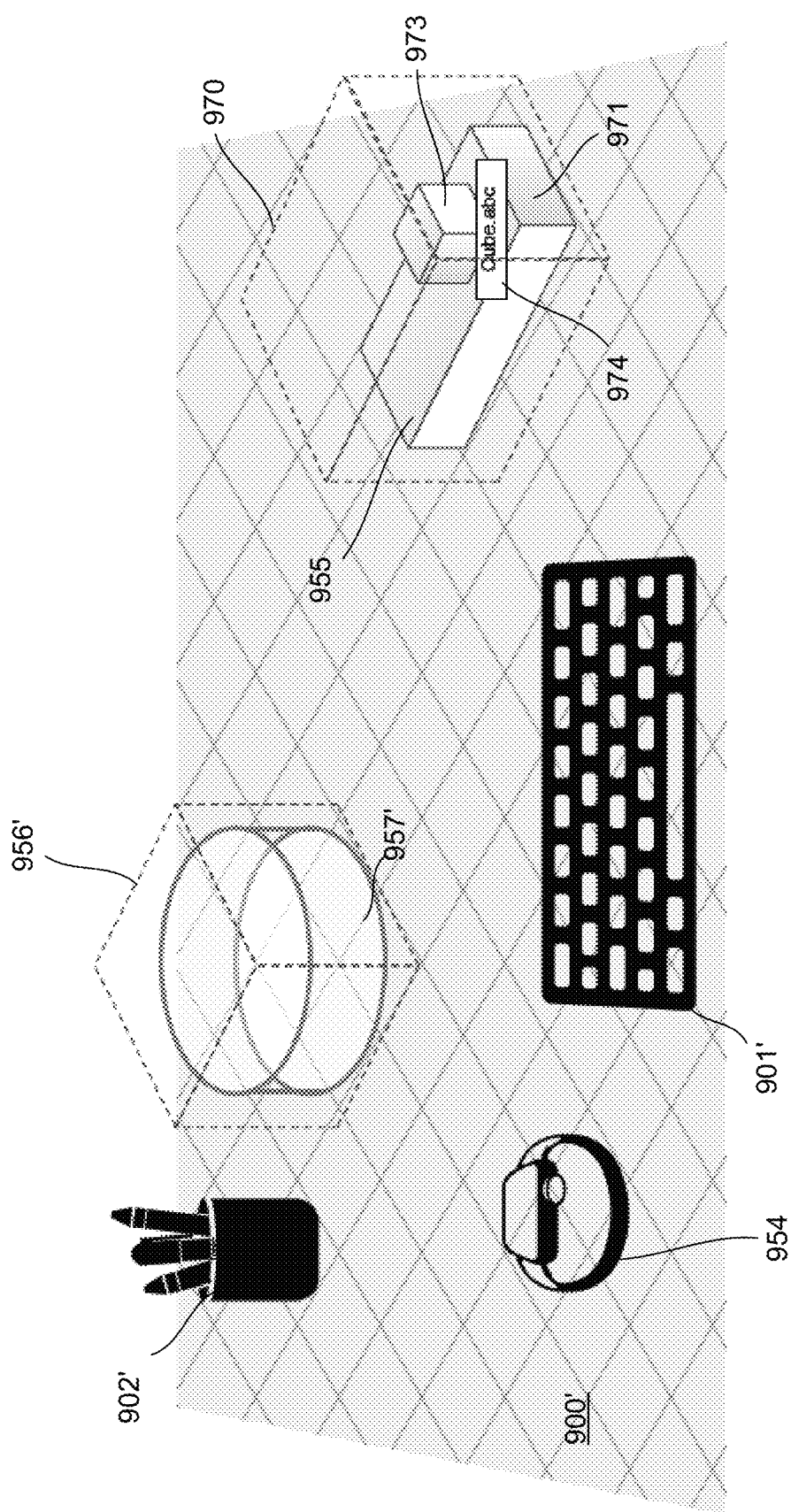

FIG. 9O shows an example of a 3-D workspace of FIG. 9N in which the virtual element has been removed from the receive volume for manipulation by Jack in his workspace.

System Components

Figure 10:
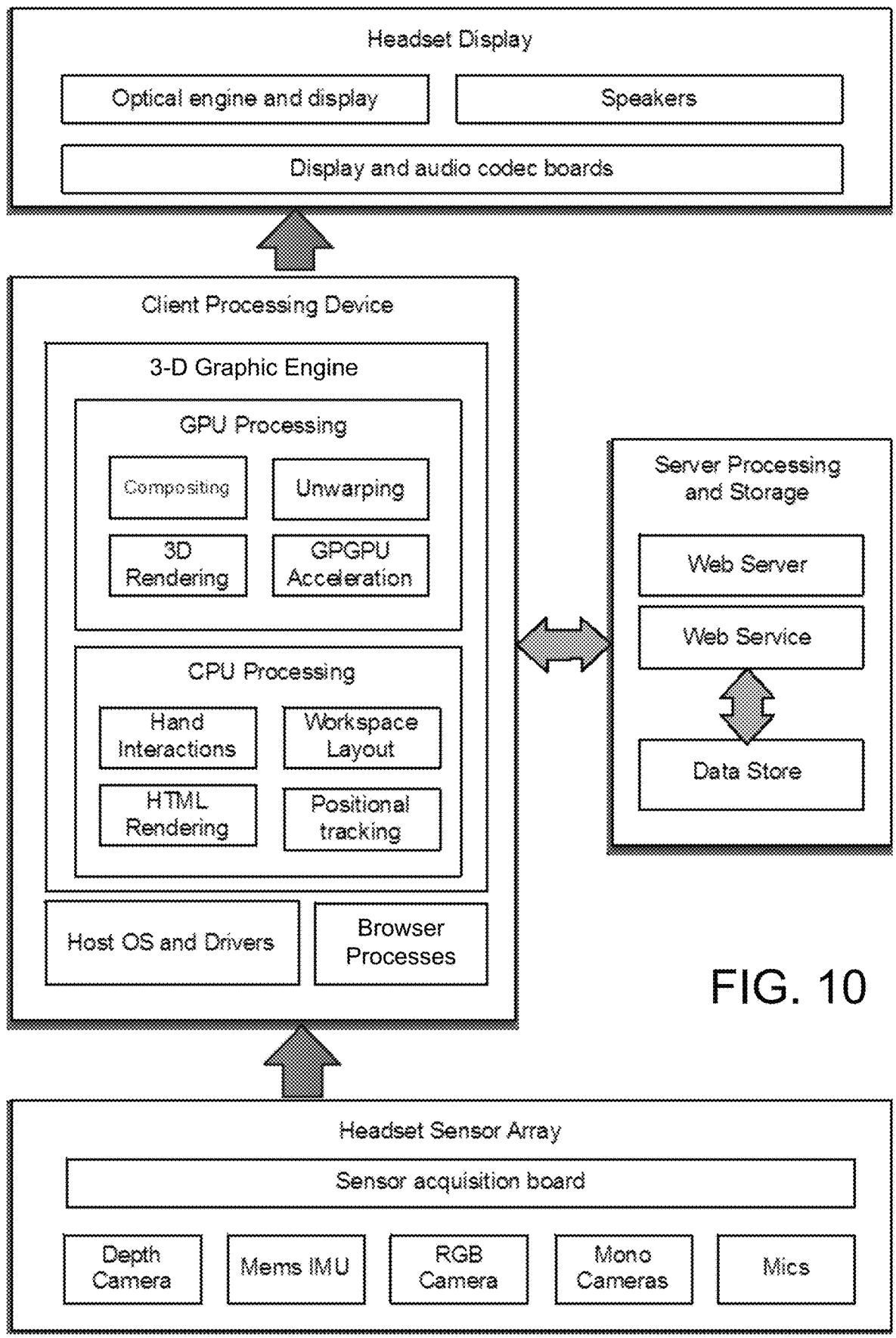
FIG. 10 shows a block diagram illustrating some components of a system for processing, access, interaction, sending, and receiving a 3-D virtual element.

FIG. 10 shows a block diagram illustrating some components of a system for processing, accessing, interacting with, and sharing of a virtual element in a workspace. As shown the client system includes a headset display, a sensor array, and a client processing device. The client system communicates with at least one server processing and storage system.

As shown in FIG. 10, left and right eye image frames and four channel audio frames are encoded by the client processing device and transmitted over an HDMI to the headset display, where the image frames are displayed through the optical engine and the audio frames are played over four near-ear speakers.

As shown in this example, the client processing system implements a 3-D graphics engine or platform (e.g., Unity, Unreal, or WebGL), which may include one or more of a rendering engine ("renderer") for 3D graphics, a physics engine or collision detection (and collision response), sound, scripting, animation, artificial intelligence, networking, streaming, memory management, threading, localization support, scene graphs, and may include video support for cinematics. The graphics engine renders the workspace stereoscopically using shaders, which run on a graphics processing unit (GPU). In addition, browser processes (e.g., Chromium) may be used to render web content from online publishers into RGB buffers, which are texture mapped onto panels or frames in the 3D workspace. In one example, virtual elements may be represented as mesh geometry and rendered in the shaders according to a model of the virtual element as specified by the virtual element descriptor including one or more of parameters, geometries, materials, metadata, and/or other attributes and the like. These different buffers are rendered stereoscopically then composited together and into left and right eye buffers. Finally, the left and right eye buffers are pre-warped with the inverse of the geometry of the optical engine to create the final left and right eye images. Audio may be rendered according HRTF models so that sound emitted from objects localized to the user, given the relative location of the four speakers on the headset to the pinna.

In this example, the 3-D graphics engine or platform manages the state of a 3-D virtual workspace. For example, the process can request web content from remote web servers, parsing HTML on Chromium processes. As described above, the virtual element may be retrieved through web services, which access and persist virtual elements in an online data storage or database, or from a memory or storage device of the client system if previously retrieved from the data store. In one example, business logic in the web service determines whether the user is authorized to view content of the virtual element. The data store of the server system may store both the high and low-fidelity representations or models of the virtual elements. The server system also may store a state required to render the 3-D virtual workspace and evaluate the position of virtual elements in the user's physical environment. Virtual elements may be rendered with a 3-D virtual workspace according to virtual coordinates and/or to corresponding the physical world coordinates using positional tracking, which localizes the user to the physical environment, as explained above.

The 3-D graphics engine or platform includes coding that, for example, pulls the data frames from client system drivers and places frames into queues for hand interaction and positional tracking algorithms to consume. The hands interaction algorithms consume depth frames to create a point cloud from which it computes interaction forces or hand feature tracking to determine user inputs (such as user gestures). Positional tracking algorithms consume IMU and camera frames to localize the user in the environment using a SLAM algorithm. In this example, data is acquired from the sensors. In one example, a sensor acquisition board timestamps, frames, and packages the data and sends the data over a USB connection to the client processing device. In this example, the IMU includes a gyroscope and accelerometer, which may facilitate determining the orientation of the user.

In some implementations, simulated manipulation of virtual content in an augmented reality environment may be based on user input and/or other input. For example, user input may comprise gesture-based input and/or other input. In some implementations, gesture-based input is based on tracking of one or more human features of a user. For example, gesture-based input may be based on tracking one or more of a hand, an arm, a torso, and/or other features of a user. By tracking one or more hands of a user, gestures including one or more of reaching, grabbing, releasing, touching, swiping, pointing, poking, and/or other gestures may be identified. The identified gestures may be provided as input for simulating manipulation of virtual content within a user's field-of-view. For example, an identified gesture may be correlated to a perceived position of a virtual element within a user's field-of-view. The virtual element may be configured to react to the gesture in an interactive manner. In another implementation, a discrete gesture may be used. For example, when a virtual element is in focus (using the gaze of a user or some other selection process) a recognized discrete gesture could trigger the manipulation of the active virtual element. A discrete gesture for example could be the user's hand palm facing the virtual element, fingers in a ball except for the index finger pointing up.

In another example, user input associated may be determined when the system determines whether a mouse cursor directed by the user enters the collider box of a virtual element. The virtual element responds to the user action such as a mouse click, or a click and drag.

In yet another example, user input associated may be in the form of voice commands. The system would make each virtual element addressable in a unique manner, perhaps consistent with their given filename or an existing metatag. The virtual element could be manipulated by the user through voice command that cover selection, manipulation, and placement into the 3-D space.

In another example, user input associated may be determined when at least one sensor of the display system determines that the translated position of a real-world object, such as a hand or finger, into the 3-D virtual space enters an interactive boundary or mesh of a virtual element. In this example, the display system determines the force exerted on the virtual element by the translated real-world object according to certain parameters associated with the interactive boundary of the virtual element. The virtual element responds based on the properties assigned to the virtual element and based on the properties of the virtual environment in which the virtual element and translated real-world object are present.

FIGS. 11A, 11B, 11C, 11D, and 11E show examples of an implementation of the client system using a head mounted display (HMD), which integrates a display or projector and optics to provide a stereoscopic optical system.

Figure 11A:
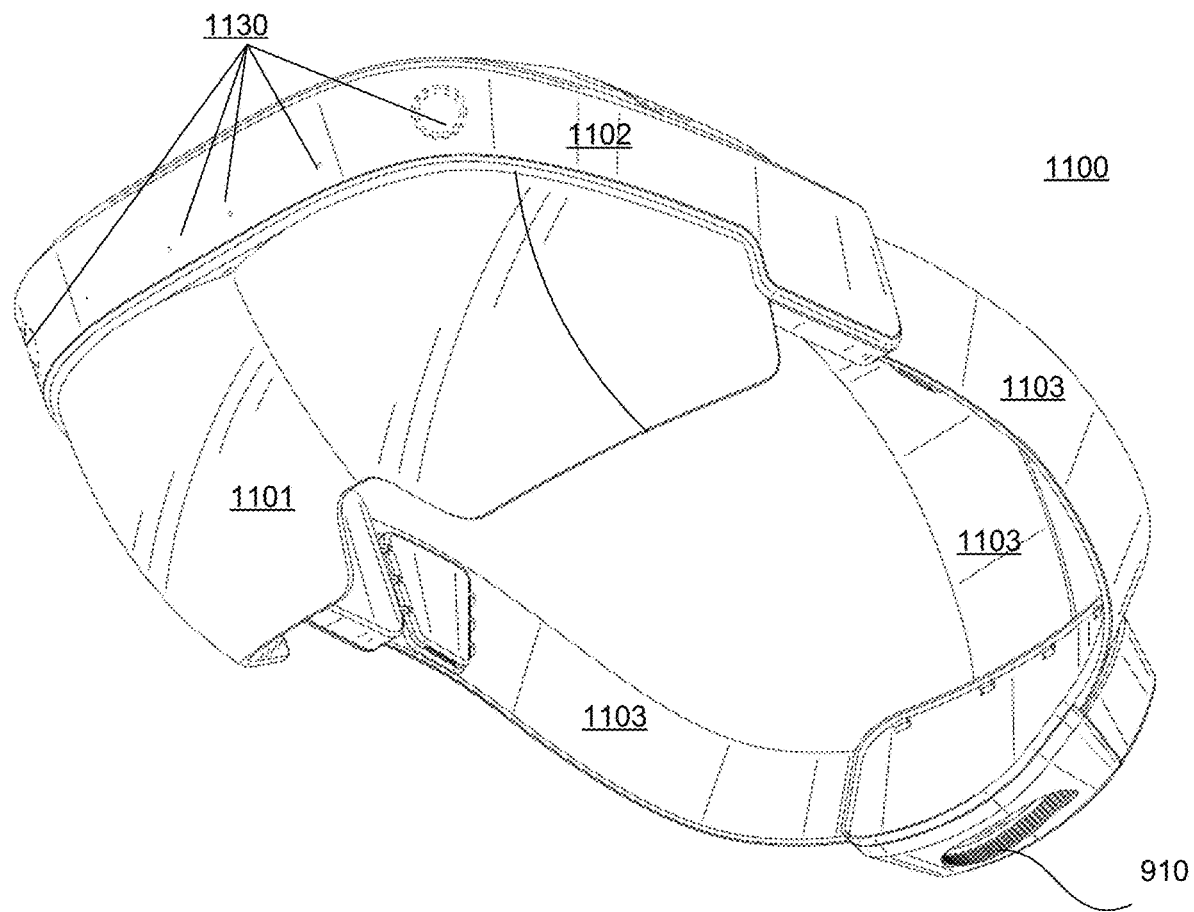
FIGS. 11A, 11B, 11C, 11D, and 11E show examples of a head mounted display and system implementation for sharing and manipulating 3-D virtual elements.
Figure 11B:
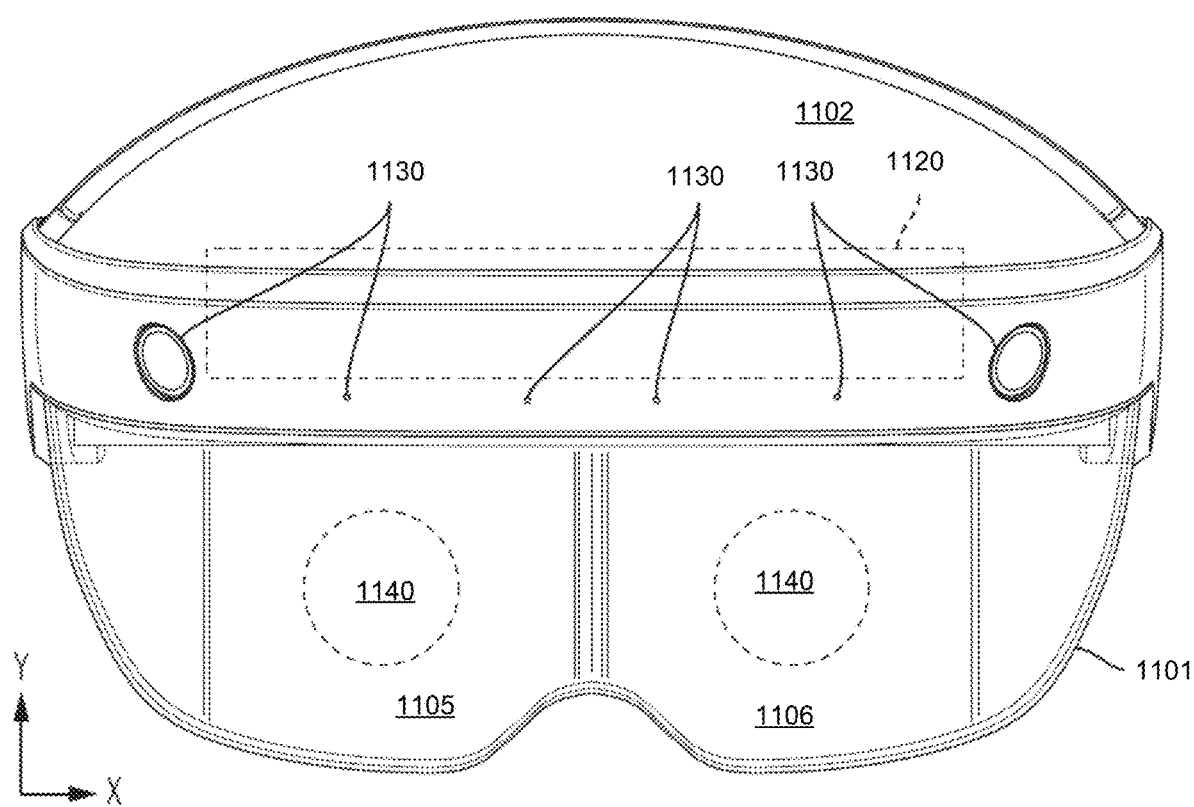
Figure 11C:
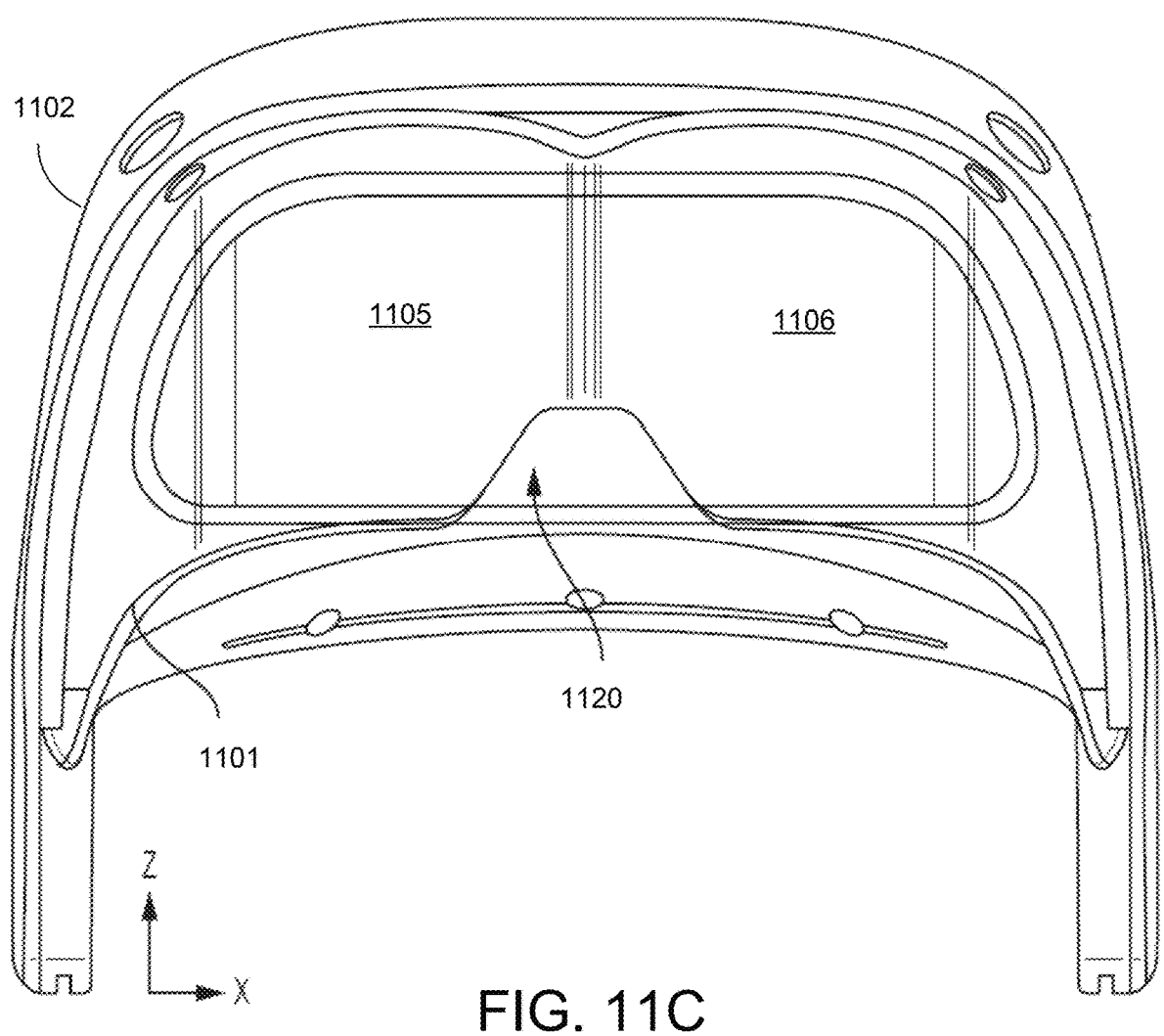

FIGS. 11A, 11B, and 11C shows a perspective view, front view, and bottom view, respectively, of one example of an HMD 1100. As shown the HMD includes a visor 1101 attached to a housing 1102, straps 1103, and a mechanical adjuster 1110 used to adjust the position and fit of the HMD to provide comfort and optimal viewing by a user of the HMD 1100. The visor 1101 may include one or more optical elements, such as an image combiner, that includes a shape and one or more reflective coatings that reflect an image from an image source 1120 to the eyes of the user. In one example, the coating is partially reflective allowing light to pass through the visor to the viewer and thus create a synthetic image in the field of view of the user overlaid on the user's environment and provide an augmented reality user interface. The visor 1101 can be made from a variety of materials, including, but not limited to, acrylic, polycarbonate, PMMA, plastic, glass, and/or the like and can be thermoformed, single diamond turned, injection molded, and/or the like to position the optical elements relative to an image source and eyes of the user and facilitate attachment to the housing of the HMD.

In one implementation, the visor 1101 may include two optical elements, for example, image regions 1105, 1106 or clear apertures. In this example, the visor 1101 also includes a nasal or bridge region, and two temporal regions. Each image region is aligned with the position 1140 of one eye of a user (e.g., as shown in FIG. 11B) to reflect an image provided from the image source 1120 to the eye of a user of the HMD. A bridge or nasal region is provided between the two image regions to connect the two regions 1105 and 1106. The image regions 1105 and 1106 mirror each other through the y-z plane that bisects the nasal rejoin. In one implementation, the temporal region extends to an outer edge of the image region wrapping around the eyes to the temple housing of the HMD to provide for peripheral vision and offer support of the optical elements such that the image regions 1105 and 1106 do not require support from a nose of a user wearing the HMD.

Figure 11D:
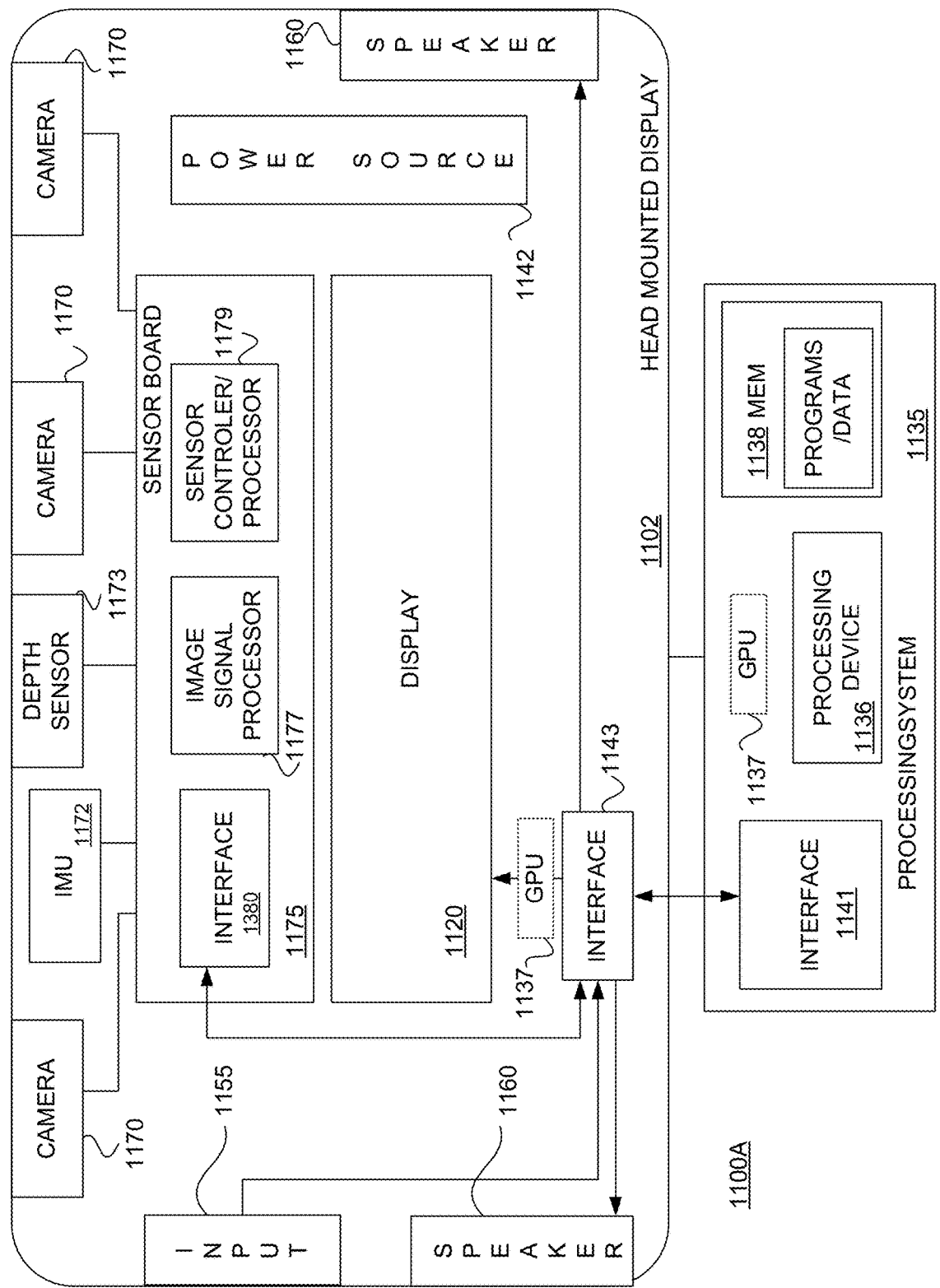
Figure 11E:
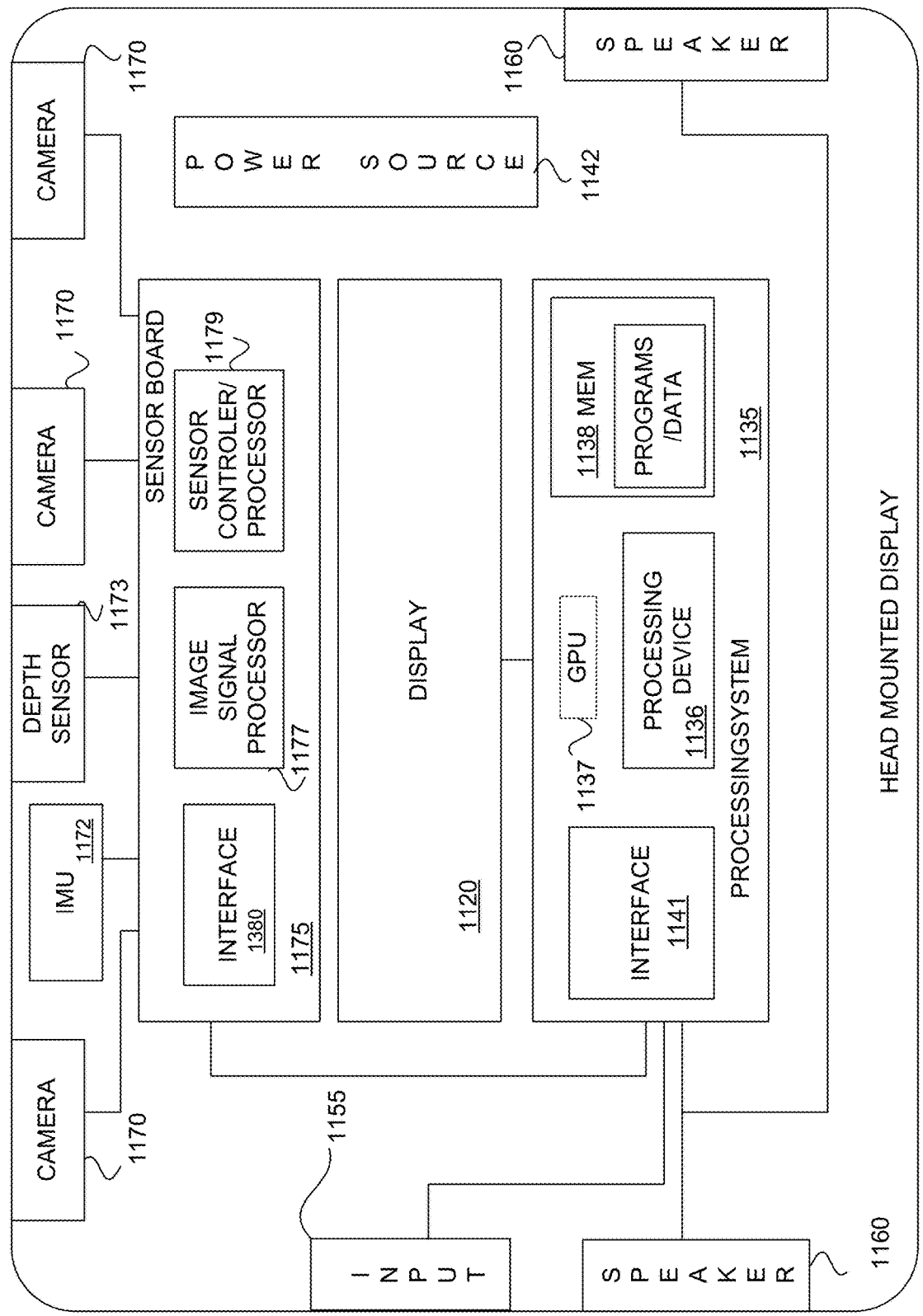

In one implementation, the housing may include a molded section to roughly conform to the forehead of a typical user and/or may be custom-fitted for a specific user or group of users. The housing may include various electrical components of the system, such as sensors 1130, a display or projector, a processor, a power source, interfaces, a memory, and various inputs (e.g., buttons and controls) and outputs (e.g., speakers) and controls in addition to their various related connections and data communication paths. FIG. 11D shows an example of a HMD 1100B in which a processing system 1135 is implemented outside of the housing 1102 and connected to components of the HMD using an interface 1143 (e.g. a wireless interface, such as Bluetooth or a wired connection, such as a USB wired connector). FIG. 11E shows an implementation in which the processing system 1135 is implemented inside of the housing 1102.

The housing 1102 positions one or more sensors 1130 that detect the environment around the user. In one example, one or more depth sensors are positioned to detect objects in the user's field of vision. The housing also positions the visor 1101 relative to the image source 1120 and the user's eyes. In one example, the image source 1120 may be implemented using one or more displays or projectors. For example, the image source may be a single display. If an optical element 1105, 1106 of the visor is provided for each eye of a user, the display may be partitioned into at least two halves. For example, each half may display an image intended for a separate eye. In another example, two displays may be provided. In this example, each display is paired with a corresponding optical element or image area, where each pair provides an image to an eye of the user. Examples of displays include a liquid crystal display (LCD), a Light Emitting Diode (LED) display, a flexible organic LED (OLED) display, and a Liquid Crystal on Silicon (LCoS or LCOS). In one example, a single 4.5- to 5.2-inch diagonal Liquid Crystal Display (LCD) may be used. In another example, dual 2.8-3.4-inch diagonal LCDs, one for each eye, may be used.

In one implementation, the display may be part of a mobile phone or other mobile device that is separate from, but placed within and/or affixed to, the HMD and/or HMD housing and is subsequently detachable or removable therefrom. For example, a user-accessible opening may be provided to accept and position a mobile phone or other mobile device with a display to provide an image source for the HMD. In this example, a hatch or a slot is configured to accept the mobile phone or other mobile device and provide access to a guide, a rail, one or more walls, or a shelf to position the display of the mobile device or mobile phone outside the field of view and at the geometries according to the descriptions and examples provided herein. In yet another example, an opening may provide one or more fasteners, such as a clip or deformable member that accept and detachably lock and position the display of the mobile device or mobile phone outside the field of view and at the geometries allowing reflection to the user's eyes.

As shown in FIGS. 11D and 11E, the processing system 1135 may include one or more processing devices 1136 and 1137 may implement applications or programs including 3-D graphics processing engine and/or platform for implementing the processes in FIGS. 3A, 3B, 4, 5, 6, 7, and 8A, 8C, 8E, 8G, and 8F as outlined above. In one example, the processing device 1137 is a graphic processing unit. The graphics processing unit may be configured to implement compositing, unwarping, 3-D rendering, and GPGPU Acceleration, among other processes. The graphics processing unit 1137 may be located in the housing 1102 or the processing system 1135 as shown in FIG. 11D. In one example, the processing device 1136 is a central processing unit. The central processing unit may be configured to implement hand interactions, workspace layout, HTML rendering, and positional tracking, among other processes. In one example, the processing device includes an associated memory 1138 storing one or more applications implemented by the processing device that generate digital image data depicting one or more of graphics, a scene, a graphical user interface, a computer game, a movie, content from the Internet, such as web content accessed from the World Wide Web, among others, that are to be presented to a viewer of the wearable HMD. Examples of applications includes media players, mobile applications, browsers, video games, and graphic user interfaces, to name but a few. Other application include a 3-D graphics engine, 3D rendering, hand interactions, workspace layout, positional tracking, among others. In addition, the applications or software may be used in conjunction with other system processes. For example, an unwarping process and a visual accommodation process for alignment and to compensate for distortion induced by an optical element of such as system may be included. The processing system also may include one or more interfaces 1141 to communicate with other devices of the HMD, peripherals, and the communication paths may format data for communication and receiving data to be used by the processing system.

As shown in FIGS. 11D and 11E, the HMD may include an input device 1155, speakers 1160, and a power source 1142.

As shown in FIGS. 11D and 11E, the HMD may include a sensor array 1130 includes cameras 1170, an IMU 1172, a depth sensor 1173, a sensor board 1175, an image signal processor 1177, a sensor/controller processing device 1179, and an interface 1180 to communicate with the processing system 1136.

The sensor array includes a mechanical holder and/or assembly that holds, arranges, and positions a plurality of sensors. For example, the mechanical holder accepts and holds the sensors securing the sensors to the housing of the HMD. In addition, the mechanical holder positions, arranges, and or configure the sensor to sense the user's real world environment as described in further detail below. The mechanical holder may be implemented as a single element, or be assembled from several elements. In one example, the holder holds, arranges, and positions at least three sensors, such as cameras.

In one example, one or more sensors (e.g., a depth camera, one or more monochrome cameras, an RGB camera, and the like) of the stereographic optical system of the client system generate spatial information to detect and map the location of real world elements relative to the optical system.

The spatial information is also used to locate and/or map the virtual 3-D spatial coordinates in relation to the real world elements. In some implementations, various sensors of a client system may be configured to sense and map features of the user's real world environment. For example, sensors may include one or more depth sensors, monochrome cameras, and/or and inertial measurement units. One or more mono cameras may be used to capture images depicting corners, texture patterns, high frequency textures, lines, sharp edges or other similar entities that can be tracked via computer vision algorithms. Examples of features include Harris corners, Sobel edges, Canny edges, KLT features/ Good Features To Track, Features from accelerated segment test (FAST) features, (Oriented FAST and Rotated BRIEF) ORB, Simultaneous localization and mapping (SLAM), BRISK, SURF features and the like. The detected features are processed by computer vision algorithms of various applications to sense and map the user's real world environment. For example, information obtained from one or more mono cameras is used for pose estimation using techniques, such as Visual-Inertial Odometry/Navigations, SLAM, Visual-Inertial SLAM, and the like.

In addition, a depth image sensor that senses the distance of an object/scene within the real world environment of the user also may be used to gather information about the user's environment. In one example, a depth sensor may be implemented using a Time-of-Flight (TOF) Camera. For example, the camera includes a light emission device or projector and measures the time between the emission of light from the device and the returned reflection of light from a real world object that is detected by the image sensor, which is referred to as time of flight depth sensing. In one example, the light projector or TOF camera emits a pre-defined pattern, and the depth of the scene images captured by the camera are algorithmically converted to a depth image where each pixel contains the depth of the scene (e.g., structured light depth sensing). The output depth images from the depth camera are used for Hand Tracking and Environment Sensing. In addition, the output may be used for Semantic Recognition and Pose Estimation. The output from the depth sensor also may be used as an input for Hand Sensing. For example, the depth sensor provides depth values that allow motion of hands and their interaction with digital content to be determined. In addition, the output from the depth sensor is used as an input for Environment Sensing. For example, the depth sensor provides a representation of the user's environment to form of point clouds of data points, a depth map of environment features, and/or three-dimensional (3D) meshes of the environment of the user. Furthermore, the depth sensor also can assist other processes, such as Semantic Recognition by sensing information about the shapes of objects and scenes used to differentiating characteristics of the object or the scene. Finally, the Depth Sensor can provide additional data as input to Pose Estimation resulting in determinations that are more robust. For example, the depth data allows the implementation of RGBD SLAM algorithms that combine RGB data with depth information, depth-based SLAM algorithms (such as Kinect Fusion), and also can aid estimation of a scale factor of the trajectory of a monocular Slam and/or Visual Inertial Navigation system. The visual algorithms are used to build a 3-D coordinate map of the user's environment over which a 3-D virtual space is overlaid.

One or more server systems may implement the one or more data stores to store workspace element descriptors and virtual element descriptors among other items used to provide a communication. The web servers also provides web services, such as authentication and communication session management via an interface of the web server system. The server system may include one or more communications devices, processing devices, memories/storage devices, communications interfaces, network devices, and communications paths store workspace element descriptors and virtual element descriptors among other items used to provide a communication. In one example, the server system may include one or more security devices (e.g., firewalls), web servers, application servers, storage and database systems, and backup memory devices. The web servers may establish communication links with the client devices. One or more application servers may be configured to provide authentication, workspace and virtual element descriptors, save instances of communication sessions and workspaces, in addition to other services. Servers may provide proxy services and associated memories to provide caching of content. Servers may provide database management services and analytic services and associated memories to store descriptive metadata and analytical information.

It is understood, however, that the example given in FIG. 1 is for illustrative purposes only, and that many different configurations, combinations of devices, and numbers of devices may be provided for any particular server system. For example, a cloud architecture also may be used to implement a server system, as described below. In addition, although only one server and storage device is shown in FIGS. 1 and 10, it will be appreciated that in actual implementation other configurations of servers or combination of servers may be provided including banks of a number of these machines as necessary may be provided to handle the number of users, data, and traffic handled by a particular implementation of a server system.

In addition, server system may be configured to provide a location that is centralized and/or remote from the perspective of the user. The central location may be one physical location, such as a room, building, or campus providing the hardware components of the system. However, in reality the central location may be virtual or distributed where services are provided, content are accessed from, and data is stored over a number of distributed systems and/or geographic locations. In other words, although the server system is shown in FIGS. 1 and 10 as being a single entity, other configurations wherein the applications, processing, services, content, and data are distributed both in terms of devices and geographical location are within the meaning of the server system. Additionally, the server system may use third parties to host or initiate services as needed on demand, for example, using cloud computing wherein the locations and structure providing the services change size, and physical location, distribution, and even equipment dynamically over time.

The communications paths may be configured to send and receive signals (e.g., electrical, acoustic, electromagnetic, or optical) that convey or carry data representing various types of analog and/or digital data including programming, software, media, and content, among others, for presentation to a user. For example, the communications paths may be implemented using various communications media and one or more networks comprising one or more network devices (e.g., network interface cards, fiber media converter, servers, routers, switches, hubs, bridges, repeaters, blades, processors, and storage devices). The one or more networks may include a local area network (LAN), a wide area network (WAN), an Ethernet, a global area network (GAN), a cloud network, a plain old telephone service (POTS) network, a digital subscriber line (DSL) network, an integrated services digital network (ISDN), a synchronous optical network (SONNET)/SDH, Passive and Active Optical Networks (PON or AON), a packet switched network, V.92 telephone network modems, IRDA, USB, Firewire, EIA RS-232, EIA-422, EIA-423, RS-449, RS-485, ITU, T1 and other T-carrier links, and E1 and other E-carrier links, varieties of 802.11, GSM Um radio interface, Bluetooth, IEEE 802.11x Wi-Fi, TransferJet, Etherloop, ARINC 818 Avionics Digital Video Bus, G.hn/G.9960, or a combination of two or more of these networks to name a few.

In addition, the communications paths may include one or more wireless links (e.g., microwave, radio, and satellite) that transmit and receive electromagnetic signals, such as, for example, radio frequency, infrared, and microwave signals, to convey information/data signal using any one of a number of communications protocols, for example, communications links may include IMT-2000, such as 2G (GSM, GPRS, EDGE, EDGE Evolution, CSD, HSCSD), 2.5G, 2.75G, 3G (W-CDMA, HSPDA, HSUPA, UMTS-TDD, FOMA), 4G, 4GLTE, and IEEE 802.11 standards, such as Wi-Fi or WLAN. In one example, a communications path may include the Internet or World Wide Web or components found therein.

As described above, the techniques described herein for a wearable AR client system can be implemented using digital electronic circuitry, or in computer hardware, firmware, software, or in combinations of them in conjunction with various combiner imager optics. The techniques can be implemented as a computer program product, i.e., a computer program tangibly embodied in a non-transitory information carrier, for example, in a machine-readable storage device, in machine-readable storage medium, in a computer-readable storage device or, in computer-readable storage medium for execution by, or to control the operation of, data processing apparatus or processing device, for example, a programmable processor, a computer, or multiple computers. A computer program can be written in any form of programming language, including compiled or interpreted languages, and it can be deployed in any form, including as a stand-alone program or as a module, component, subroutine, or other unit suitable for use in the specific computing environment. A computer program can be deployed to be executed by one component or multiple components of the vision system.

The exemplary processes and others can be performed by one or more programmable processing devices or processors executing one or more computer programs to perform the functions of the techniques described above by operating on input digital data and generating a corresponding output. Method steps and techniques also can be implemented as, special purpose logic circuitry, e.g., an FPGA (field programmable gate array) or an ASIC (application-specific integrated circuit).

Processing devices or processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. The processing devices described herein may include one or more processors and/or cores. Generally, a processing device will also include, or be operatively coupled to receive data from or transfer data to, or both, one or more mass storage devices for storing data, such as, magnetic, magneto-optical disks, or optical disks. Non-transitory information carriers suitable for embodying computer program instructions and data include all forms of non-volatile memory, including by way of example semiconductor memory devices, such as, EPROM, EEPROM, and flash memory or solid state memory devices; magnetic disks, such as, internal hard disks or removable disks; magneto-optical disks; and CD-ROM and DVD-ROM disks. The processor and the memory can be supplemented by, or incorporated in special purpose logic circuitry.

The HMD may include various other components including various optical devices and frames or other structure for positioning or mounting the display or projection system on a user allowing a user to wear the vision system while providing a comfortable viewing experience for a user. The HMD may include one or more additional components, such as, for example, one or more power devices or connections to power devices to power various system components, one or more controllers/drivers for operating system components, one or more output devices (such as a speaker), one or more sensors for providing the system with information used to provide an augmented reality to the user of the system, one or more interfaces from communication with external output devices, one or more interfaces for communication with an external memory devices or processors, and one or more communications interfaces configured to send and receive data over various communications paths. In addition, one or more internal communication links or busses may be provided in order to connect the various components and allow reception, transmission, manipulation and storage of data and programs.

The preceding detailed description is merely exemplary in nature and is not intended to limit the described embodiments (examples, options, etc.) or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described above are exemplary implementations provided to enable making or using the embodiments of the disclosure and are not intended to limit the scope of the disclosure. For purposes of the description herein, the terms "upper," "lower," "left," "rear," "right," "front," "vertical," "horizontal," and similar terms or derivatives thereof shall relate to the examples as oriented in the drawings and do not necessarily reflect real-world orientations unless specifically indicated. Furthermore, there is no intention to be bound by any expressed or implied theory presented in the following detailed description. It is also to be understood that the specific devices, arrangements, configurations, and processes illustrated in the attached drawings, and described in the following specification, are exemplary embodiments (examples), aspects and/or concepts. Hence, specific dimensions and other physical characteristics relating to the embodiments disclosed herein are not to be considered as limiting, except in the context of any claims, which expressly states otherwise. It is understood that "at least one" is equivalent to "a."

The aspects (examples, alterations, modifications, options, variations, embodiments, and any equivalent thereof) are described with reference to the drawings; it should be understood that the descriptions herein show by way of illustration various embodiments in which claimed inventions may be practiced and are not exhaustive or exclusive. They are presented only to assist in understanding and teach the claimed principles. It should be understood that they are not necessarily representative of all claimed inventions. As such, certain aspects of the disclosure have not been discussed herein. That alternate embodiments may not have been presented for a specific portion of the invention or that further alternate embodiments that are not described may be available for a portion is not to be considered a disclaimer of those alternate embodiments. It will be appreciated that many of those embodiments not described incorporate the same principles of the invention and others that are equivalent. Thus, it is to be understood that other embodiments may be utilized and functional, logical, organizational, structural and/or topological modifications may be made without departing from the scope and/or spirit of the disclosure.

In order to address various issues and advance the art, the entirety of this application (including the Cover Page, Title, Headings, Detailed Description, Claims, Abstract, Figures, Appendices and/or otherwise) shows by way of illustration various embodiments in which the claimed inventions may be practiced. The advantages and features of the application are of a representative sample of embodiments only, and are not exhaustive and/or exclusive. They are presented only to assist in understanding and teach the claimed principles. It should be understood that they are not representative of all claimed inventions. In addition, the disclosure includes other inventions not presently claimed. Applicant reserves all rights in those presently unclaimed inventions including the right to claim such inventions, file additional applications, continuations, continuations in part, divisions, and/or the like thereof. As such, it should be understood that advantages, embodiments, examples, functional, features, logical, organizational, structural, topological, and/or other aspects of the disclosure are not to be considered limitations on the disclosure as defined by the claims or limitations on equivalents to the claims.

The invention claimed is:

1. A method implemented by a processing system, the method comprising:
    sensing, by one or more sensors, a three-dimensional (3-D) volumetric environment around the user of the processing system;
    creating, by a processing system, a 3-D virtual space mapped to the sensed environment;
    providing a virtual element within the 3-D virtual space;
    rendering the virtual element, by a display of the processing system, wherein the rendered virtual element is perceived by a user of the processing system in the 3-D volumetric environment;
    determining from input of at least one of the one or more sensors an interaction between a real-world object and the virtual element based on one or more locations of the real-world object sensed in the 3-D volumetric environment corresponding to one or more locations in the 3-D virtual space;
    generating, in response to the determined interaction between the real-world object and the virtual element, an electronic communication addressed to an entity that includes data configured to:
        provide the virtual element within a 3-D virtual space corresponding to a sensed 3-D volumetric environment of a processing system associated with the entity, and
        render the virtual element by a display of the processing system associated with the entity ; and
    transmitting the electronic communication addressed to the entity.

2. The method of claim 1 further comprising:
    establishing communications by the processing system with a server system, wherein the electronic communication is transmitted to the server system.

3. The method of claim 1 further comprising:
    establishing communications by the processing system with the processing system associated with the entity, wherein the data configured to provide and render the virtual element is transmitted to the processing system associated with the entity.

4. The method of claim 1 further comprising:
    determining spatial coordinates of an interactive bounding volume within the 3-D virtual space, wherein determining the interaction further includes determining a spatial relation between the location of the virtual element in the 3-D virtual space and the spatial coordinates of the interactive bounding volume.

5. The method of claim 4 wherein determining the interaction further includes determining the virtual element in the 3-D virtual space is moved from a location outside the interactive bounding volume to a location within the interactive bounding volume in response to the determined interaction between the real-world object and the virtual element.

6. The method of claim 5 wherein determining the interaction includes translating the location of the virtual element within the 3-D virtual space from a first location outside the interactive bounding volume to a second location within spatial coordinates of the interactive bounding volume and rendering the virtual element within the interactive bounding volume.

7. The method of claim 4 further comprising:
    representing the location of the interactive bounding volume within the 3-D virtual space by rendering a second virtual element in proximity to the location of the interactive bounding volume within the 3-D virtual space.

8. The method of claim 1 further comprising:
    cease providing the virtual element in the 3-D virtual space in response to transmitting the electronic communication .

9. The method of claim 7 wherein the rendering of the second virtual element includes rendering an indication of the address or identification of the entity associated with the address.

10. The method of claim 1 wherein the real-world object is a hand, a digit, or an appendage of a user of the processing system.

11. The method of claim 5, further comprising:
    determining the interaction between the real-world object and the virtual element has ended and the location of the virtual element in the 3-D virtual space is within the interactive bounding volume, and, in response, automatically generating the electronic communication addressed to the entity, and transmitting the electronic communication.

12. A system comprising:
    one or more one sensors;
    a display;
    an optical element;
    one or more data processing devices configured to execute machine-readable instructions that cause the one or more data processing devices to:
        determine a three-dimensional (3-D) volumetric environment around the user of the system based on input from at least one of the one or more sensors;
        create a 3-D virtual space mapped to the environment;

provide a virtual element within the 3-D virtual space by rendering an image on the display that is reflected or directed to the eyes of the user;

render the virtual element by the display, wherein the rendered virtual element is perceived by a user of the system in the 3-D volumetric environment;

determine from the input of at least one of the one or more sensors that an interaction between a real-world object and the virtual element based on one or more locations of the real-world object sensed in the 3-D volumetric environment corresponding to one or more locations in the 3-D virtual space ;

generate, in response to the determined interaction between the real-world object and the virtual element, an electronic communication addressed to an entity that includes data configured to:

provide the virtual element within a 3-D virtual space corresponding to a sensed 3-D volumetric environment of a system associated with the entity, and render the virtual element by a display of the system associated with the entity; and transmit the electronic communication addressed to the entity.

13. The system of claim 12, wherein the one or more processing devices are configured to execute further machine-readable instructions that cause the one or more processing devices to:

establish communications with a server system, wherein the electronic communication is transmitted to the server system.

14. The system of claim 12, wherein the one or more processing devices are configured to execute further machine-readable instructions that cause the one or more processing devices to:

establish communications by the system with the system associated with the entity wherein the data configured to provide and render the virtual element is transmitted to the system associated with the entity.

15. The system of claim 12, wherein the one or more processing devices are configured to execute further machine-readable instructions that cause the one or more processing devices to:

determine spatial coordinates of an interactive bounding volume within the 3-D virtual space; and determine a spatial relation between the location of the virtual element in the 3-D virtual space and the spatial coordinates of the interactive bounding volume.

16. The system of claim 15 wherein the one or more processing devices are configured to execute further machine-readable instructions that cause the one or more processing devices to:

determine the virtual element in the 3-D virtual space is moved from a location outside the interactive bounding volume to a location within the interactive bounding volume in response to the determined user interaction between the real-world object and the virtual element.

17. The system of claim 16 wherein the interaction includes translating the location of the virtual element within the 3-D virtual space from a first location outside the interactive bounding volume to a second location within spatial coordinates of the interactive bounding volume, and wherein the one or more processing devices are configured to execute further machine-readable instructions that cause the one or more processing devices to:

render the virtual element as being located within the interactive bounding volume.

18. The system of claim 15 wherein the one or more processing devices are configured to execute further machine-readable instructions that cause the one or more processing devices to:

represent the location of the interactive bounding volume with in the 3-D virtual space by rendering a second virtual element in proximity to the location of the interactive bounding volume within the 3-D virtual space.

19. The system of claim 17 wherein the one or more processing devices are configured to execute further machine-readable instructions that cause the one or more processing devices to:

cease providing the virtual element in the 3-D virtual space in response to transmitting the electronic communication .

20. The system of claim 18 wherein, the rendering of the second virtual element includes an indication of the address or identification of the entity associated with the address .

21. The system of claim 16 wherein the one or more processing devices are configured to execute further machine-readable instructions that cause the one or more processing devices to:

remove the visually perceived representation of a virtual element within the 3-D virtual space after the visually perceived representation of a virtual element has been disengaged and placed within the interactive bounding volume.

22. The system of claim 12 wherein the real-world object is a hand, a digit, or an appendage of a user of the system.

23. A method implemented by a receiving processing system, the method comprising:

sensing, by one or more sensors, a three-dimensional (3-D) volumetric environment around the user of the receiving processing system;

creating, by the receiving processing system, a 3-D virtual space mapped to the sensed environment;

determining spatial coordinates of an interactive bounding volume within the 3-D virtual space associated with a communications protocol;

receiving in response to an electronic communication created by a transmitting processing system addressed to an entity associated with the receiving processing system, data configured to provide a virtual element sent from the transmitting processing system within the 3-D virtual space corresponding to the sensed 3-D volumetric environment of the receiving processing system;

placing the virtual element sent from the transmitting processing system within the 3-D virtual space at a location within the interactive bounding volume by processing the received data; and rendering the virtual element sent from the transmitting processing system, by a display of the receiving processing system, wherein the rendered virtual element is perceived by a user of the receiving processing system in the 3-D volumetric environment at a location corresponding to the interactive bounding volume.

24. The method of claim 23 wherein the real-world object is a hand, a digit, or an appendage of a user of the processing system.

25. The method of claim 23 further comprising:

establishing communications by the receiving processing system with a server system, wherein the date is received from the server system.

26. The method of claim 23 further comprising:
establishing communications by the receiving processing system with the transmitting processing system, wherein the data is received from the transmitting processing system.

27. The method of claim 23 further comprising:
determining from input of at least one of the one or more sensors an interaction between a real-world object and the virtual element based on one or more locations of the real-world object sensed in the 3-D volumetric environment corresponding to one or more locations in the 3-D virtual space; and
translating, in response to the interaction, the location of the virtual element in the 3-D virtual space from the interactive bounding volume to another location within the 3-D virtual space outside of the bounding volume.

28. The method of claim 27 further comprising, storing the received data configured to render the virtual element within a 3-D space at a desired location within a storage device accessed by the receiving processing system automatically in response to translating the location of the virtual element from the interactive bounding volume to the location outside of the interactive bounding volume.

29. The method of claim 23 wherein the provided virtual element is a low-fidelity virtual element the method further comprising:
determining from input of at least one of the one or more sensors an interaction between a real-world object and the virtual element based on a location of the real-world object sensed in the 3-D volumetric environment corresponding to a location in the 3-D virtual space;
translating, in response to the interaction, the location of the low fidelity virtual element in the 3-D virtual space from the interactive bounding volume to another location within the 3-D virtual space outside of the bounding volume; and
replacing the low fidelity virtual element with a high-fidelity virtual element in response to the translation of the location of the low fidelity virtual element to the location outside of the interactive bounding volume.

30. The method of claim 23 further comprising:
providing a virtual panel or frame at a location in the 3-D virtual space presenting data from a communications application associated with the communications protocol; and
wherein determining the spatial coordinates of an interactive bounding volume within the 3-D virtual space includes placing the coordinates in proximity to the location of the panel or frame.

31. The method of claim 23 further comprising:
representing the location of the interactive bounding volume within the 3-D virtual space by rendering a second virtual element in proximity to the location of the interactive bounding volume within the 3-D virtual space, the rendered second virtual element including an indication of a sender of the virtual element.

32. A receiving system comprising:
one or more one sensors;
a display;
an optical element;
one or more data processing devices configured to execute machine-readable instructions that cause the one or more data processing devices to:
determine a three-dimensional (3-D) volumetric environment around a user of the receiving system based on input from at least one of the one or more sensors;
create a 3-D virtual space mapped to the 3-D volumetric environment;
determine spatial coordinates of an interactive bounding volume within the 3-D virtual space associated with a communications protocol;
receive in response to an electronic communication created by a transmitting system addressed to an entity associated with the receiving system data configured to provide a virtual element sent from the transmitting system within the 3-D virtual space corresponding to the sensed 3-D volumetric environment of the receiving system;
place the virtual element sent from the transmitting system within the 3-D virtual space at a location within the interactive bounding volume by processing the received data; and
render the virtual element sent from the transmitting system, by the display of the receiving system, wherein the rendered virtual element is perceived by a user of the receiving system in the 3-D volumetric environment at a location corresponding to the interactive bounding volume.

33. The system of claim 32, wherein the one or more processing devices are configured to execute further machine-readable instructions that cause the one or more processing devices to:
establish communications by the receiving system with a server system, wherein the data is received from the server system.

34. The system of claim 32, wherein the one or more processing devices are configured to execute further machine-readable instructions that cause the one or more processing devices to:
establish communications by the receiving system with the transmitting system, wherein the data is received from the transmitting system.

35. The system of claim 32, wherein the one or more processing devices are configured to execute further machine-readable instructions that cause the one or more processing devices to:
determine from input of at least one of the one or more sensors an interaction between a real-world object and the virtual element based on one or more locations of the real-world object sensed in the 3-D volumetric environment corresponding one or more locations in the 3-D virtual space; and
translate, in response to the interaction, the location of the virtual element in the 3-D virtual space from the interactive bounding volume to another location within the 3-D virtual space outside of the interactive bounding volume.

36. The system of claim 35, wherein the one or more processing devices are configured to execute further machine-readable instructions that cause the one or more processing devices to store the data used to render the virtual element within a 3-D space at a desired location within a storage device accessed by the receiving system automatically in response to translating the location of the virtual element from the interactive bounding volume to the location outside of the interactive bounding volume.

37. The system of claim 32 wherein the provided virtual element is a low-fidelity virtual element and the one or more processing devices are configured to execute further machine-readable instructions that cause the one or more processing devices to:
determine from input of at least one of the one or more sensors an interaction between a real-world object and the virtual element based on a location of the real-world object sensed in the 3-D volumetric environment corresponding to a location in the 3-D virtual space;

translate, in response to the interaction, the location of the low fidelity virtual element in the 3-D virtual space from the interactive bounding volume to another location within the 3-D virtual space outside of the interactive bounding volume; and replace the low fidelity virtual element with a high-fidelity virtual element in response to the translation of the location of the low fidelity virtual element to the location outside of the interactive bounding volume.

38. The system of claim 32 wherein the one or more processing devices are configured to execute further machine-readable instructions that cause the one or more processing devices to:

provide a virtual panel or frame at a location in the 3-D virtual space presenting data from a communications application associated with the communications protocol; and wherein determining the spatial coordinates of an interactive bounding volume within the 3-D virtual space includes placing the coordinates in proximity to the location of the panel or frame.

39. The system of claim 32 wherein the real-world object is a hand, a digit, or an appendage of a user of the system.

40. The system of claim 32, wherein the one or more processing devices are configured to execute further machine-readable instructions that cause the one or more processing devices to:

render a second virtual element in proximity to the location of the interactive bounding volume within the 3-D virtual space, the rendered second virtual element including an indication of a sender of the virtual element.

* * * * *